United States Patent
Liu

(10) Patent No.: US 12,231,763 B2
(45) Date of Patent: Feb. 18, 2025

(54) COORDINATION WINDOW PROCESSING METHOD, SYSTEM, AND ELECTRONIC DEVICE

(71) Applicant: HONOR DEVICE CO., LTD., Shenzhen (CN)

(72) Inventor: Shicong Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/016,850

(22) PCT Filed: Aug. 29, 2022

(86) PCT No.: PCT/CN2022/115351
§ 371 (c)(1),
(2) Date: Jan. 18, 2023

(87) PCT Pub. No.: WO2023/040636
PCT Pub. Date: Mar. 23, 2023

(65) Prior Publication Data
US 2024/0244313 A1    Jul. 18, 2024

(30) Foreign Application Priority Data

Sep. 17, 2021   (CN) .......................... 202111095503.8

(51) Int. Cl.
*H04N 23/63*     (2023.01)
*G06F 3/0488*    (2022.01)
(Continued)

(52) U.S. Cl.
CPC ......... *H04N 23/632* (2023.01); *G06F 3/0488* (2013.01); *G06F 3/14* (2013.01);
(Continued)

(58) Field of Classification Search
CPC ...... H04N 23/632; H04N 23/62; H04N 23/66; G06F 3/0488; G06F 3/14; G06F 3/1454;
(Continued)

(56) References Cited

U.S. PATENT DOCUMENTS 11,861,161 B2 * 1/2024 Zhu .................. G06F 3/0484
2011/0191695 A1 8/2011 Dinka et al.
(Continued)

FOREIGN PATENT DOCUMENTS

| CN | 110191286 A | 8/2019 |
|---|---|---|
| CN | 110515576 A | 11/2019 |

(Continued)

*Primary Examiner* — Marly S Camargo
(74) *Attorney, Agent, or Firm* — WOMBLE BOND DICKINSON (US) LLP

(57) ABSTRACT

Embodiments of this application provide a coordination window processing method and system, and an electronic device. The method includes: the second electronic device displays coordination windows of the first electronic device, where an interface displayed in a first coordination window is always the same as that displayed in the first electronic device, and an application interface displayed in a second coordination window is different from that displayed in the first coordination window. After a user taps a camera function option on the interface of the second coordination window, the first coordination window and the first electronic device display an interface for collecting information by the camera of the first electronic device. After the user operates the first electronic device to complete information collection, the first coordination window and the first electronic device restore the interface displayed before, and the second coordination window displays an interface that obtains the collected information.

20 Claims, 47 Drawing Sheets

(51) Int. Cl.
*G06F 3/14* (2006.01)
*G06F 9/451* (2018.01)
*H04M 1/24* (2006.01)
*H04M 1/72403* (2021.01)
*H04N 23/62* (2023.01)
*H04N 23/66* (2023.01)

(52) U.S. Cl.
CPC ........ *H04M 1/72403* (2021.01); *H04N 23/62* (2023.01); *H04M 2250/52* (2013.01)

(58) Field of Classification Search
CPC .... G06F 3/0482; G06F 3/04886; G06F 9/451; H04M 1/72403; H04M 1/2409; H04M 2250/52
See application file for complete search history.

(56) References Cited

U.S. PATENT DOCUMENTS

| | | | | |
|---|---|---|---|---|
| 2015/0082241 A1* | 3/2015 | Kang | .................. | G06F 3/04845 |
| | | | | 715/803 |
| 2017/0235435 A1* | 8/2017 | Sohn | ..................... | G06F 3/0481 |
| 2018/0275948 A1 | 9/2018 | Wei et al. | | |
| 2021/0263642 A1 | 8/2021 | Li et al. | | |
| 2022/0147228 A1* | 5/2022 | Yi | ........................ | G06F 3/04883 |
| 2022/0229624 A1 | 7/2022 | Xiong et al. | | |
| 2022/0291892 A1 | 9/2022 | Gu | | |
| 2022/0398059 A1 | 12/2022 | Zhu et al. | | |
| 2023/0333801 A1* | 10/2023 | Guo | ..................... | G06F 3/04886 |
| 2023/0336654 A1* | 10/2023 | Xu | ........................ | G06F 9/451 |
| 2023/0359424 A1 | 11/2023 | Li et al. | | |
| 2024/0184414 A1* | 6/2024 | Liu | ........................ | G06F 3/1454 |
| 2024/0192986 A1* | 6/2024 | Wang | ................... | G06F 3/0184 |

FOREIGN PATENT DOCUMENTS

| | | |
|---|---|---|
| CN | 111327769 A | 6/2020 |
| CN | 111880870 A | 11/2020 |
| CN | 112527174 A | 3/2021 |
| CN | 112995727 A | 6/2021 |
| CN | 113050841 A | 6/2021 |
| CN | 113873679 A | 12/2021 |
| EP | 4040277 A1 | 8/2022 |
| EP | 4060475 A1 | 9/2022 |
| WO | 2020238871 A1 | 12/2020 |
| WO | 2021121052 A1 | 6/2021 |
| WO | 2021129253 A1 | 7/2021 |

* cited by examiner

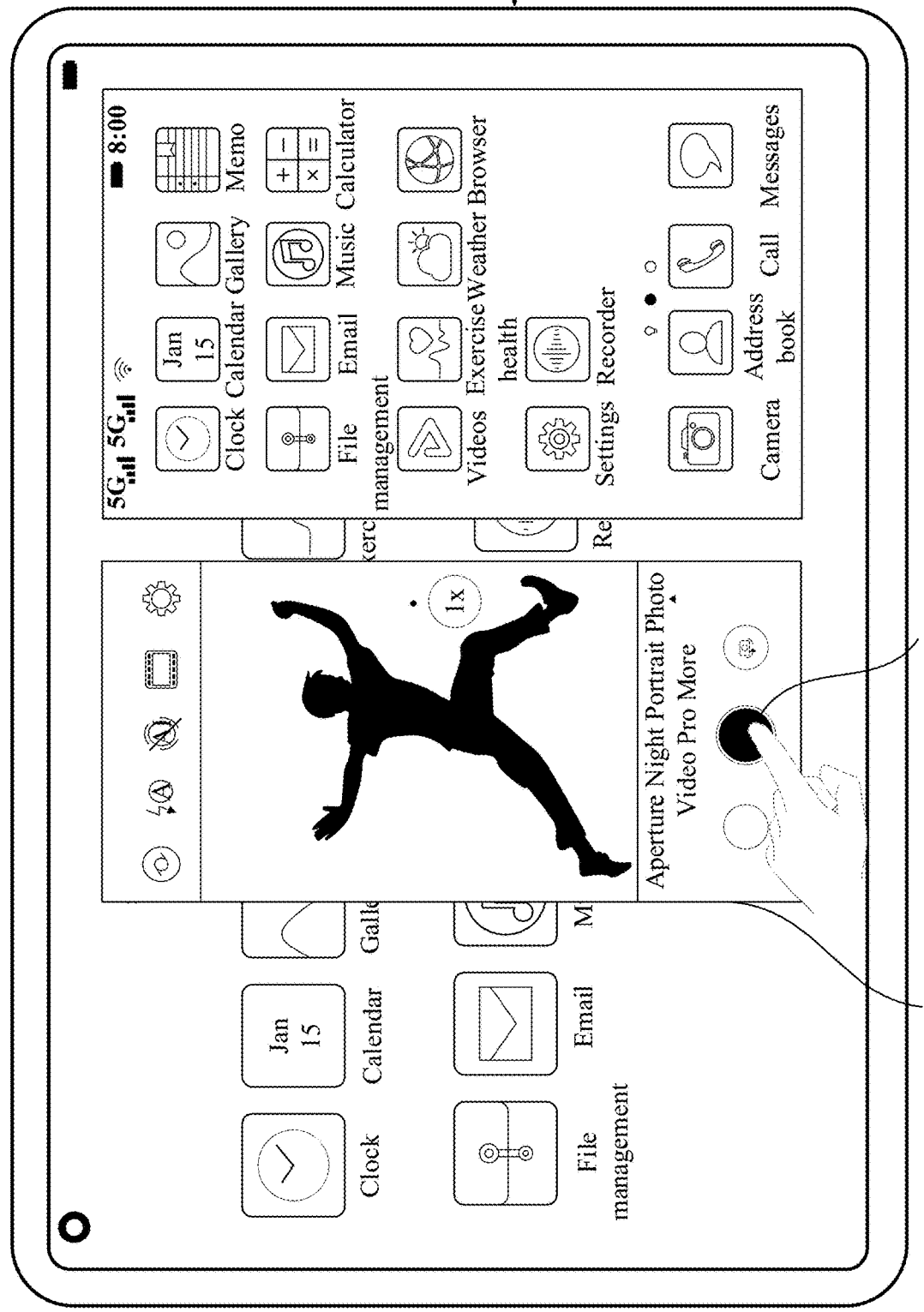

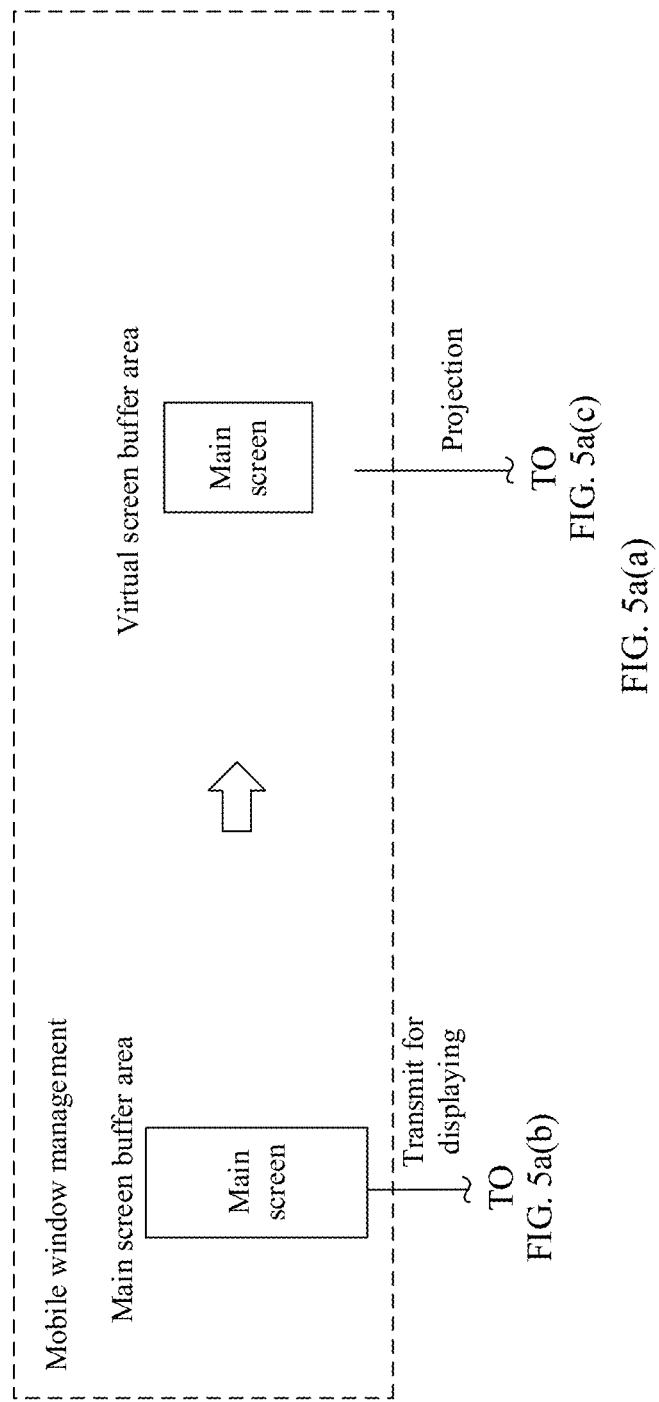

Tablet

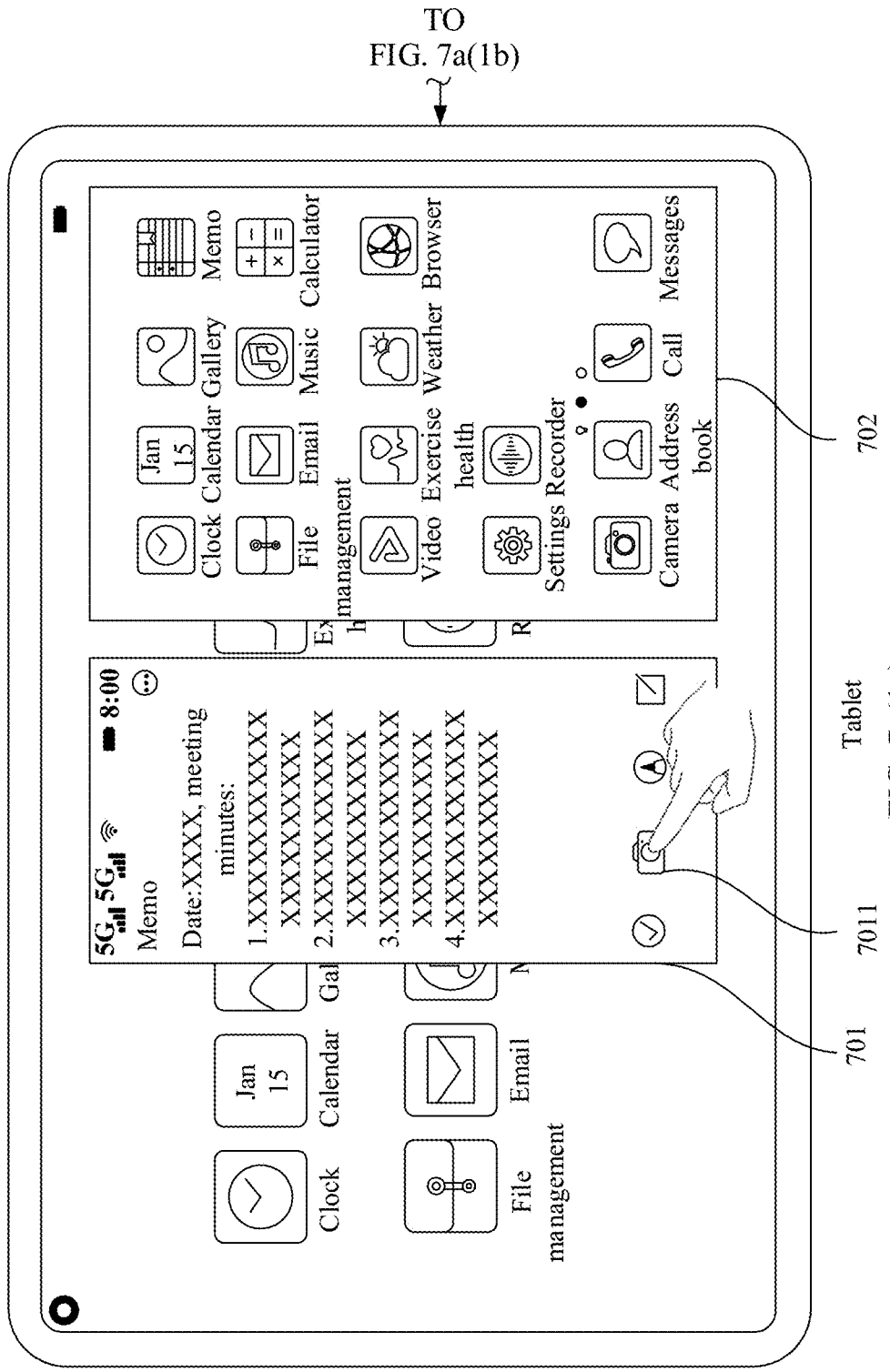

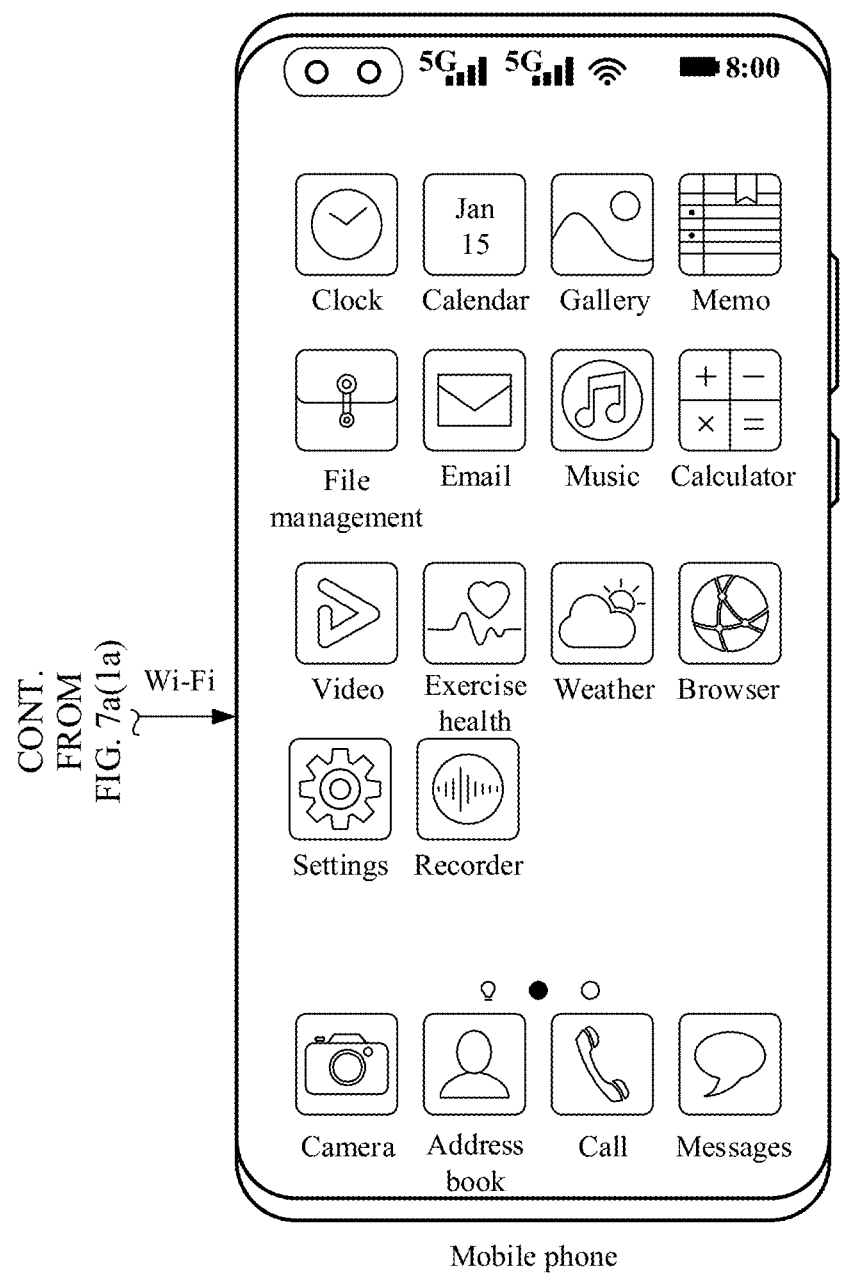
FIG. 7a(1b)

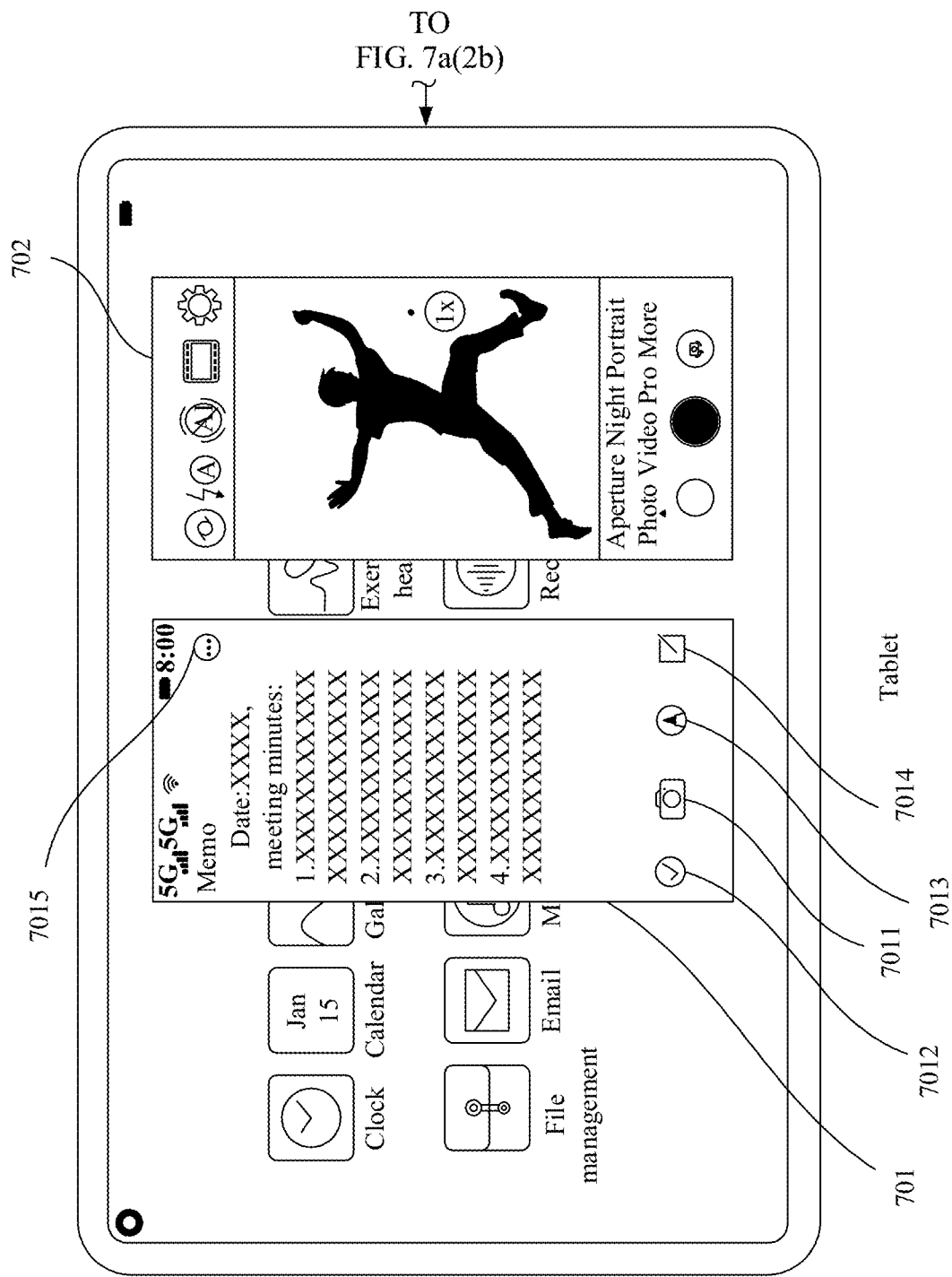
FIG. 7a(2a)

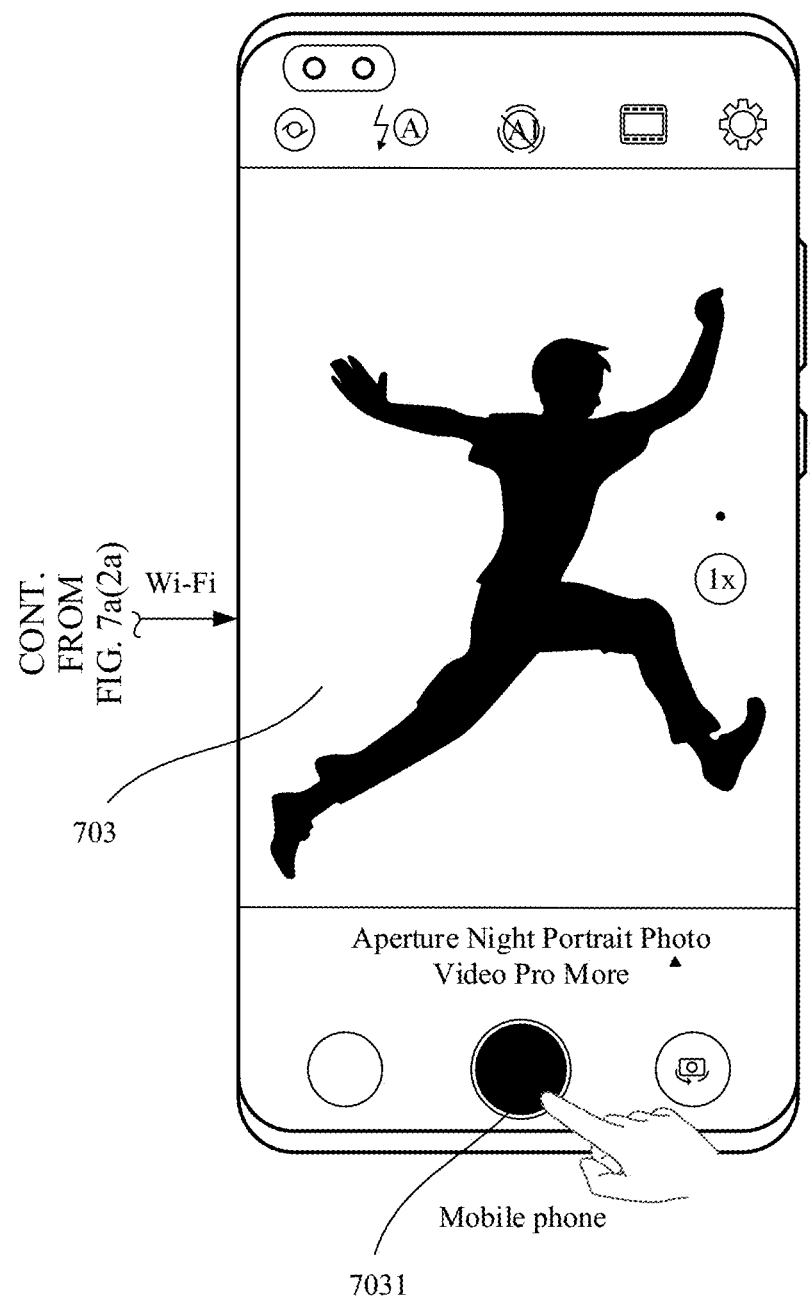
FIG. 7a(2b)

COORDINATION WINDOW PROCESSING METHOD, SYSTEM, AND ELECTRONIC DEVICE

CROSS-REFERECNE TO RELATED APPLICATIONS

This application is a national stage of International Application No. PCT/CN2022/115351, filed on Aug. 29, 2022, which claims priority to Chinese Patent Application No. 202111095503.8, filed on Sep. 17, 2021. The disclosures of both of the aforementioned applications are hereby incorporated by reference in their entireties.

TECHNICAL FIELD

This application relates to the field of terminal devices, and in particular, to a coordination window processing method and system, and an electronic device.

BACKGROUND

A plurality of terminals owned by a user may cooperate with each other to implement multi-screen coordination across devices. For example, a mobile phone projects a screen to a tablet, and one or more coordination windows of the mobile phone may be displayed on the tablet. A display interface of only one coordination window is the same as a display interface of the mobile phone. If the user taps a camera function option on an application interface displayed in a coordination window (a display interface of the coordination window is different from a display interface of the mobile phone), the interface for collecting information by the camera of the mobile phone is only displayed in the coordination window. In this case, the user needs to hold the mobile phone to collect information, but can only view an information collection status in the coordination window: The operation is extremely inconvenient.

SUMMARY

To resolve the foregoing technical problem, embodiments of this application provide a coordination window processing method and system, and an electronic device. In this method, when a user starts a camera function in an application displayed in any coordination window, an interface for collecting information by a camera of a mobile phone may be displayed on the mobile phone, thereby facilitating a user operation, and improving user experience.

According to a first aspect, an embodiment of this application provides a coordination window processing system. The system includes a first electronic device and a second electronic device, and the second electronic device is connected to the first electronic device through wireless communication. The first electronic device projects a screen to the second electronic device. The second electronic device displays a first coordination window and at least one second coordination window on a display, where a target display interface is displayed on both the first coordination window and a display of the first electronic device, the second coordination window displays a display interface of a target application in the first electronic device, and the target display interface is different from the display interface of the target application. The second electronic device sends first indication information to the first electronic device in response to a tap operation on a camera function option on a display interface of the second coordination window, where the first indication information is used to indicate the first electronic device to start a camera. The first electronic device displays, on the display of the first electronic device in response to the received first indication information, an interface on which the camera of the first electronic device collects information, and performs screen projection to enable the first coordination window to display the interface on which the camera collects information. The first electronic device obtains an information collection result corresponding to the camera function option in response to a target operation on the first electronic device, restores the display interface on the display of the first electronic device to the target display interface, and performs screen projection to restore the display interface of the first coordination window to the target display interface, so that the second coordination window displays a display interface obtained after the target application obtains the information collection result. In this way, even if a camera function task is invoked in an application displayed in a coordination window that is different from the display of the first electronic device, a display interface of the camera function task may be moved to the display of the first electronic device for displaying. In this case, the user does not need to hold the first electronic device, and can view an information collection status in the coordination window of the second electronic device, which greatly improves convenience of a user operation. In addition, when information collection is completed, the display interface of the first electronic device is restored, and the information collection result is still displayed in an original coordination window, which does not affect user experience.

For example, the target application refers to any application that can invoke a camera, and may be a photographing function of the camera, or may be a scanning function of the camera. For example, the target application may be Memo. WeChat. Taobao, or the like.

For example, the camera function option may be a photographing option (or may be referred to as a camera option). Correspondingly, the interface for capturing information by the camera may be an interface for capturing an image by the camera. An information collection result may be a collected image, video, and the like. The target operation on the first electronic device may be a tap operation on a photographing option on the interface for capturing an image by the camera.

For example, the camera function option may be a scan option, such as "Scan". Correspondingly, the interface for capturing information by the camera may be an interface for scanning an image by the camera. The information collection result can be scanned or scanned. The target operation on the first electronic device may be a mobile operation on the first electronic device.

According to the first aspect, when the camera function option is the photographing option, the first electronic device obtains a photographed image in response to a tap operation on the photographing option on the interface for capturing an image by the camera and projects a screen to display the display interface of the target application in the second coordination window, where the display interface of the target application includes the photographed image. In this way, the camera photographing interface may be moved to the display of the first electronic device, even in an application that is different from the first electronic device and that displays a coordination window: by invoking a camera task (photographing task). In this case, the user does not need to hold the first electronic device, but view an image collection status in a coordination window of the second electronic device, thereby greatly improving convenience of a user operation. In addition, when photographing is completed, a display interface of the first electronic device is restored, and a photographed image is displayed in an original coordination window, which does not affect user experience.

For example, the display interface of the target application includes a photographed image, which may be that only the photographed image is displayed on the display interface of the target application, or may be that the photographed image and other information of the target application are simultaneously displayed on the display interface of the target application.

According to the first aspect or any one of the foregoing implementations of the first aspect, in response to the tap operation on the photographing option on the interface for capturing an image by the camera, the first electronic device displays a photographing preview interface on the display of the first electronic device and displays the photographing preview interface in the first coordination window. The first electronic device obtains the photographed image in response to a tap operation on a photographing complete confirmation option on the photographing preview interface. In this way, the camera photographing interface may be moved to the display of the first electronic device, even if a camera task (photographing task) is invoked in an application displayed in a coordination window different from that displayed in the first electronic device. In this case, the user does not need to hold the first electronic device, but view an image collection status in a coordination window of the second electronic device, thereby greatly improving convenience of a user operation. In addition, when the photographing is completed, the user may view the photographing effect on the first electronic device display. Only after the user performs confirmation, the display interface of the first electronic device is restored, and the photographed image is displayed in the original coordination window: thereby improving user experience.

According to the first aspect or any one of the foregoing implementations of the first aspect, when the camera function option is a scan option, the first electronic device performs a scanning operation in response to a moving operation on the first electronic device, obtains a scanning result, and projects a screen to display a display interface of the target application in the second coordination window. The display interface of the target application includes a display interface corresponding to the scanning result. In this way, the scanning interface may be moved to the display of the first electronic device to be displayed even in an application that displays a coordination window different from that displayed on the first electronic device. In this case, the user does not need to hold the first electronic device. However, information collection and scanning are viewed in a coordination window of the second electronic device, which greatly improves convenience of a user operation. In addition, when scanning is completed, a display interface of the first electronic device is restored, and a scanning result (for example, a link interface corresponding to a two-dimensional code) is displayed in an original coordination window: which does not affect user experience.

According to the first aspect or any one of the foregoing implementations of the first aspect, before the second electronic device sends the first indication information to the first electronic device in response to the tap operation on the camera function option on the display interface of the second coordination window: the second electronic device displays, in the second coordination window, a display interface including the camera function option in response to at least one operation on the display interface of the second coordination window. In this way, regardless of whether the camera function option exists in the level menu of the target application, an interface for capturing information by the camera of the first electronic device that should be displayed in the second coordination window may be displayed on the display of the first electronic device, thereby improving user experience.

According to the first aspect or any one of the foregoing implementations of the first aspect, in response to the received first indication information, the first electronic device creates a camera function task in a target application stack by using the target application, and creates a target application first temporary stack in a first extension screen in a screen buffer of the first electronic device. The target application stack is disposed in the first extension screen, and a display interface of the first extension screen is displayed in the second collaboration window: The first electronic device ejects the camera function task from the target application stack, and pushes the camera function task into the first temporary stack of the target application. The first electronic device changes the target application first temporary stack from being disposed in the first extension screen to being disposed in the main screen in the screen buffer of the first electronic device, so as to display, on the display of the first electronic device, the interface on which the camera of the first electronic device collects information. The display of the first electronic device and the first coordination window display a display interface of the main screen. The first electronic device destroys the target application first temporary stack, so as to restore the display interface on the display of the first electronic device to the target display interface. In this way, the camera function task of the target application is moved from the first extension screen to the main screen for a target application that adapts to single-application multi-task (that is, adapts to a system migration coordination window capability, and supports multi-window startup), so that an interface for capturing information by the camera of the first electronic device that should be displayed in the second coordination window is displayed on the display of the first electronic device. In addition, when the camera function task of the target application moves to the main screen, the target application may further provide a function corresponding to another task for the user to use.

According to the first aspect or any implementation of the foregoing first aspect, the first electronic device creates a camera function task in the target application stack by using the target application in response to the received first indication information. The target application stack is disposed in a first extension screen in a screen buffer of the first electronic device, and a display interface of the first extension screen is displayed in a second coordination window: The first electronic device changes the target application stack from being disposed in the first extension screen to being disposed in the main screen in the screen buffer of the first electronic device, so as to display, on the display of the first electronic device, an interface on which the camera of the first electronic device collects information. The display of the first electronic device and the first coordination window display a display interface of the main screen. The first electronic device destroys the camera function task in the target application stack, and restores the target application stack from being disposed in the main screen to being disposed in the first extension screen, so as to restore the display interface on the display of the first electronic device to the target display interface. In this way, for a target application that does not adapt to single-application multi-task (that is, a capability of not adapting to a system to move a coordination window), an entire target application stack is moved from the first extension screen to the main screen, so that the interface for collecting information by the camera of the first electronic device that should be displayed in the second coordination window can be displayed on the display of the first electronic device. Moreover, there is no need to make any change to the target application.

According to the first aspect or any implementation of the foregoing first aspect, the first electronic device creates a camera function task in the target application stack by using the target application in response to the received first indication information. The target application stack is disposed in a first extension screen in a screen buffer of the first electronic device, and a display interface of the first extension screen is displayed in the second coordination window. The first electronic device creates a target application second temporary stack in a main screen in the screen buffer of the first electronic device. The display of the first electronic device and the first coordination window display a display interface of the main screen. The first electronic device ejects the camera function task from the target application stack, and pushes the camera function task into the target application second temporary stack, so as to display: on the display of the first electronic device, the interface on which the camera of the first electronic device collects information. The first electronic device destroys the target application second temporary stack, so as to restore the display interface on the display of the first electronic device to the target display interface. In this way, the camera function task of the target application is moved from the first extension screen to the main screen for the target application that does not adapts to single-application multi-task (that is, does not adapts to a capability of moving a coordination window by a system), so that the interface for collecting information by the camera of the first electronic device that should be displayed in the second coordination window can be displayed on the display of the first electronic device.

According to the first aspect or any one of the foregoing implementations of the first aspect, after creating the camera function task in the target application stack, the first electronic device sends second indication information to the second electronic device, where the second indication information is used to indicate the second electronic device to freeze the display interface of the second coordination window: The second electronic device freezes the display interface of the second coordination window in response to the received second indication information. In this way, for a target application that does not adapt to single-application multi-task, when a camera function task of the target application is moved from the second coordination window to the display of the mobile phone, a function corresponding to another task of the target application cannot be provided for use by the user, but the original coordination window for displaying the target application is locked in a screen freezing manner, which does not affect visual experience of the user.

According to the first aspect or any one of the foregoing implementations of the first aspect, in response to the received second indication information, the second electronic device takes a screenshot of the second coordination window to obtain a screenshot image. The second electronic device displays the screenshot image in the second coordination window in a locked manner, so as to freeze the display interface of the second coordination window. In this way, the second electronic device takes a screenshot of the original coordination window that displays the target application according to an instruction of the first electronic device, and implements freezing of the coordination window in a manner of locking the screenshot image in the coordination window, which does not affect visual experience of the user.

According to the first aspect or any one of the foregoing implementations of the first aspect, the second electronic device obtains, in response to the received second indication information, a display image sent by the first electronic device. The display image is obtained by the first electronic device by taking a screenshot of the first extension screen. The display image is locked and displayed in the second coordination window to freeze the display interface of the second coordination window: In this way, the first electronic device screenshots the first extension screen, and sends the screenshot image to the second electronic device, so that the second electronic device freezes the original coordination window for displaying the target application, which does not affect visual experience of the user.

According to the first aspect or any one of the foregoing implementations of the first aspect, after obtaining the information collection result corresponding to the camera function option, the first electronic device sends third indication information to the second electronic device, where the third indication information is used to indicate the second electronic device to unfreeze the display interface of the second coordination window: The second electronic device unfreezes the display interface of the second coordination window in response to the received third indication information, and displays the display interface of the first extension screen in the second coordination window: In this way, when the camera of the first device completes information collection, display of the second coordination window that displays the target application is restored, and use experience of the user is not affected.

According to the first aspect or any implementation of the foregoing first aspect, the first electronic device includes a mobile phone, and the second electronic device includes a computer, a tablet, and a television.

According to a second aspect, an embodiment of this application provides a coordination window processing method. The method includes: A first electronic device projects a screen to a second electronic device. The second electronic device displays a first coordination window and at least one second coordination window on a display: where a target display interface is displayed on both the first coordination window and a display of the first electronic device, the second coordination window displays a display interface of a target application in the first electronic device, and the target display interface is different from the display interface of the target application. The second electronic device sends first indication information to the first electronic device in response to a tap operation on a camera function option on a display interface of the second coordination window: where the first indication information is used to indicate the first electronic device to start a camera. The first electronic device displays, on the display of the first electronic device in response to the received first indication information, an interface on which the camera of the first electronic device collects information, and performs screen projection to enable the first coordination window to display the interface on which the camera collects information. The first electronic device obtains an information collection result corresponding to the camera function option in response to a target operation on the first electronic device, restores the display interface on the display of the first electronic device to the target display interface, and performs screen projection to restore the display interface of the first coordination window to the target display interface, so that the second coordination window displays a display interface obtained after the target application obtains the information collection result.

According to the second aspect, when the camera function option is a photographing option, the interface on which the camera collects information includes an interface for capturing an image by the camera: and the obtaining, by the first electronic device, an information collection result corresponding to the camera function option in response to a target operation on the first electronic device, and performing screen projection, so that the second coordination window displays a display interface obtained after the target application obtains the information collection result includes: The first electronic device obtains a photographed image in response to a tap operation on the photographing option on the interface for capturing an image by the camera, and performs screen projection to enable the second coordination window to display the display interface of the target application, where the display interface of the target application includes the photographed image.

According to the second aspect or any one of the foregoing implementations of the second aspect, the obtaining, by the first electronic device, a photographed image in response to a tap operation on the camera option on the interface on which the camera collects information includes: in response to the tap operation on the photographing option on the interface for capturing an image by the camera, displaying, by the first electronic device, a photographing preview interface on the display of the first electronic device and displaying the photographing preview interface in the first coordination window: and obtaining, by the first electronic device, the photographed image in response to a tap operation on a photographing complete confirmation option on the photographing preview interface.

According to the second aspect or any one of the foregoing implementations of the second aspect, when the camera function option is a scan option, the obtaining, by the first electronic device, an information collection result corresponding to the camera function option in response to a target operation on the first electronic device, and performing screen projection, so that the second coordination window displays a display interface obtained after the target application obtains the information collection result includes: in response to a moving operation on the first electronic device, performing, by the first electronic device, a scanning operation to obtain a scanning result, and performing screen projection to enable the second coordination window to display the display interface of the target application, where the display interface of the target application includes a display interface corresponding to the scanning result.

According to the second aspect or any one of the foregoing implementations of the second aspect, before the sending, by the second electronic device, first indication information to the first electronic device in response to a tap operation on a camera function option on a display interface of the second coordination window: the method further includes: displaying, by the second electronic device in the second coordination window: a display interface including the camera function option in response to at least one operation on the display interface of the second coordination window.

According to the second aspect or any one of the foregoing implementations of the second aspect, the displaying, by the first electronic device on the display of the first electronic device in response to the received first indication information, an interface on which the camera of the first electronic device collects information, and performing screen projection to enable the first coordination window to display the interface on which the camera collects information includes: in response to the received first indication information, creating, by the first electronic device, a camera function task in a target application stack by using the target application, and creating a target application first temporary stack in a first extension screen in a screen buffer of the first electronic device, where the target application stack is disposed in the first extension screen, and a display interface of the first extension screen is displayed in the second collaboration window; ejecting, by the first electronic device, the camera function task from the target application stack, and pushing the camera function task into the target application first temporary stack: and changing, by the first electronic device, the target application first temporary stack from being disposed in the first extension screen to being disposed in a main screen in the screen buffer of the first electronic device, so as to display, on the display of the first electronic device, the interface on which the camera of the first electronic device collects information, where the display of the first electronic device and the first coordination window display a display interface of the main screen: and the restoring, by the first electronic device, the display interface on the display of the first electronic device to the target display interface includes: destroying, by the first electronic device, the target application first temporary stack, so as to restore the display interface on the display of the first electronic device to the target display interface.

According to the second aspect or any one of the foregoing implementations of the second aspect, the displaying, by the first electronic device on the display of the first electronic device in response to the received first indication information, an interface on which the camera of the first electronic device collects information, and performing screen projection to enable the first coordination window to display the interface on which the camera collects information includes: in response to the received first indication information, creating, by the first electronic device, a camera function task in a target application stack by using the target application, where the target application stack is disposed in a first extension screen in a screen buffer of the first electronic device, and a display interface of the first extension screen is displayed in the second coordination window: changing, by the first electronic device, the target application stack from being disposed in the first extension screen to being disposed in a main screen in the screen buffer of the first electronic device, to display, on the display of the first electronic device, the interface on which the camera of the first electronic device collects information, where the display of the first electronic device and the first coordination window display a display interface of the main screen. The restoring, by the first electronic device, the display interface on the display of the first electronic device to the target display interface includes: destroying, by the first electronic device, the camera function task in the target application stack, and restoring the target application stack from being disposed in the main screen to being disposed in the first extension screen, so as to restore a display interface on the display of the first electronic device to the target display interface.

According to the second aspect or any one of the foregoing implementations of the second aspect, the displaying, by the first electronic device on the display of the first electronic device in response to the received first indication information, an interface on which the camera of the first electronic device collects information, and performing screen projection to enable the first coordination window to display the interface on which the camera collects information includes: in response to the received first indication information, creating, by the first electronic device, a camera function task in a target application stack by using the target application, where the target application stack is disposed in a first extension screen in a screen buffer of the first electronic device, and a display interface of the first extension screen is displayed in the second coordination window; creating, by the first electronic device, a target application second temporary stack in a main screen in the screen buffer of the first electronic device, where the display of the first electronic device and the first coordination window display a display interface of the main screen; and ejecting, by the first electronic device, the camera function task from the target application stack, and pushing the camera function task into the target application second temporary stack, so as to display: on the display of the first electronic device, the interface on which the camera of the first electronic device collects information: and the restoring, by the first electronic device, the display interface on the display of the first electronic device to the target display interface includes: destroying, by the first electronic device, the target application second temporary stack, so as to restore the display interface on the display of the first electronic device to the target display interface.

According to the second aspect or any one of the foregoing implementations of the second aspect, the method further includes: after the camera function task is created in the target application stack, sending, by the first electronic device, second indication information to the second electronic device, where the second indication information is used to indicate the second electronic device to freeze the display interface of the second coordination window; and freezing, by the second electronic device, the display interface of the second coordination window in response to the received second indication information.

According to the second aspect or any one of the foregoing implementations of the second aspect, the freezing, by the second electronic device, the display interface of the second coordination window in response to the received second indication information includes: in response to the received second indication information, taking, by the second electronic device, a screenshot of the second coordination window to obtain a screenshot image; and displaying, by the second electronic device, the screenshot image in the second coordination window in a locked manner, so as to freeze the display interface of the second coordination window.

According to the second aspect or any one of the foregoing implementations of the second aspect, the freezing, by the second electronic device, the display interface of the second coordination window in response to the received second indication information includes: in response to the received second indication information, obtaining, by the second electronic device, a display image sent by the first electronic device, where the display image is obtained by the first electronic device by taking a screenshot of the first extension screen: and displaying, by the second electronic device, the display image in the second coordination window in a locked manner, so as to freeze the display interface of the second coordination window.

According to the second aspect or any one of the foregoing implementations of the second aspect, the method further includes: sending, by the first electronic device, third indication information to the second electronic device after obtaining the information collection result corresponding to the camera function option, where the third indication information is used to indicate the second electronic device to unfreeze the display interface of the second coordination window; and unfreezing, by the second electronic device, the display interface of the second coordination window in response to the received third indication information, and displaying the display interface of the first extension screen in the second coordination window;

According to the second aspect or any implementation of the foregoing second aspect, the first electronic device includes a mobile phone, and the second electronic device includes a computer, a tablet, and a television.

The second aspect and any implementation of the second aspect are respectively corresponding to the first aspect and any implementation of the first aspect. For a technical effect corresponding to the second aspect and any implementation of the second aspect, refer to the technical effect corresponding to the first aspect and any implementation of the first aspect. Details are not described herein again.

According to a third aspect, an embodiment of this application provides a coordination window processing method. The method includes: A first electronic device projects a screen to a second electronic device, so that the second electronic device displays a first coordination window and at least one second coordination window on a display, where a target display interface is displayed on both the first coordination window and a display of the first electronic device, the second coordination window displays a display interface of a target application in the first electronic device, and the target display interface is different from the display interface of the target application. The first electronic device displays, on the display of the first electronic device in response to the received first indication information, an interface on which the camera of the first electronic device collects information, and performs screen projection to enable the first coordination window to display the interface on which the camera collects information, where the first indication information is used to indicate the first electronic device to start the camera. The first electronic device obtains an information collection result corresponding to the camera function option in response to a target operation on the first electronic device, restores the display interface on the display of the first electronic device to the target display interface, and performs screen projection to restore the display interface of the first coordination window to the target display interface, so that the second coordination window displays a display interface obtained after the target application obtains the information collection result.

The third aspect and any implementation of the third aspect are respectively corresponding to the first aspect and any implementation of the first aspect. For a technical effect corresponding to the third aspect and any implementation of the third aspect, refer to the technical effect corresponding to the first aspect and any implementation of the first aspect. Details are not described herein again.

According to a fourth aspect, an embodiment of this application provides a coordination window processing method. The method includes: A second electronic device receives a screen projected by a first electronic device, and displaying a first coordination window and at least one second coordination window on a display, where a target display interface is displayed on both a display of the first coordination window and a display of the first electronic device: and the second coordination window displays a display interface of a target application in the first electronic device, and the target display interface is different from the display interface of the target application. The second electronic device sends first indication information to the first electronic device in response to a tap operation on a camera function option on a display interface of the second coordination window, where the first indication information is used to indicate the first electronic device to start a camera. The second electronic device receives a screen projected by the first electronic device, and displays, in the first coordination window; an interface for capturing information by the camera. The second electronic device receives a screen projected by the first electronic device, restores the display interface of the first coordination window to the target display interface, and displays, in the second coordination window; the display interface on which the target application obtains the information collection result.

The fourth aspect and any implementation of the fourth aspect are respectively corresponding to the first aspect and any implementation of the first aspect. For a technical effect corresponding to the fourth aspect and any implementation of the fourth aspect, refer to the technical effect corresponding to the first aspect and any implementation of the first aspect. Details are not described herein again.

According to a fifth aspect, an embodiment of this application provides an electronic device. The electronic device includes a memory and a processor. The processor is coupled to the memory. The memory stores a program instruction. When the program instruction is executed by the processor, the electronic device performs the coordination window processing method in the third aspect and any one of the third aspect, or the electronic device performs the coordination window processing method in the fourth aspect and any one of the fourth aspect.

The fifth aspect and any implementation of the fifth aspect are respectively corresponding to the first aspect and any implementation of the first aspect. For a technical effect corresponding to the fifth aspect and any implementation of the fifth aspect, refer to the technical effect corresponding to the first aspect and any implementation of the first aspect. Details are not described herein again.

According to a sixth aspect, an embodiment of this application provides a computer readable storage medium. The computer readable storage medium includes a computer program. When the computer program runs on the electronic device, the electronic device performs the coordination window processing method executed by the first electronic device or the second electronic device in the second aspect and the second aspect, or the electronic device performs the coordination window processing method in the third aspect and any implementation of the third aspect, or the electronic device performs the coordination window processing method in the fourth aspect and any implementation of the fourth aspect.

DESCRIPTION OF EMBODIMENTS

Figure 1A:
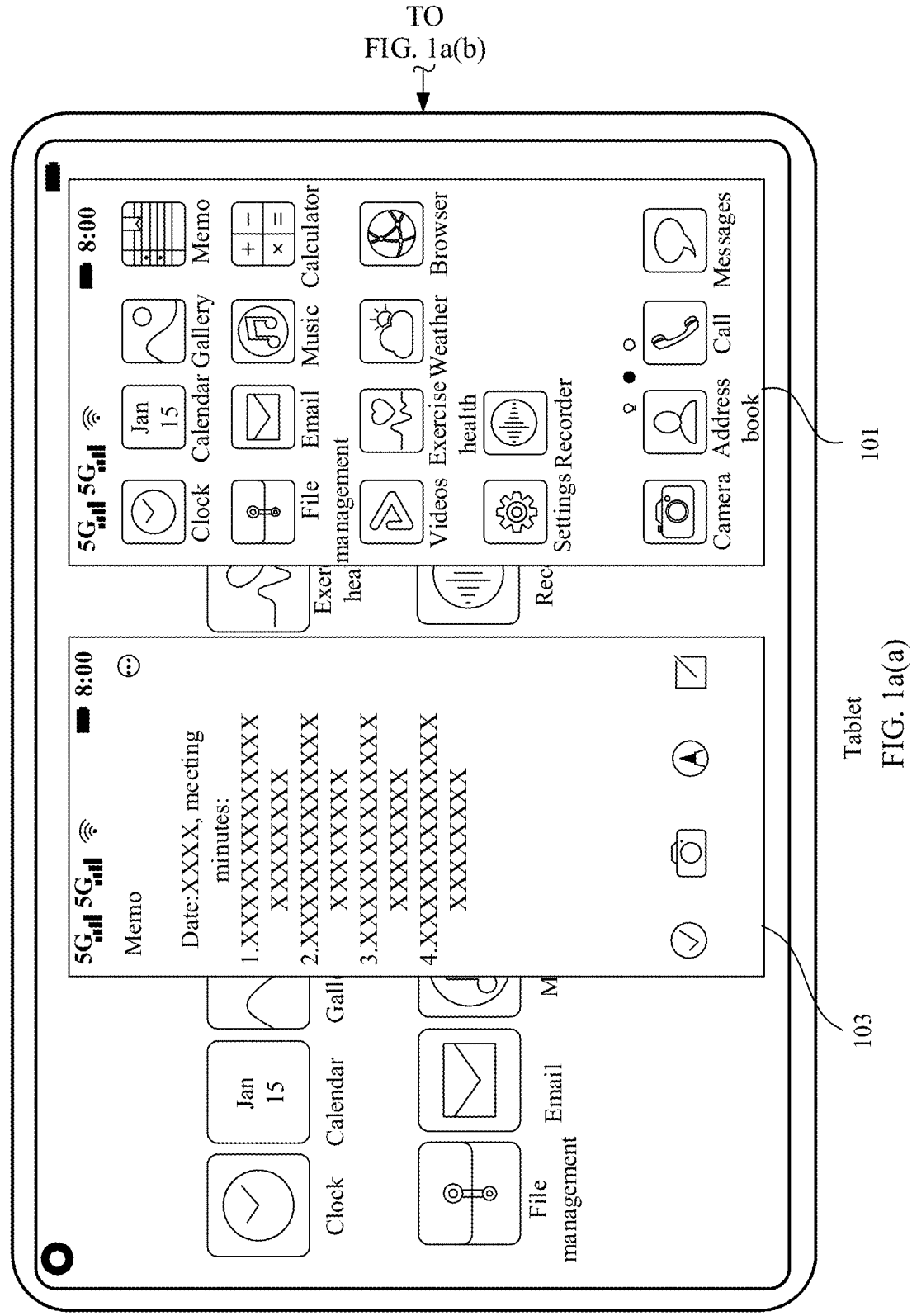
FIG. 1a(a)~FIG. 1c(b) are schematic diagrams of application scenarios shown by way of example.
Figure 1A:
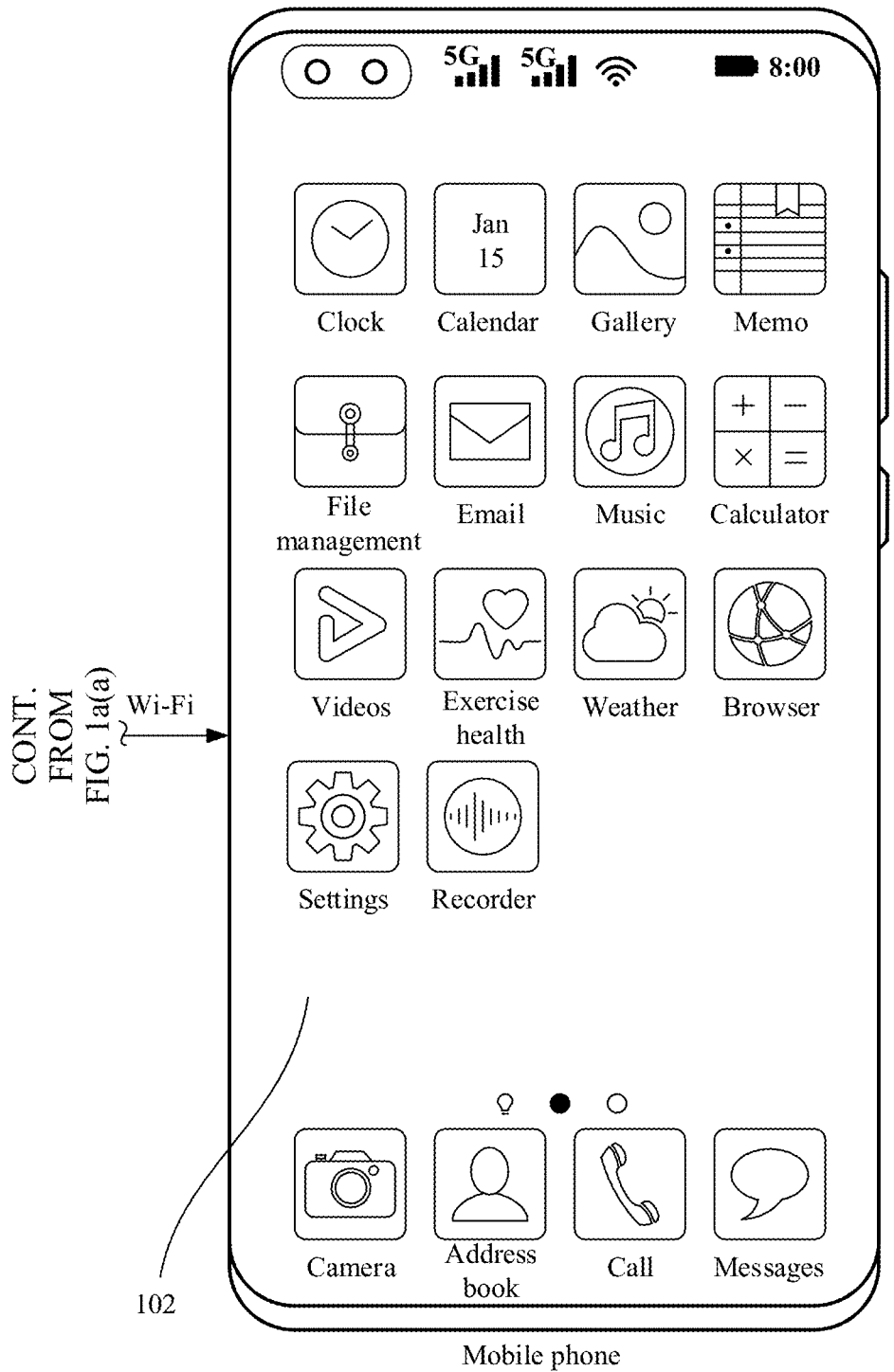

The following clearly and completely describes the technical solutions in embodiments of this application with reference to the accompanying drawings in the embodiments of this application. Apparently, the described embodiments are merely some rather than all of embodiments of this application. Based on the embodiments of this application, all other embodiments obtained by a person of ordinary skill in the art without creative efforts fall within the protection scope of this application.

In this specification, the term "and/or" is merely an association relationship for describing associated objects, and indicates that three relationships may exist. For example, A and/or B may indicate that A exists separately, both A and B exist, and B exists separately.

The terms "first" and "second" in the specification and claims of the embodiments of this application are used to distinguish between different objects, and are not used to describe a specific sequence of objects. For example, a first target object and a second target object are used to distinguish between different target objects, and are not used to describe a specific order of the target objects.

In the embodiments of this application, words such as "exemplary" or "example" are used to indicate instances, illustrations, or descriptions. Any embodiment or design solution described as "exemplary" or "example" in the embodiments of this application should not be construed as being more preferred or advantageous than other embodiments or design solutions. Specifically, the use of words such as "exemplary" or "example" is intended to present concepts in a specific manner.

In the description of the embodiments of this application, unless otherwise stated, "a plurality of" means two or more.

For example, a plurality of processing units refer to two or more processing units, and a plurality of systems refer to two or more systems.

In an application scenario, a screen of a second electronic device may display a coordination window generated after a first electronic device projects a screen to the second electronic device. A quantity of coordination windows may be one or more, and a desktop of the first electronic device may be displayed in the coordination window; or a display interface of any application in the first electronic device may be displayed in the coordination window; In embodiments of this application, this scenario is referred to as a multi-screen coordination scenario, or may be named another scenario, such as coordination negotiation, which is not limited thereto. In a multi-screen coordination scenario, a plurality of terminals owned by a user may cooperate to implement multi-screen coordination across devices. For example, a mobile phone implements multi-screen coordination with terminals such as a smart television, a personal computer (Personal Computer. PC), and a tablet computer. For another example, a tablet computer implements multi-screen coordination with terminals such as a smart television and a PC, so as to provide continuous service experience for the user. A communication connection needs to be established between terminals that implement multi-screen coordination, which may be a wired communication connection or a wireless communications connection. A wireless communications solution may include wireless fidelity (wireless fidelity. Wi-Fi), Bluetooth (bluetooth. BT), a global navigation satellite system (global navigation satellite system. GNSS), frequency modulation (frequency modulation. FM), near field communication (near field communication. NFC), and an infrared (infrared. IR) technology.

Figure 1B:
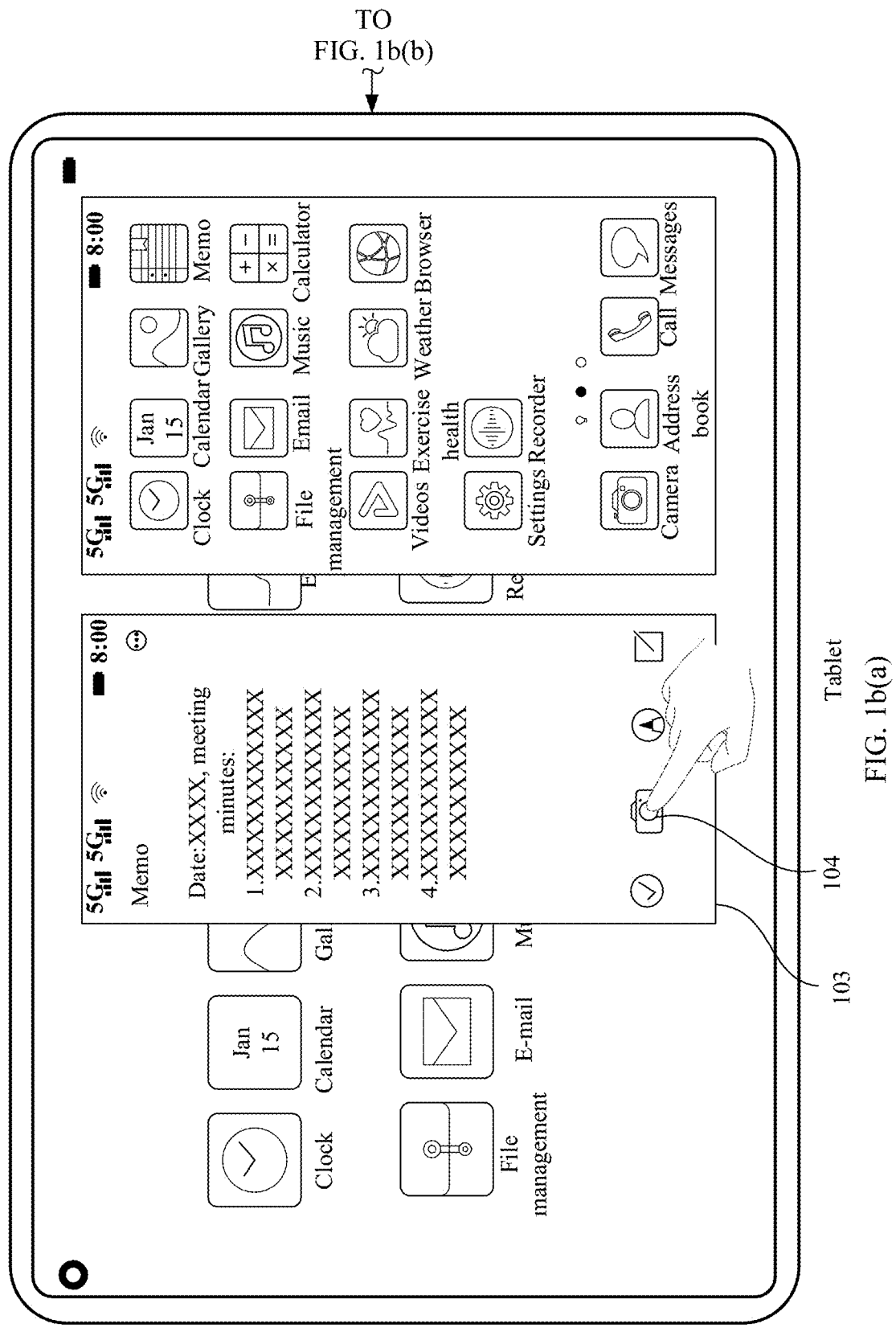
Figure 1B:
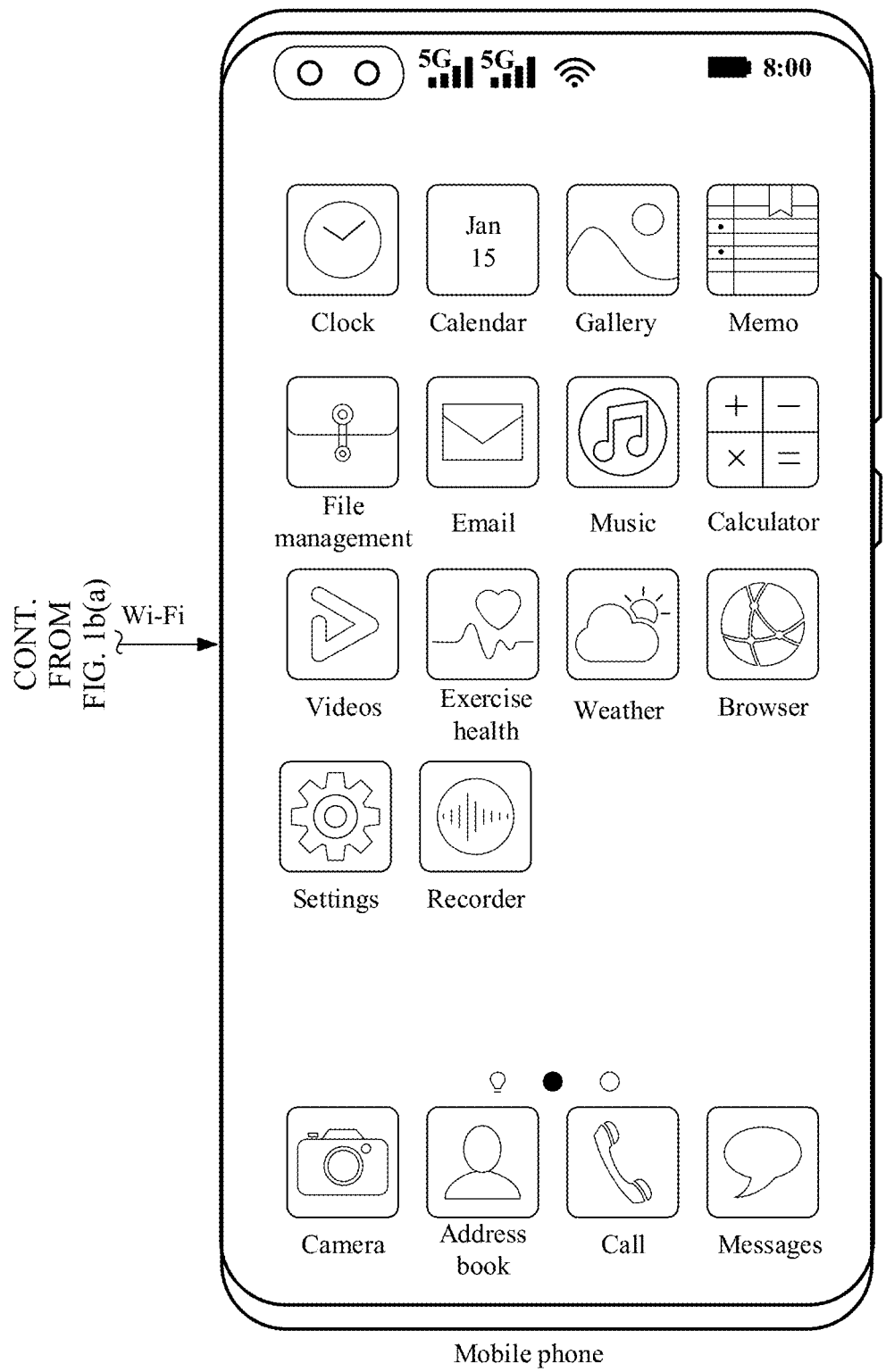
Figure 1C:
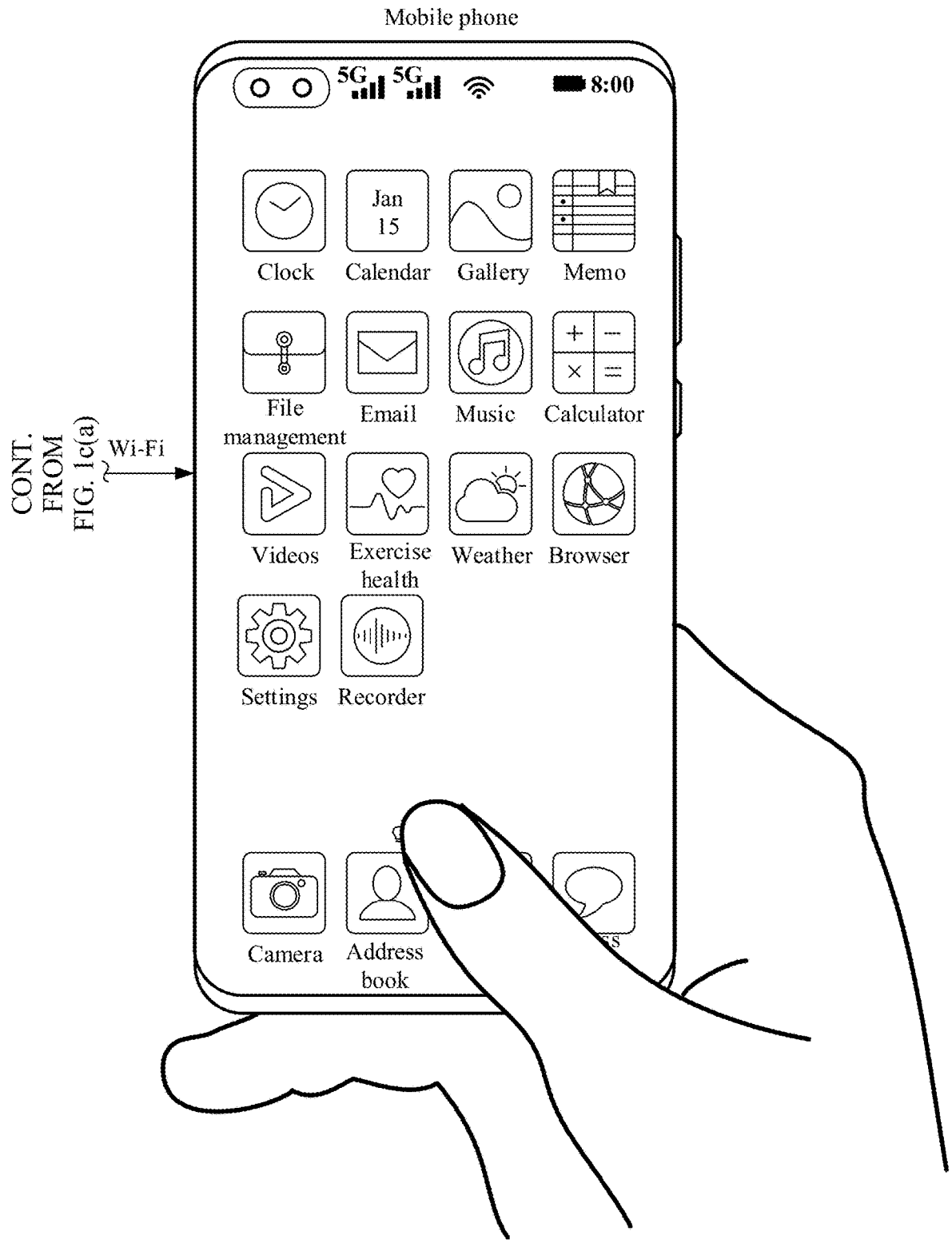

FIG. 1a(a)~FIG. 1c(b) are schematic diagrams of application scenarios shown by way of example. As shown in FIG. 1a(a) and FIG. 1a(b), in an example in which a mobile phone and a tablet implement multi-screen coordination by using a Wi-Fi connection, after a multi-screen coordination connection is established between the mobile phone and the tablet, a coordination window 101 is displayed on a display interface of the tablet (which may be any area on the tablet), and a display interface of the mobile phone is always displayed in the coordination window 101, that is, all controls and images included in the display interface 102 of the mobile phone are displayed in the coordination window 101 in real time. When a user opens an application (for example, Memo) in the coordination window 101 of the tablet, and Memo is opened in a new window; the tablet receives an operation of the user, and sends the user operation (including a pressure value and location coordinates corresponding to the user operation) to the mobile phone. The mobile phone may obtain an operation behavior of the user on the coordination window 101 of the tablet. The mobile phone sends a display interface of Memo to the tablet in response to the operation behavior of the user. Correspondingly: the tablet displays a coordination window 103 on the display interface (which may be any area on the tablet) of the tablet based on the interface sent by the mobile phone, and displays the display interface of Memo in the coordination window 103.

As shown in FIG. 1b(a) and FIG. 1b(b), when the user needs to use a camera function of Memo, the user taps a camera option (also referred to as a photographing option) 104 of Memo displayed in the coordination window 103 of the tablet, and the tablet receives the user operation, and sends the user operation (including a pressure value and location coordinates corresponding to the user operation) to the mobile phone. The mobile phone obtains an operation behavior of the user on the coordination window 103 of the tablet, and the mobile phone sends a camera photographing interface of Memo to the tablet in response to the operation behavior of the user. Correspondingly, the tablet displays, based on the interface sent by the mobile phone, the camera photographing interface of Memo in the coordination window 103 of the tablet, as shown in FIG. 1c(a) and FIG. 1c(b). It should be noted that the display interface in the coordination window 101 of the tablet is always consistent with the display interface 102 of the mobile phone.

As shown in FIG. 1c(a) and FIG. 1c(b), the image in the camera photographing interface of Memo in the coordination window 103 of the tablet is collected by using a camera (a rear camera or a front camera) of the mobile phone, but the image captured by the camera of the mobile phone is not displayed in the display interface of the mobile phone. In this case, the user needs to hold the mobile phone with one hand (for example, the right hand) to capture an image, and view an image collection status in the camera photographing interface of Memo in the coordination window 103 of the tablet, and when determining that the image in the camera photographing interface of Memo in the coordination window 103 of the tablet meets a requirement of the user, the user taps, with the other hand (for example, the left hand), a photographing option 105 on the camera photographing interface of Memo in the coordination window 103 of the tablet, to complete an image photographing operation. In this way, in a multi-screen coordination application scenario, the user needs to hold the mobile phone with one hand to capture an image. Because the image collection status is not displayed on the display interface of the mobile phone, the user can only observe the image collection status displayed on the camera photographing interface of Memo in the coordination window 103 of the tablet, and when determining that the image collection status meets a requirement of the user, the user taps the photographing option 105 in the camera photographing interface of Memo in the coordination window 103 of the tablet by using the other hand, so as to complete image photographing, which undoubtedly increases inconvenience of the user operation.

Figure 2:
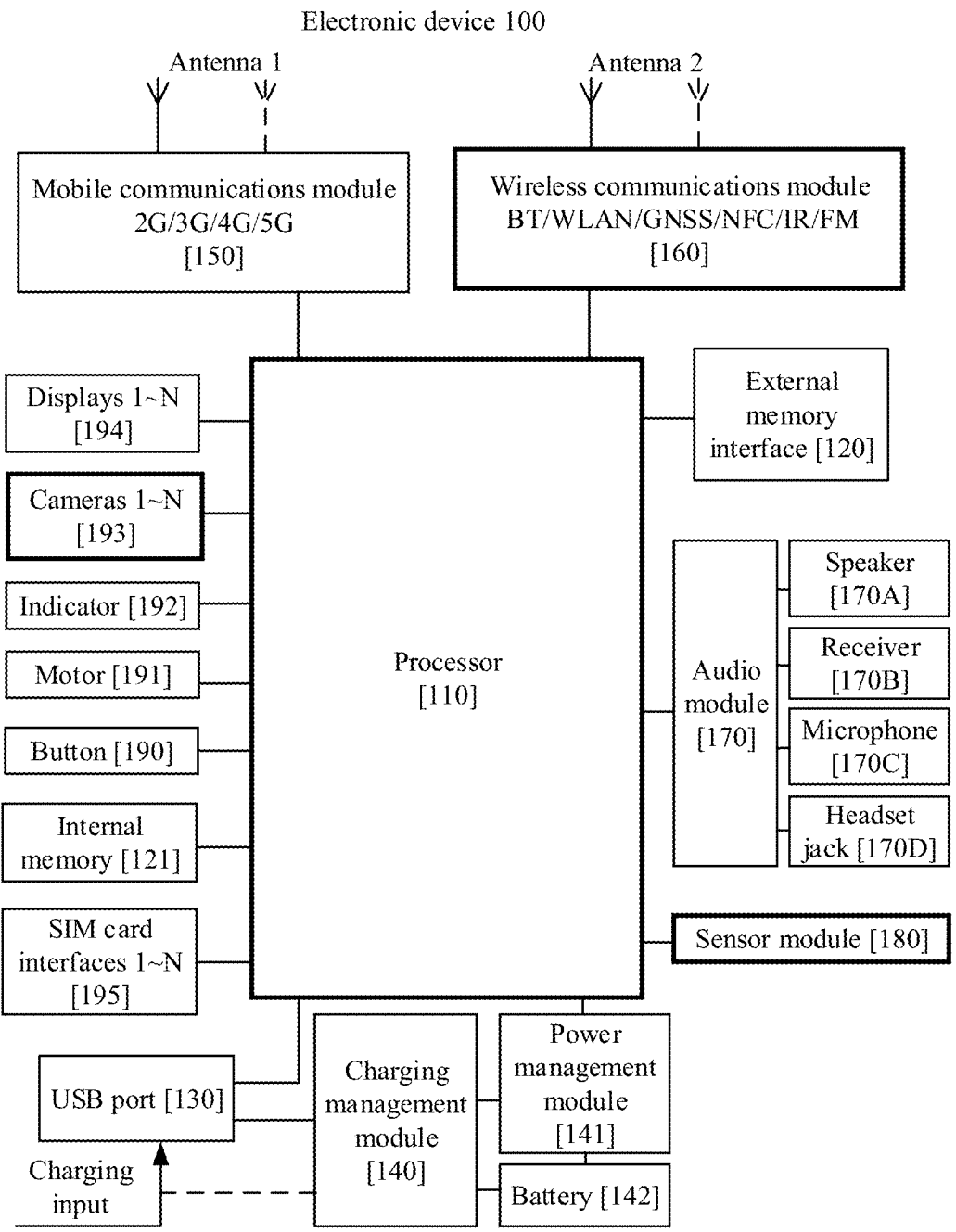
FIG. 2 is a schematic diagram of a structure of an electronic device shown by way of example.

FIG. 2 is a schematic diagram of a structure of an electronic device 100. Optionally, the electronic device 100 may be a terminal, or may be referred to as a terminal device. The terminal may be a device with a camera such as a cellular phone (cellular phone) or a pad (pad), which is not limited in this application. It should be noted that the schematic structural diagram of the electronic device 100 may be applied to the mobile phone in FIG. 1a(a)~FIG. 1c(b), and may be applied to the tablet in FIG. 1a(a)~FIG. 1c(b). It should be understood that the electronic device 100 shown in FIG. 2 is only an example of an electronic device, and the electronic device 100 may have more or fewer components than those shown in the figure, and may combine two or more components, or may have different component configurations. The various components shown in FIG. 2 may be implemented in hardware including one or more signal processing and/or application-specific integrated circuits, software, or a combination of hardware and software.

The electronic device 100 may include a processor 110, an external memory interface 120, an internal memory 121, a universal serial bus (universal serial bus. USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, and a subscriber identification module (subscriber identification module, SIM) card interface 195. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a neural center and a command center of the electronic device 100. The controller may generate an operation control signal based on an instruction operation code and a time sequence signal, to control instruction reading and instruction execution.

A memory may be disposed in the processor 110, and is configured to store an instruction and data. In some embodiments, the memory in the processor 110 is a cache memory.

The USB port 130 is an interface that meets a USB standard specification, and may be specifically a Mini USB port, a Micro USB port, a USB Type C port, or the like. The USB port 130 may be configured to connect to a charger to charge the electronic device 100, may be configured to transmit data between the electronic device 100 and a peripheral device, and may further be configured to connect to a headset to play audio by using the headset. The port may be further configured to connect to another electronic device, such as an AR device.

The charging management module 140 is configured to receive a charging input from a charger. The charger may be a wireless charger, or may be a wired charger. In some wired charging embodiments, the charging management module 140 may receive a charging input of a wired charger through the USB port 130. In some wireless charging embodiments, the charging management module 140 may receive a wireless charging input by using a wireless charging coil of the electronic device 100. While charging the battery 142, the charging management module 140 may further supply power to the electronic device by using the power management module 141.

The power management module 141 is configured to connect the battery 142, the charging management module 140, and the processor 110. The power management module 141 receives input of the battery 142 and/or the charging management module 140, and supplies power to the processor 110, the internal memory 121, the external memory, the display 194, the camera 193, the wireless communications module 160, and the like.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover a single or a plurality of communication frequency bands. Different antennas may be multiplexed to improve antenna utilization. For example, the antenna 1 may be multiplexed into a diversity antenna of a wireless local area network. In other embodiments, the antenna may be used in combination with a tuning switch.

The mobile communications module 150 may provide a wireless communication solution, including 2G/3G/4G/5G or the like, that is applied to the electronic device 100. The mobile communications module 150 may include at least one filter, a switch, a power amplifier, a low noise amplifier (low noise amplifier, LNA), and the like.

The wireless communications module 160 may provide a wireless communication solution such as wireless local area networks (wireless local area networks, WLAN) (such as a Wi-Fi network). Bluetooth, GNSS, FM, NFC, and IR that are applied to the electronic device 100.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology.

The electronic device 100 implements a display function by using the GPU, the display 194, the application processor, and the like. The GPU is a microprocessor for image processing, and is connected to the display 194 and the application processor. The GPU is configured to perform mathematical and geometrical calculation, and is configured to perform graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display. LCD), an organic light-emitting diode (organic light-emitting diode. OLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, and converts the electrical signal into an image that can be seen. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and the image is projected to the light-sensitive element. The light-sensitive element may be a charge coupled device (charge coupled device. CCD) or a complementary metal-oxide-semiconductor (complementary metal-oxide-semiconductor. CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts MPEG) 1, MPEG 2, MPEG 3, and MPEG 4.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external memory card.

The internal memory 121 may be configured to store computer-executable program code, where the computer-executable program code includes instructions. The processor 110 executes various functional applications and data processing of the electronic device 100 by running an instruction stored in the internal memory 121, so that the electronic device 100 implements the coordination window processing method in the embodiments of this application. The internal storage 121 may include a program storage area and a data storage area. The program storage area may store an operating system, an application program (for example, a sound play back function or an image playback function) required by at least one function, and the like. The data storage area may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

The electronic device 100 may implement audio functions by using the audio module 170, the speaker 170A, the receiver 170B, the microphone 270C, the headset jack 170D, the application processor, and the like. The audio functions are, for example, music playback and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The pressure sensor is configured to sense a pressure signal, and may convert the pressure signal into an electrical signal. In some embodiments, the pressure sensor may be disposed on the display 194. There are many types of pressure sensors, such as a resistive pressure sensor, an inductive pressure sensor, and a capacitive pressure sensor. The electronic device 100 may calculate a touch position based on a detected signal of the pressure sensor. In some embodiments, touch operations that are performed at a same touch location but have different touch operation strength may correspond to different operation instructions. For example, when a touch operation whose touch operation strength is less than a first pressure threshold acts on the Messages application icon, an instruction for viewing an SMS message is executed. When a touch operation whose touch operation strength is greater than or equal to the first pressure threshold is performed on the Messages application icon, an instruction for creating a new SMS message is executed.

The touch sensor is also referred to as a "touch panel". The touch sensor may be disposed on the display 194. The touch sensor and the display 194 form a touchscreen, which is also referred to as a "touch screen". The touch sensor is configured to detect a touch operation performed on or near the touch sensor. The touch sensor may transfer a detected touch operation to the application processor to determine a touch event type. A visual output related to a touch operation may be provided by using the display 194. In some other embodiments, the touch sensor may alternatively be disposed on a surface of the electronic device 100 at a position different from a position of the display 194.

The button 190 includes a power-on button, a volume button, and the like. The button 190 may be a mechanical button, or may be a touch-sensitive button. The electronic device 100 may receive a button input, and generate a button signal input related to user setting and function control of the electronic device 100.

The motor 191 may generate a vibration prompt. The motor 191 may be used for an incoming call vibration prompt, or may be used for touch vibration feedback. For example, touch operations performed on different applications (for example, photographing and audio playback) may correspond to different vibration feedback effects.

The indicator 192 may be an indicator light, and may be used to indicate a charging status or a power change, or may be used to indicate a message, a missed call, a notification, or the like.

A software system of the electronic device 100 may use a hierarchical architecture, an event-driven architecture, a microkernel architecture, a microservice architecture, or a cloud architecture. In embodiments of this application, an Android system with a layered architecture is used as an example to describe a software structure of the electronic device 100.

Figure 3:
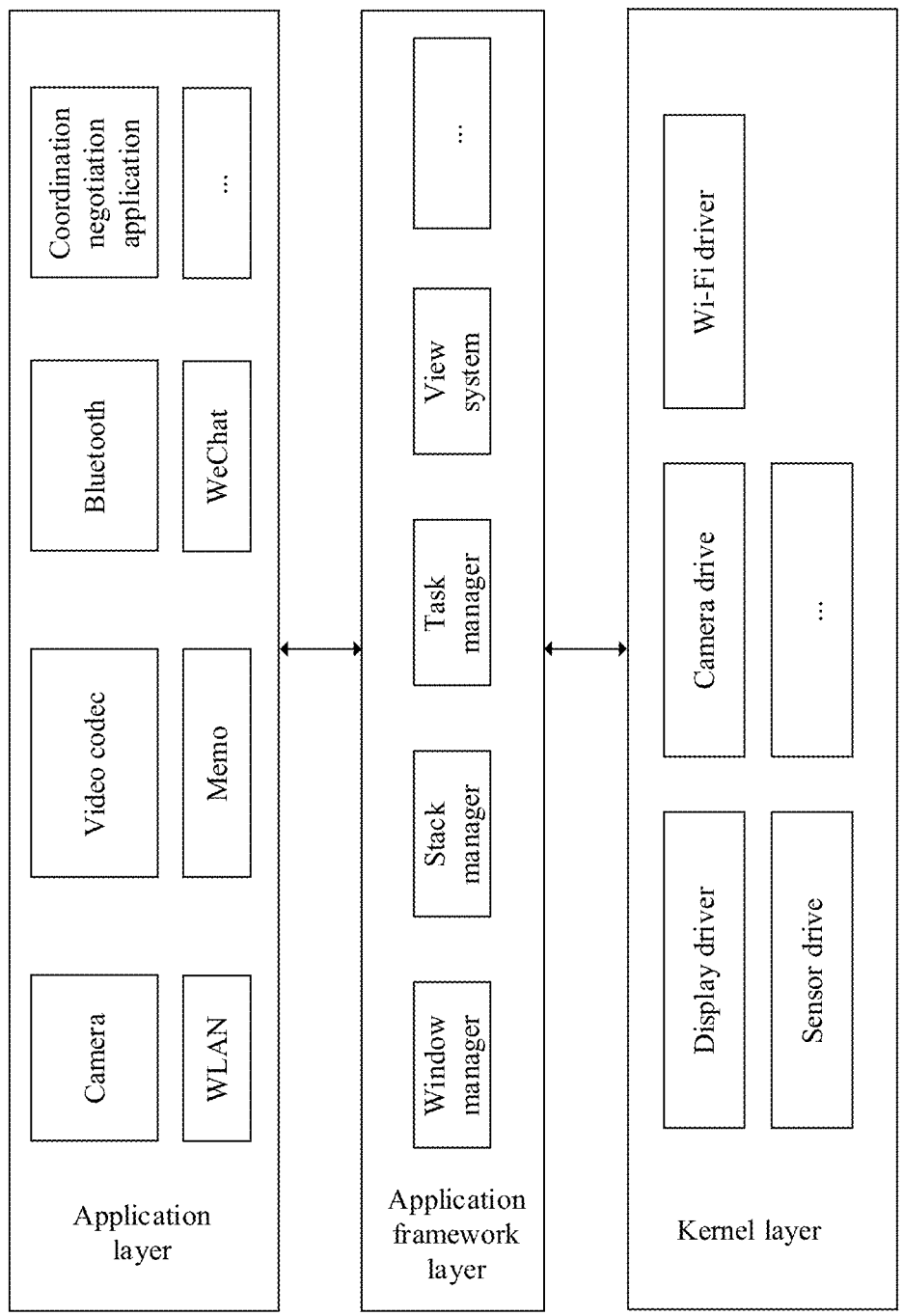
FIG. 3 is a schematic diagram of a software structure of an electronic device shown by way of example.

FIG. 3 is a schematic block diagram of a software structure of the electronic device 100 according to an embodiment of this application.

In the layered architecture of the electronic device 100, software is divided into several layers, and each layer has a clear role and task. Layers communicate with each other by using software interfaces. In some embodiments, the Android system is divided into three layers: an application layer, an application framework layer, and a kernel layer.

The application layer may include a series of application packages.

As shown in FIG. 3, the application package may include applications such as Camera, Video codec, Bluetooth, Coordination negotiation application, WLAN, Memo, and WeChat. The coordination negotiation application is used to implement multi-screen coordination.

The application framework layer provides an application programming interface (application programming interface, API) and a programming framework for applications at the application layer. The application framework layer includes some predefined functions.

As shown in FIG. 3, the application framework layer may include a window (windows) manager, a stack (stack) manager, a task (task) manager, a content provider, a view system, a phone manager, a resource manager, a notification manager, and the like.

The window manager is used to manage window programs. The window manager may obtain a size of a display, determine whether there is a status bar, lock a screen, take a screenshot, and the like.

The stack manager is used to manage stack programs. The stack manager may release and establish a correspondence between a stack and a task.

The task manager is used to manage task programs. The task manager can load a content layout of a task according to window parameters of a stack.

The view system includes visual controls, such as a control for displaying text, a control for displaying pictures, and the like. The view system may be used to construct an application. A display interface may include one or more views. For example, a display interface including a message notification icon may include a view for displaying text and a view for displaying pictures.

The notification manager enables an application to display notification information in a status bar, and may be configured to convey a notification type message, where the displayed notification information may automatically disappear after a short pause and require no user interaction.

The kernel layer is a layer between hardware and software. The kernel layer includes at least a display driver, a camera driver, a Wi-Fi driver, a sensor driver, and the like.

It may be understood that a layer in the software structure shown in FIG. 3 and a component included in each layer do not constitute a specific limitation on the electronic device 100. In other embodiments of this application, the electronic device 100 may include more or fewer layers than those shown in the figure, and each layer may include more or fewer components, which is not limited in this application.

It may be understood that, to implement the coordination window processing method in the embodiments of this application, the electronic device includes hardware and/or software modules corresponding to each function. With reference to the examples described in the embodiments disclosed in this specification, the units and algorithm steps may be implemented in a form of hardware or a combination of hardware and computer software. Whether a function is executed in a hardware or computer software-driven hardware manner depends on a specific application and design constraint condition of a technical solution. A person skilled in the art may use different methods for each specific application to implement the described functions, but this implementation should not be considered to be beyond the scope of this application.

Before the coordination window processing method provided in the embodiments of this application is described, an implementation in which a mobile phone and a tablet perform multi-screen coordination according to embodiments of this application is described.

Figure 4:
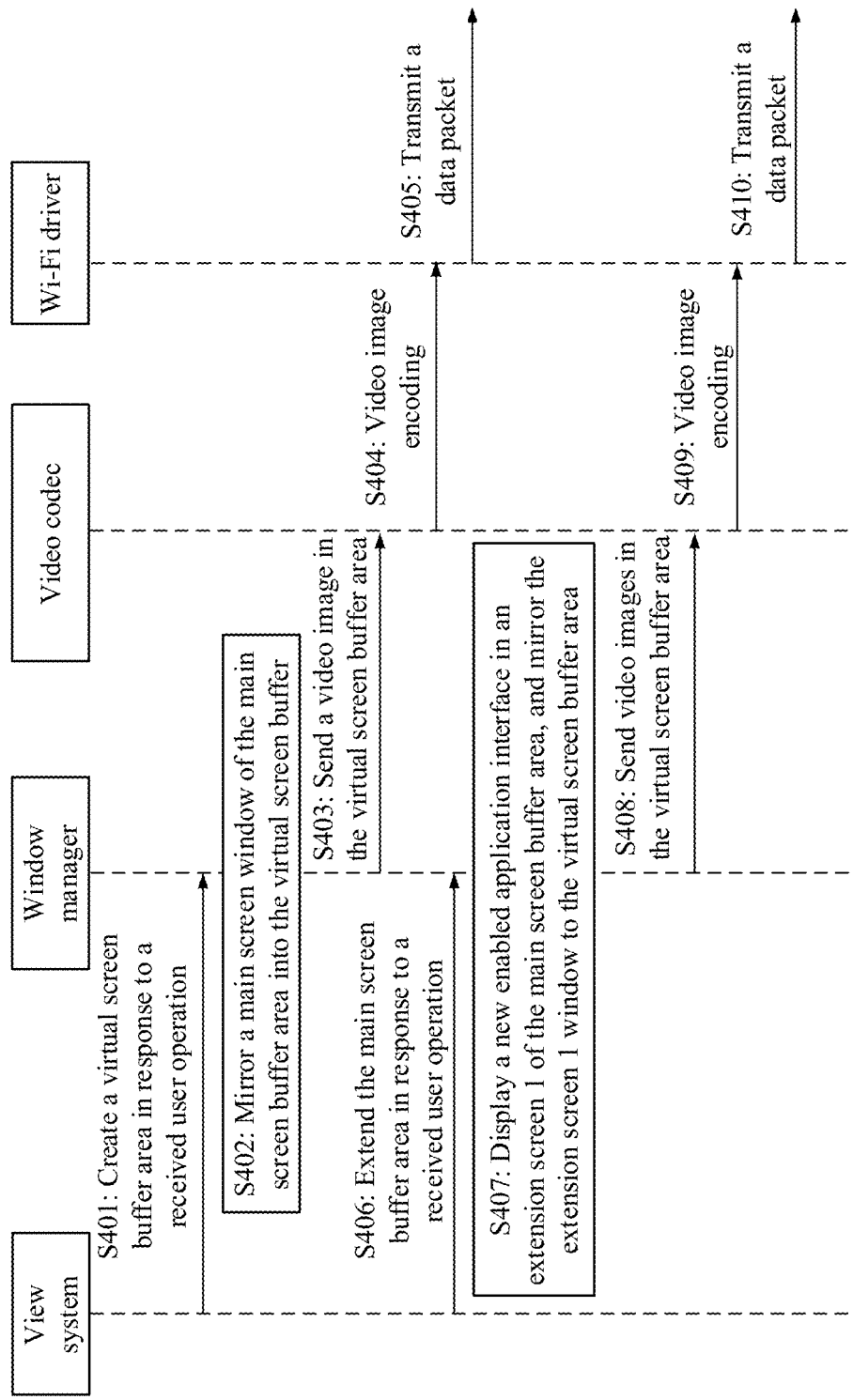
FIG. 4 is a schematic diagram of module interaction according to an embodiment of this application.
Figure 5A:
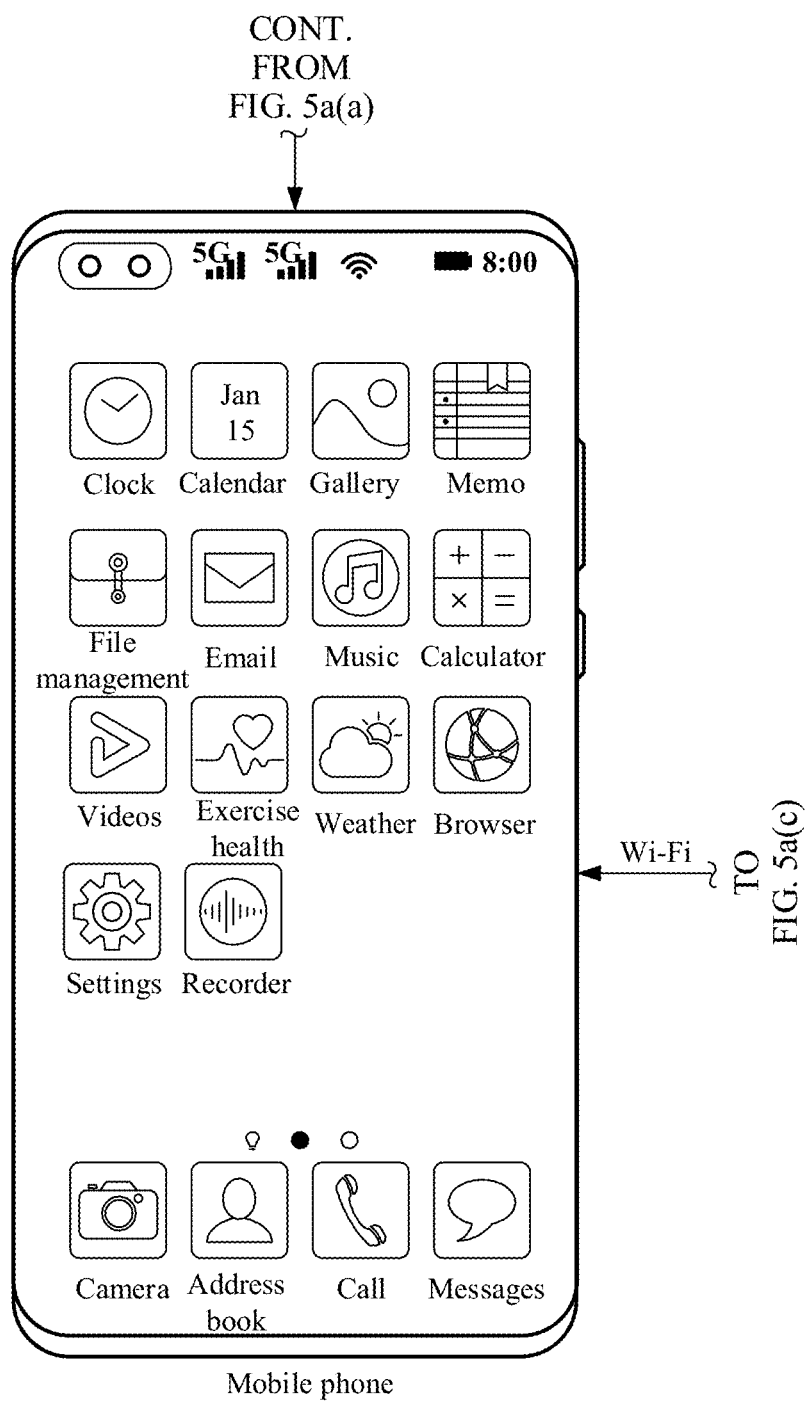
FIG. 5a(a)~FIG. 5b(c) are schematic diagrams of application scenarios shown by way of example.
Figure 5A:
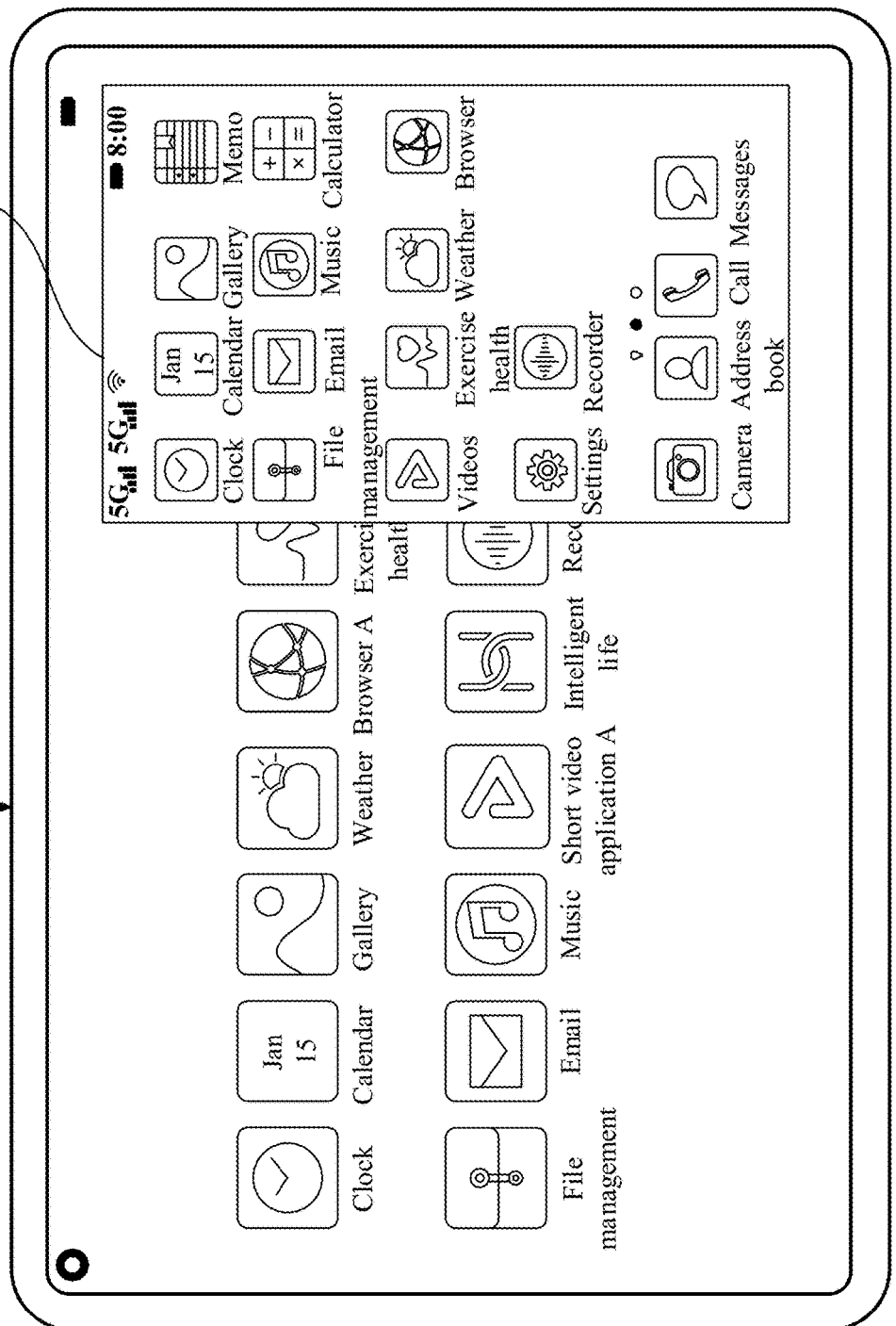
Figure 5B:
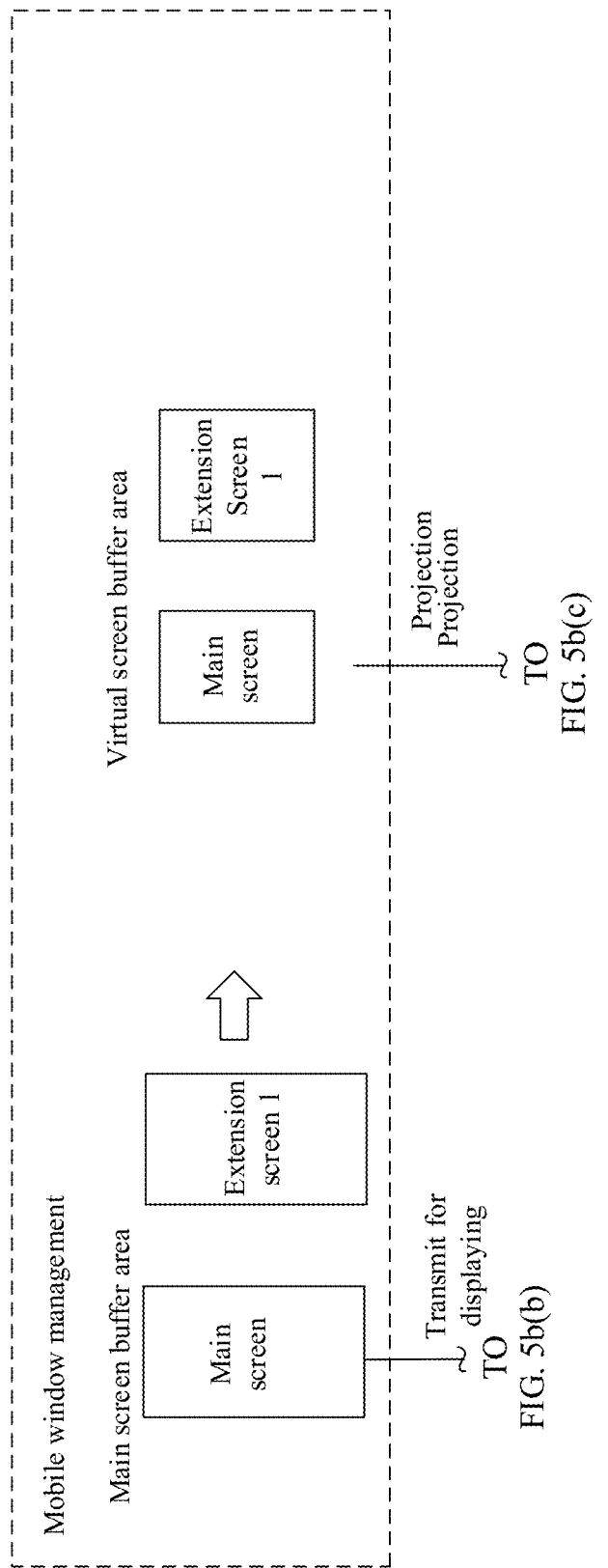
Figure 5B:
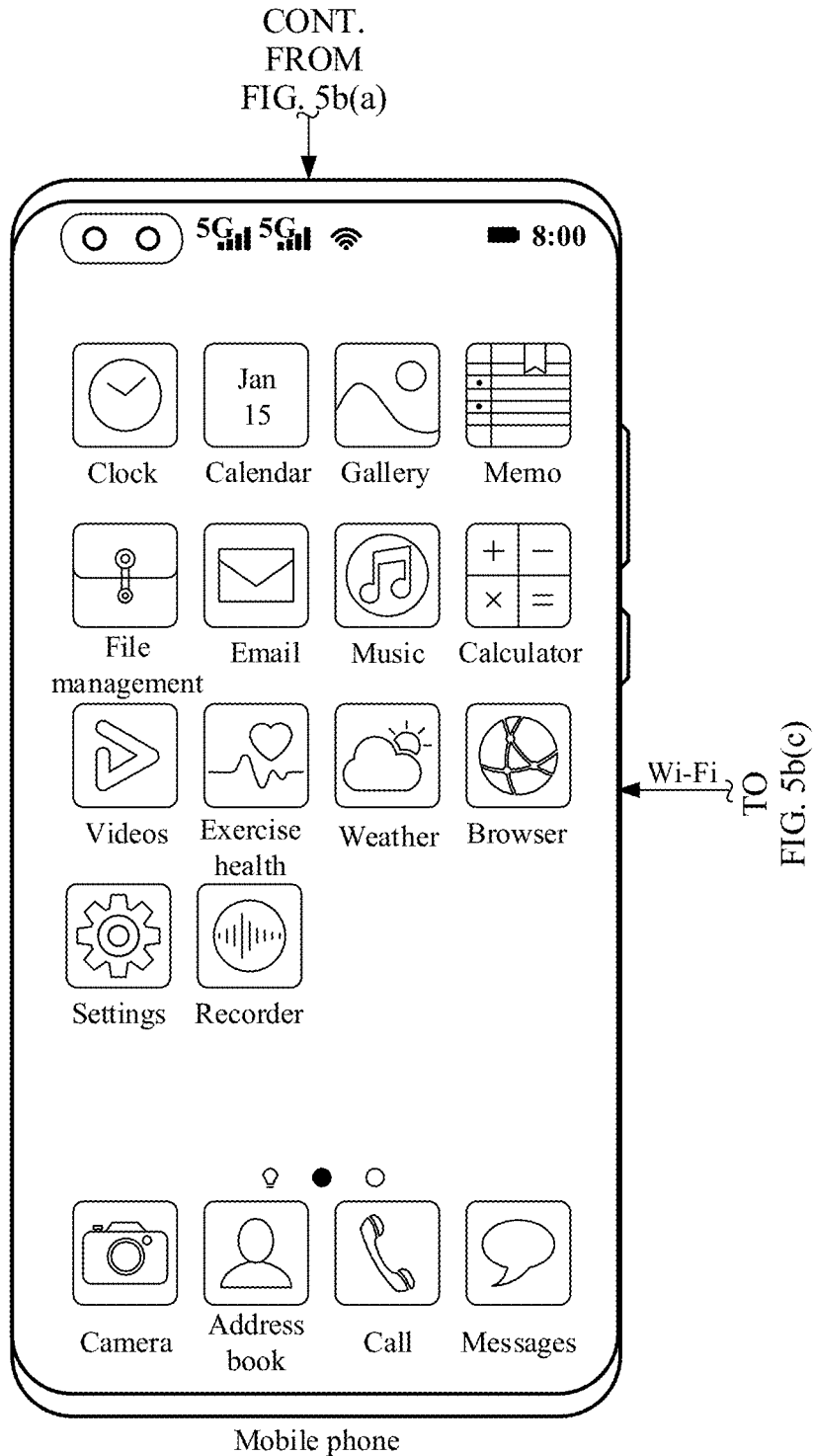
Figure 5B:
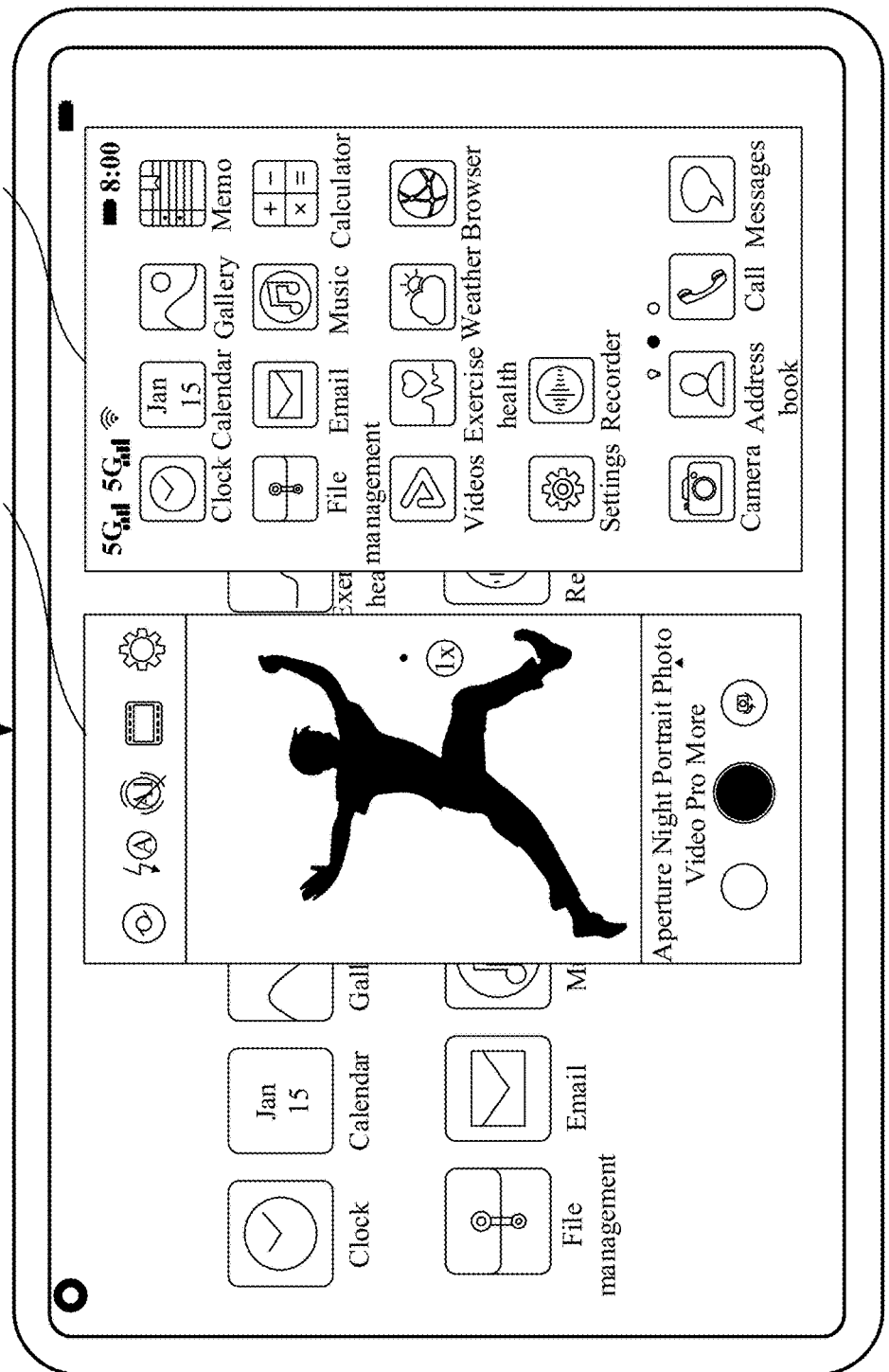

In an example, with reference to a schematic diagram of an interaction procedure of modules shown in FIG. 4 and schematic diagrams of application scenarios shown in FIG. 5a(a)~FIG. 5b(c), an implementation process of multi-screen coordination between a mobile phone and a tablet is described in detail. As shown in FIG. 4, the method specifically includes the following steps.

S401: A view system creates a virtual screen buffer in response to a received user operation.

For example, when a user needs to perform multi-screen coordination between the mobile phone and the tablet, the user taps a function option for agreeing to enable multi-screen coordination on the tablet. In response to the operation behavior of the user, the tablet scans an electronic device (such as a mobile phone) that can establish a multi-screen coordination connection nearby, and initiates a multi-screen coordination connection request to the scanned electronic device. If the discovered mobile phone is not an electronic device that the user wants to perform multi-screen coordination, the user may tap the "Scan for connection" option in the prompt box on the tablet, so that the tablet initiates a multi-screen coordination connection request to a specified electronic device in a code scanning manner. After the mobile phone receives the multi-screen coordination request sent by the tablet, a prompt box is displayed on a display interface on the mobile phone side. For example, the prompt box may include but is not limited to an option of a device that is to establish a multi-screen coordination connection, a "Cancel" option, and a "Connect" option. The user taps the "Connect" option, and the view system of the mobile phone establishes a multi-screen coordination connection with the tablet in response to the operation behavior of the user, and creates a virtual screen buffer.

In this example, the virtual screen buffer is relative to a main screen buffer, and a main screen window in the main screen buffer is directly displayed on a main screen of the mobile phone. That is, a display interface of the main screen of the mobile phone is always consistent with an interface of the main screen window in the main screen buffer area. Each screen window in the virtual screen buffer is projected to the tablet for displaying, for example, a Cast+ projection manner may be used.

S402: A window manager mirrors the main screen window of the main screen buffer into the virtual screen buffer.

Each screen window in the virtual screen buffer may be obtained by mirroring each screen window in the main screen buffer. For example, because the screen resolution of the mobile phone is higher than the screen resolution of the tablet, the window manager may scale down the pixel sizes of the screen windows in the main screen buffer before mirroring to the virtual screen buffer.

S403: The window manager sends a video image in the virtual screen buffer to a video codec.

In this step, the virtual screen buffer includes only the main screen window; Correspondingly, the video image in the virtual screen buffer sent by the window manager is optionally a video image displayed in the main screen window;

S404: The video codec encodes the video image.

For example, after receiving the video image sent by the window manager, the video codec encodes the video image to generate a video image frame.

S405: A Wi-Fi driver encapsulates the video image frame into a data packet and transmits the data packet to a multi-screen coordination terminal.

After receiving the video image frame sent by the video codec, the Wi-Fi driver encapsulates the video image frame to generate a data packet, and transmits the data packet to the multi-screen coordination terminal. In this example, the mobile phone transmits, to the tablet, the data packet generated after the video image frame is encapsulated by the Wi-Fi driver. After receiving the data packet, a Wi-Fi driver of the tablet decapsulates the data packet to obtain the video image frame, and sends the video data frame to a video codec of the tablet. The video codec of the tablet decodes the received video image frame, and sends the decoded video image to a window manager of the tablet. The window manager of the tablet displays the received video image in a coordination window displayed on the display interface of the tablet.

As shown in FIG. 5a(a)~FIG. 5a(c), after the view system of the mobile phone creates the virtual screen buffer, the window manager mirrors the main screen window in the main screen buffer into the virtual screen buffer. In this case, a coordination window 501 is displayed on the display interface of the tablet (which may be any area on the tablet). The main screen window in the main screen buffer is directly sent to the display interface of the mobile phone for displaying, and the main screen window in the virtual screen buffer is projected to the coordination window 501 on the display interface of the tablet. Because the main screen window in the virtual screen buffer and the main screen window in the main screen buffer are in a mirror-image relationship, a display interface in the coordination window 501 on the display interface of the tablet is always consistent with the display interface of the mobile phone.

S406: The view system extends the main screen buffer in response to a received user operation.

For example, the user taps (for example, double tap to enable) a new application in the coordination window 501 on the display interface of the tablet. That the new application is Camera is used as an example. In response to an operation behavior of the user, the coordination window on the display interface of the tablet sends tap coordinates of the operation of the user to a coordination negotiation application of the tablet. The coordination negotiation application of the tablet determines a tap pointer corresponding to the tap coordinates, and sends the tap pointer to a coordination negotiation application of the mobile phone. The coordination negotiation application of the mobile phone receives the tap pointer, and sends an enable request to the camera application in response to the user operation corresponding to the tap pointer. When the camera application is enabled, indication information is sent to the window manager, and the window manager sends a display instruction to the view system according to the indication information. The view system displays a camera interface in the main screen window in the main screen buffer according to the display instruction. Meanwhile, the window manager mirrors the camera interface to the main screen window in the virtual screen buffer. In this case, the camera interface is displayed in both the display interface of the mobile phone and the coordination window 501 of the display interface of the tablet.

When the user needs to display the camera interface in a new window, exemplarily, the user taps the "Open in a new window" option in the coordination window 501 (an exemplary name, which may also be referred to as the "Open the application in a new window" option, or the like). In response to the operation behavior of the user, the coordination window on the display interface of the tablet sends tap coordinates of the user operation to the coordination negotiation application of the tablet. The coordination negotiation application of the tablet determines a tap pointer corresponding to the tap coordinates, and sends the tap pointer to a coordination negotiation application of the mobile phone. The coordination negotiation application of the mobile phone receives the tap pointer, and sends indication information to the view system in response to the user operation corresponding to the tap pointer. The indication information may be used to indicate the view system to perform an extension operation on the main screen buffer. After receiving the indication information, the view system extends the main screen buffer according to the indication information. After the view system extends the main screen buffer, the window manager may create an extension screen window in an extended area in the main screen buffer. In this case, in addition to the main screen window; the main screen buffer may further include one or more extension screen windows. That the following main screen buffer includes an extension screen 1 window is used as an example for description.

S407: The window manager displays a new enabled application interface in the extension screen 1 of the main screen buffer, and mirrors the extension screen 1 window to the virtual screen buffer.

The window manager displays a new enabled application interface, such as a camera interface, in the expansion screen 1 window of the main screen buffer. In this case, an interface before the new application is enabled is displayed in the main screen window of the main screen buffer, for example, a main view (desktop application) of the mobile phone is displayed. Correspondingly, after screen window image mirroring between the main screen buffer and the virtual screen buffer, the interface before the new application is enabled is displayed in the main screen window of the virtual screen buffer, for example, a main view (desktop application) of the mobile phone is displayed, and the new application interface, that is, the camera interface, is displayed in the extension screen 1 window of the virtual screen buffer.

S408: The window manager sends video images in the virtual screen buffer to the video codec.

In this step, the virtual screen buffer includes not only the main screen window; but also the extension screen 1 window; Correspondingly, the video images in the virtual screen buffer that are sent by the window manager include not only a video image displayed in the main screen window; but also a video image displayed in the expansion screen 1 window; For example, video images that belongs to different screen windows in the virtual screen buffer carry corresponding screen window identifiers, for example, screen window IDs, so that the window manager of the tablet classifies the video images and displays the video images in different coordination windows.

S409: The video codec encodes the video images.

For an explanation and description of S409, refer to S404. Details are not described herein again.

S410: The Wi-Fi driver encapsulates video image frames into a data packet and transmits the data packet to the multi-screen coordination terminal.

For an explanation and description of S410, refer to S405. Details are not described herein again.

The window manager of the tablet displays the received video images in a plurality of coordination windows displayed on the display interface of the tablet. For example, the window manager of the tablet classifies the received video images according to the screen window identifiers carried in the video images, and displays the video images in different coordination windows.

As shown in FIG. 5b(a)~FIG. 5b(c), after the view system of the mobile phone extends the main screen buffer, the window manager creates an extension screen 1 window in the main screen buffer, and mirrors the main screen window and the extension screen 1 window in the main screen buffer to the main screen window and the extension screen 1 window in the virtual screen buffer. In this case, the coordination window 501 and the coordination window 502 are displayed on the display interface of the tablet (which may be any area on the tablet), where the coordination window 501 corresponds to the main screen window in the virtual screen buffer, and the coordination window 502 corresponds to the extension screen 1 window in the virtual screen buffer. The main screen window in the main screen buffer is directly displayed on the display interface of the mobile phone, the main screen window in the virtual screen buffer is projected on the coordination window 501 on the display interface of the tablet, and the extension screen 1 window in the virtual screen buffer is projected on the coordination window 502 on the display interface of the tablet. Because a main screen window in the virtual screen buffer and a main screen window in the main screen buffer are in a mirror-image relationship, the display interface in the coordination window 501 on the display interface of the tablet is always consistent with the display interface of the mobile phone. Because the extension screen 1 window in the virtual screen buffer and the extension screen 1 window in the main screen buffer are in a mirror-image relationship, the display interface in the coordination window 502 on the display interface of the tablet is always consistent with the interface of the extension screen 1 window in the main screen buffer.

In another example, implementing multi-screen coordination between the mobile phone and the tablet specifically includes: After the mobile phone receives the multi-screen coordination request sent by the tablet, a prompt box is displayed on the display interface on the mobile phone side. For example, the prompt box may include but is not limited to an option of a device that is to establish a multi-screen coordination connection, a "Cancel" option, and a "Connect" option. The user taps the "Connect" option, and the mobile phone establishes a multi-screen coordination connection with the tablet in response to the operation behavior of the user. The main screen window in the main screen buffer is projected to a coordination window (the coordination window corresponds to the main screen window in the main screen window) displayed on the display interface of the tablet (which may be any area on the tablet) while being directly displayed on the main screen.

For example, the user taps (for example, double tap to enable) a new application in the coordination window 501 on the display interface of the tablet. That the new application is Camera is used as an example. In response to an operation behavior of the user, the coordination window on the display interface of the tablet sends tap coordinates of the operation of the user to a coordination negotiation application of the tablet. The coordination negotiation application of the tablet determines a tap pointer corresponding to the tap coordinates, and sends the tap pointer to a coordination negotiation application of the mobile phone. The coordination negotiation application of the mobile phone receives the tap pointer, and sends an enable request to the Camera application in response to the user operation corresponding to the tap pointer. When the camera application is enabled, indication information is sent to the window manager, and the window manager sends a display instruction to the view system according to the indication information. The view system displays the camera interface on the main screen window in the main screen buffer according to the display instruction, and when the interface displayed on the main screen window is sent to the main screen of the mobile phone, the view system is further projected to a coordination window displayed on the display interface of the tablet. In this case, the camera interface is displayed in both the display interface of the mobile phone and the coordination window 501 of the display interface of the tablet.

When the user needs to display the camera interface in the new window; exemplarily, the user taps the "Open in a new window" option in the coordination window 501. In response to the operation behavior of the user, the coordination window on the display interface of the tablet sends tap coordinates of the user operation to the coordination negotiation application of the tablet. The coordination negotiation application of the tablet determines a tap pointer corresponding to the tap coordinates, and sends the tap pointer to a coordination negotiation application of the mobile phone. After receiving the tap pointer, the coordination negotiation application of the mobile phone sends the indication information to the view system in response to a user operation corresponding to the tap pointer. The indication information may be used to indicate the view system to perform an extension operation on the main screen buffer. After receiving the indication information, the view system extends the main screen buffer according to the indication information. After the view system extends the main screen buffer, the window manager may create an extension screen 1 in an extended area in the main screen buffer. The window of the extension screen 1 is projected onto another coordination window (which corresponds to the extension screen 1 window in the main screen buffer) displayed on the display interface of the tablet (which may be any area on the tablet) for display. In this case, in addition to the main screen window, the main screen buffer may further include one or more extension screen windows. For each extension screen window; a display interface of the extension screen window may be directly projected into a coordination window on the display interface of the tablet. In this case, a display interface in a coordination window on the display interface of the tablet is always consistent with the display interface of the mobile phone, and a display interface of a new enabled application is displayed in another coordination window.

A difference between this example and the foregoing example lies in that a manner in which each screen window in the main screen buffer is mirrored to the virtual screen buffer and then projected to the tablet is not used, but a manner in which the main screen window in the main screen buffer and each created extension screen window are directly projected to the tablet is used. This embodiment of this application sets no limitation on a manner of implementing multi-screen coordination between the mobile phone and the tablet. The following describes this embodiment of this application in detail with reference to the multi-screen coordination manner in the foregoing example.

An embodiment of this application provides a coordination window processing method. Specifically, a camera function task display interface of a target application is displayed in a first coordination window of a tablet in response to a tap operation performed by a user on a camera function option of the target application in a second coordination window of the tablet, where at least two coordination windows are displayed on a display interface of the tablet, the first multi-screen coordination window is corresponding to a main screen window in a main screen buffer, and the second coordination window is corresponding to an extension screen window in the main screen buffer. For example, the camera function option may be a camera option (or referred to as a photographing option) used for photographing, or may be a scan option (such as "Scan") used for scanning. Correspondingly, the camera function task may be a camera task (or referred to as a photographing task), or may be a scanning task.

In this embodiment of this application, an example in which the target application is Memo, and the second coordination window is corresponding to the extension screen 1 window in the main screen buffer is used for description. In another embodiment, a specific implementation of this application may be applied to another target application that needs to invoke the camera (or the camera), such as a short video application, a payment application, or a chat application that needs to invoke the camera. A specific implementation of this application may be applied to a third coordination window that is displayed on the display interface of the tablet and that is corresponding to another extension screen window in the main screen buffer. This is not described again in this application.

A possible application scenario is as follows: The target application is an application that adapts to single-application multi-task, that is, the target application can open a new window based on an existing window to bear a task of the target application. Another possible application scenario is that the target application is an application that does not adapt to single-application multi-task, that is, the target application cannot open a new window based on an existing window to bear a task of the target application.

Scenario 1

In this scenario, that the target application is Memo is used as an example to describe a specific implementation of this embodiment of this application in detail. The Memo is an application that adapts to single-application multi-task.

Figure 6:
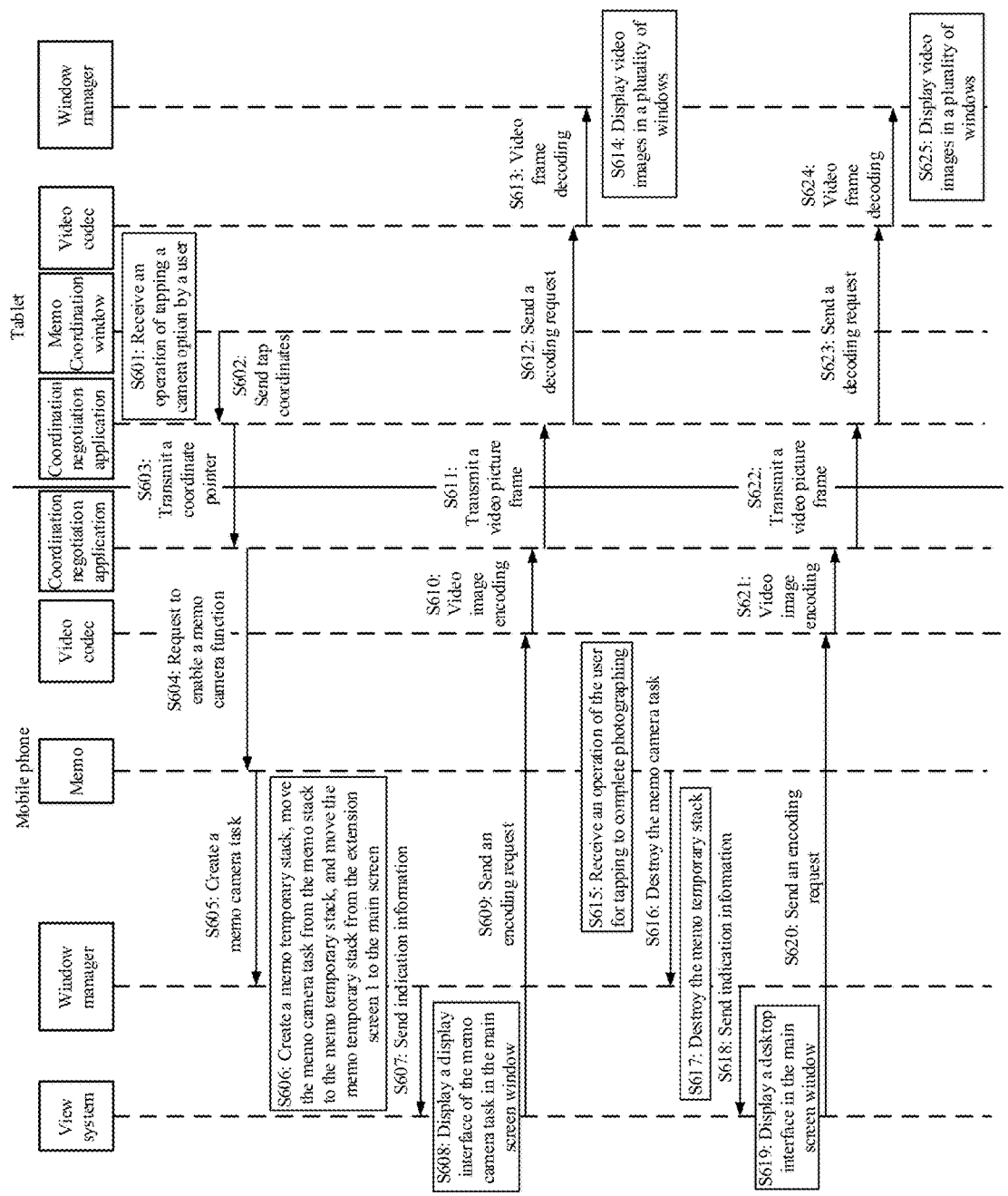
FIG. 6 is a schematic diagram of module interaction according to an embodiment of this application.

FIG. 6 is a schematic diagram of interaction of modules. As shown in FIG. 6, a procedure of the coordination window processing method provided in this embodiment of this application specifically includes the following steps.

S601: A memo coordination window of a tablet receives an operation of tapping a camera option by a user.

The memo coordination window on the tablet is a coordination window of Memo on a display interface of the tablet. A display interface of the coordination window is corresponding to an extension screen window in a main screen buffer (the following uses an example in which the coordination window in which Memo is located corresponds to an extension screen 1 window). That is, the display interface of the coordination window is different from a display interface of a mobile phone.

As shown in a schematic diagram of an application scenario shown in FIG. 7a(1a)~FIG. 7a(1b), both the display interface of the mobile phone and a coordination window 702 on the display interface of the tablet display a mobile phone desktop interface, and a coordination window 701 on the display interface of the tablet displays a display interface of a memo note task. The user taps the camera option 7011 on the display interface of the memo note task in the coordination window 701, and the coordination window 701 receives the operation that the user taps the camera option 7011.

S602: The memo coordination window of the tablet sends tap coordinates to a coordination negotiation application of the tablet.

Optionally, the tapping coordinates are coordinates, based on a coordinate system corresponding to the coordination window 1, of a location point at which the tablet is touched by a finger (or a stylus, or the like) when the user taps the camera option.

S603: The coordination negotiation application of the tablet sends a coordinate pointer to a coordination negotiation application of the mobile phone.

The coordination negotiation application of the tablet determines the corresponding coordinate pointer according to the received tap coordinates, and sends the coordinate pointer to the coordination negotiation application of the mobile phone.

S604: The coordination negotiation application of the mobile phone requests to enable a memo camera function.

If the coordination negotiation application of the mobile phone determines, according to the coordinate pointer reported by the coordination negotiation application of the tablet, that the user needs to start the memo camera function (or referred to as a memo scanning function or a memo photographing function), the coordination negotiation application of the mobile phone sends a request for starting the memo camera function to the Memo.

S605: The Memo of the mobile phone creates a memo camera task.

The camera task belongs to one of camera function tasks and is used for photographing. For example, the camera function task may further be a scanning task, which is used for scanning. In this embodiment, an example in which the camera function task corresponding to the Memo application is the camera task is used for description.

Figure 8:
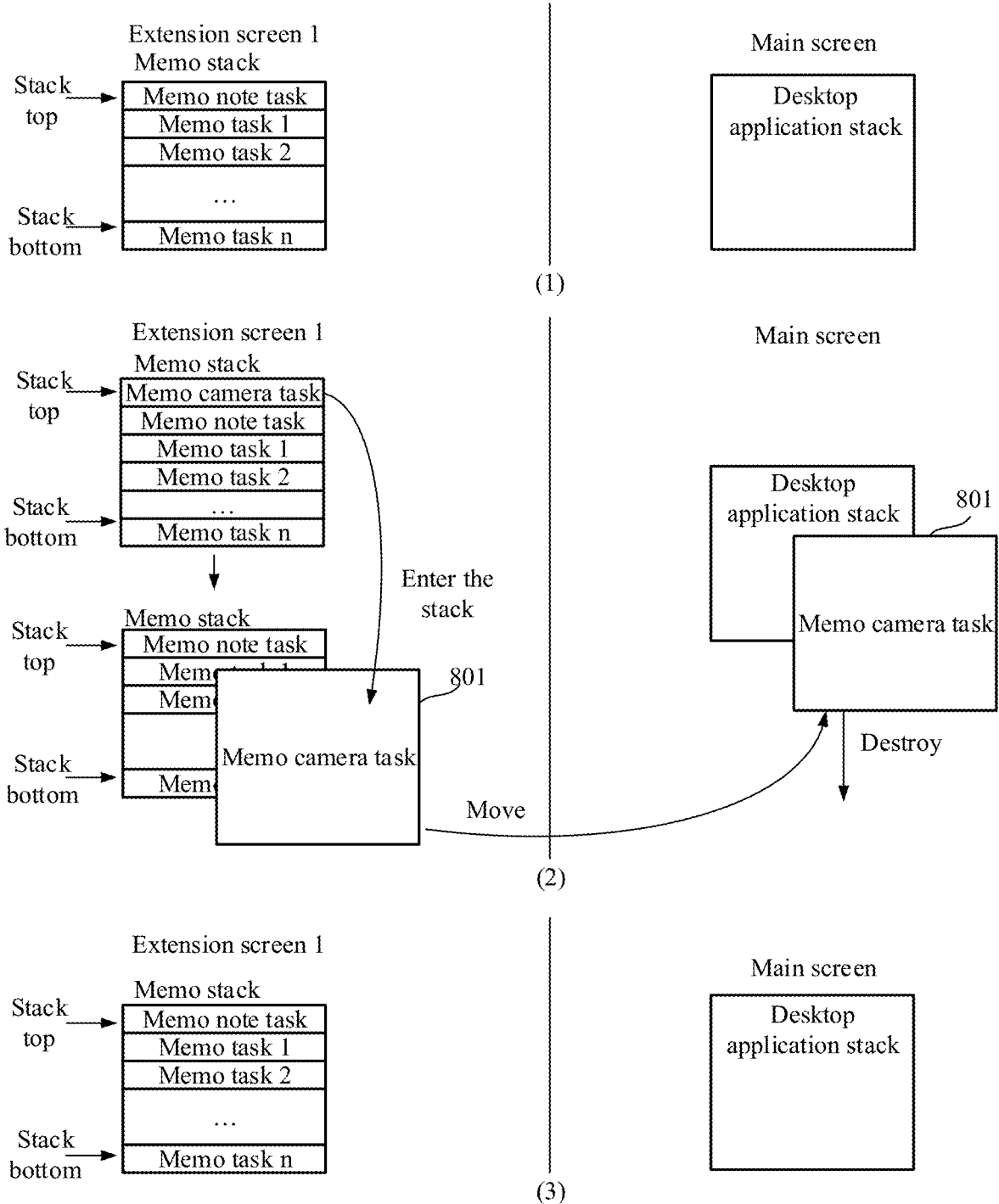
FIG. 8 is a schematic diagram of a relationship between a screen and a stack of an electronic device according to an embodiment of this application.

After receiving the request for starting the memo camera function, the Memo of the mobile phone creates a memo camera task (or referred to as a scanning task or a photographing task) on the memo record task (or referred to as an editing task). As shown in FIG. 8(1), a memo stack is located in an extension screen 1. Before the Memo creates the memo camera task, the top of the memo stack is a memo note task. As shown in FIG. 8(2), after the Memo creates the memo camera task, the memo camera task enters the memo stack. In this case, the top of the memo stack is the memo camera task.

S606: A window manager of the mobile phone creates a memo temporary stack, moves the memo camera task from the memo stack to the memo temporary stack, and moves the memo temporary stack from the extension screen 1 to the main screen.

In this scenario, because the Memo adapts to single-application multi-task, after the memo camera task is created, it may be declared that the memo camera task is displayed on a newly created window. It should be noted that, same as an original window of the Memo, the new window is displayed on the extension screen 1.

As shown in FIG. 8(2), the window manager of the mobile phone creates a memo temporary stack 801 in the expansion screen 1 according to the memo declaration, and moves the memo camera task from the memo stack to the memo temporary stack 801. Same as the memo stack, the memo temporary stack is also added to the expansion screen 1. It should be noted that in the extension screen or the main screen, a newly created or newly opened stack covers a currently opened stack, and a display window of the extension screen or the main screen also changes accordingly. In this example, in the extension screen 1, the newly created memo temporary stack covers the memo stack. Before the memo stack is covered, the expansion screen 1 displays a display window corresponding to the memo stack. After the memo stack is covered, the expansion screen 1 displays a display window corresponding to the memo temporary stack. Before the memo camera task is moved from the memo stack to the memo temporary stack 801, the top of the memo stack is the memo camera task, and the memo temporary stack is empty. After the memo camera task is moved from the memo stack to the memo temporary stack 801, the top of the memo stack is the memo note task, and the memo temporary stack 801 includes only the memo camera task. Subsequently: the window manager moves the memo temporary stack 801 from the extension screen 1 to the main screen.

Figure 9:
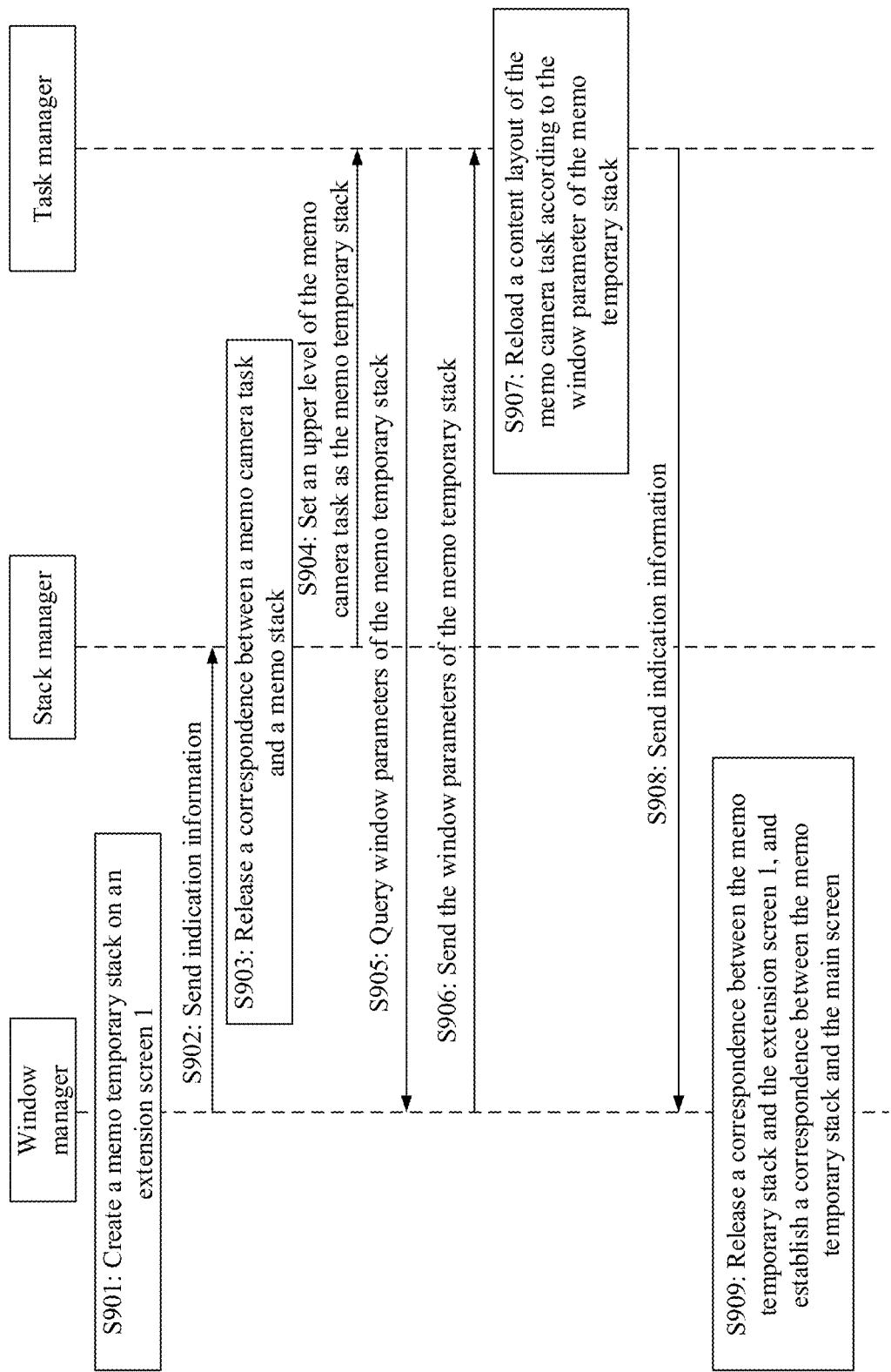
FIG. 9 is a schematic diagram of module interaction according to an embodiment of this application.

FIG. 9 is a schematic diagram of interaction between modules. As shown in FIG. 9, a migration procedure of a coordination window camera task according to an embodiment of this application includes the following steps.

S901: A window manager creates a memo temporary stack on an extension screen 1.

As shown in FIG. 8(1), only a memo stack exists in the extension screen 1. After the Memo creates a memo camera task, the window manager creates a new memo temporary stack 801 on the expansion screen 1. Refer to FIG. 8(2). The memo temporary stack 801 is configured to move the memo camera task from the extension screen 1 to the main screen.

After the memo temporary stack 801 is created by the window manager, both the memo temporary stack 801 and the memo stack exist in the extension screen 1. Because the memo temporary stack 801 is newly created, the memo temporary stack 801 covers the memo stack. Refer to FIG. 8(2). For coverage of the stack on the screen, refer to the foregoing description. Details are not described herein again.

S902: The window manager sends indication information to a stack manager.

The window manager sends the indication information to the stack manager to instruct to move the memo camera task from the memo stack to the memo temporary stack.

S903: The stack manager releases a correspondence between the memo camera task and the memo stack.

The stack manager releases, according to the indication information, the correspondence between the memo stack and the memo camera task, that is, sets an upper level of the memo camera task to be empty, that is, removes the memo camera task from the memo stack.

S904: The stack manager sets the upper level of the memo camera task as the memo temporary stack.

The stack manager sets, according to the indication information, the upper level of the memo camera task as the memo temporary stack, that is, establishes a correspondence between the memo camera task and the memo temporary stack.

S905: The task manager queries the window manager for window parameters of the memo temporary stack.

The window parameters may include but are not limited to a window size and a window location.

S906: The window manager sends the window parameters of the memo temporary stack to the task manager.

The window manager sends indication information to the task manager, where the indication information may include the window parameters such as the window size and the window location.

S907: The task manager reloads a content layout of the memo camera task according to the window parameter of the memo temporary stack.

The task manager reloads content of the memo camera task according to the window parameters of the memo temporary stack to implement the content layout of the memo camera task. That is, the memo camera task is placed in the memo temporary stack, and a display interface of the memo camera task is displayed in a window corresponding to the memo temporary stack.

S908: The task manager sends indication information to the window manager.

The indication information sent by the task manager to the window manager is used to indicate the window manager to move the memo temporary stack from the extension screen 1 to the main screen.

S909: The window manager releases a correspondence between the memo temporary stack and the extension screen 1, and establishes a correspondence between the memo temporary stack and the main screen.

The window manager releases, according to the indication information, the correspondence between the memo temporary stack and the extension screen 1, that is, sets the upper level of the memo temporary stack to be empty. The correspondence between the memo temporary stack and the extension screen 1 is released, that is, the memo temporary stack is taken out from the extension screen 1. In addition, the window manager establishes a correspondence between the memo temporary stack and the main screen, that is, sets the upper level of the memo temporary stack to the main screen. The window manager establishes the correspondence between the memo temporary stack and the main screen, that is, puts the memo temporary stack onto the main screen. As shown in FIG. 8(1), an example in which only a desktop application stack exists in the main screen is used. After the correspondence between the memo temporary stack and the main screen is established, the memo temporary stack is placed on the main screen and overlies the desktop application stack. Reference may be made to FIG. 8(2). For example, if there are a plurality of stacks successively covered on the main screen, after the memo temporary stack is placed on the main screen, the memo temporary stack covers the plurality of stacks.

S607: The window manager of the mobile phone sends indication information to the view system of the mobile phone.

The indication information sent by the window manager of the mobile phone to the view system of the mobile phone may be used to instruct the view system to refresh a window display interface of each screen.

S608: The view system of the mobile phone displays the display interface of the memo camera task in the main screen window;

The view system of the mobile phone refreshes window display interfaces of the main screen and the extension screen 1 according to the indication information. The display interface of the memo camera task is displayed in the main screen window; and the display interface of the memo note task is displayed in the expansion screen 1 window;

As shown in FIG. 8(2), in the main screen, because the memo temporary stack covers the desktop application stack, the main screen window displays a window corresponding to the memo temporary stack, that is, displays a display interface of the memo video camera task in the memo temporary stack. In addition, only a memo stack exists in the extension screen 1, and a window of the extension screen 1 displays a window corresponding to the memo stack, that is, displays a display interface of the memo note task on the top of the memo stack.

For example, the window manager of the mobile phone mirrors window display interfaces of the main screen and the extension screen 1 in the main screen buffer to the virtual screen buffer.

S609: The view system of the mobile phone sends a coding request to a video codec of the mobile phone.

S610: The video codec of the mobile phone encodes video images.

The window manager of the mobile phone sends, to the video codec, video images displayed on the main screen and the extension screen 1 in the virtual screen buffer to perform a coding operation, so as to generate a video image frame.

S611: The coordination negotiation application of the mobile phone transmits a video image frame to the coordination negotiation application of the tablet.

In a scenario in which a Wi-Fi connection is established between the mobile phone and the tablet, the coordination negotiation application of the mobile phone may implement transmission of a video image frame in a form of a data packet to the coordination negotiation application of the tablet based on a Wi-Fi driver of the mobile phone and a Wi-Fi driver of the tablet.

S612: The coordination negotiation application of the tablet sends a decoding request to the video codec of the tablet.

S613: The video codec of the tablet decodes the video image frame.

S614: The window manager of the tablet displays the video images in a plurality of windows.

The window manager of the tablet displays the received video images in a plurality of coordination windows displayed on the display interface of the tablet according to the screen windows to which the video image belongs. That is, the window manager of the tablet displays the video image corresponding to the display interface of the memo camera task in the coordination window that is corresponding to the main screen window and that is displayed on the display interface of the tablet. The window manager of the tablet displays the video image corresponding to the display interface of the memo note task in the coordination window that is corresponding to the extension screen 1 window and that is displayed on the display interface of the tablet.

Figure 10A:
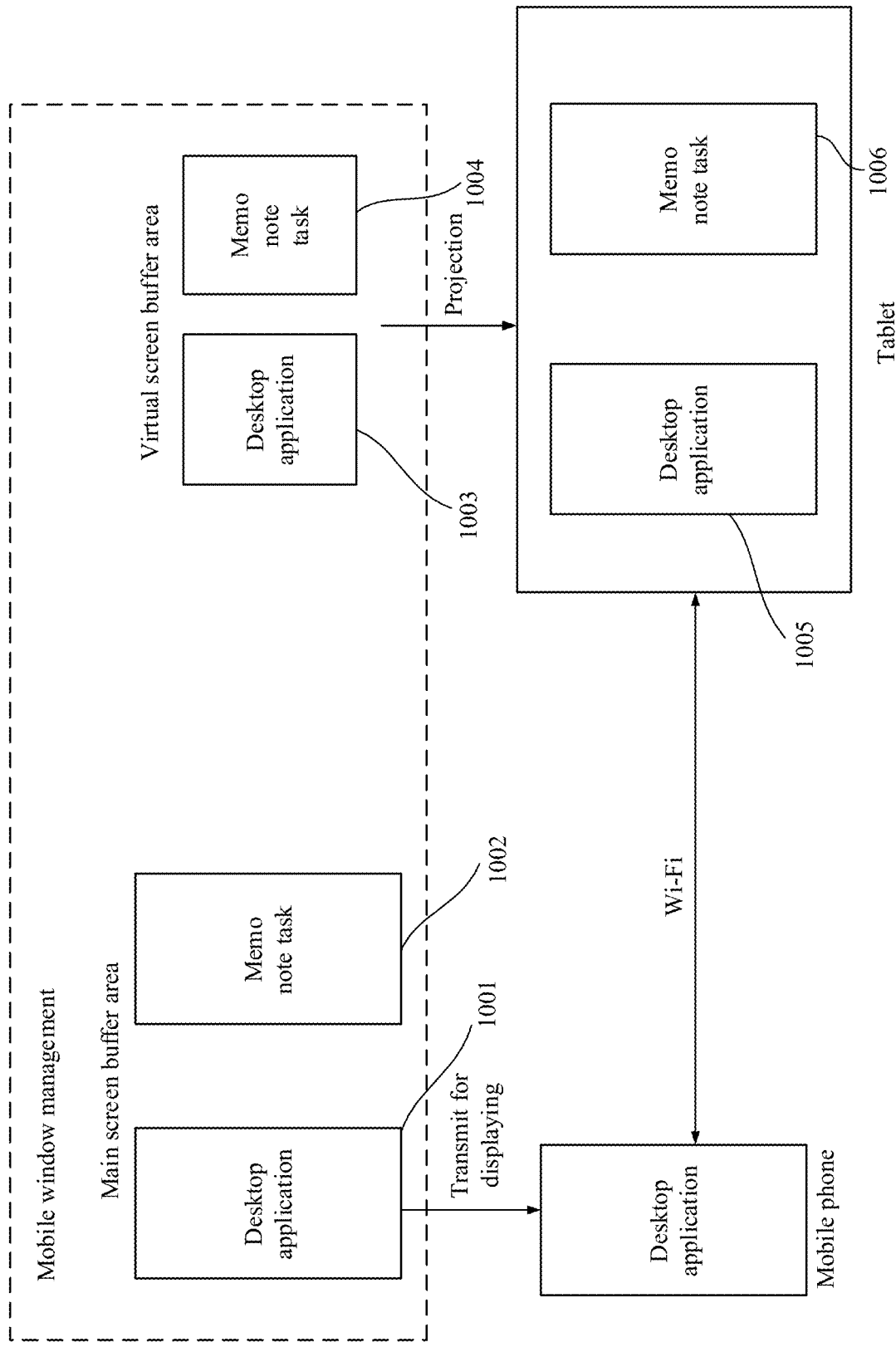
FIG. 10a~FIG. 10b are schematic diagrams of application scenarios shown by way of example.
Figure 10B:
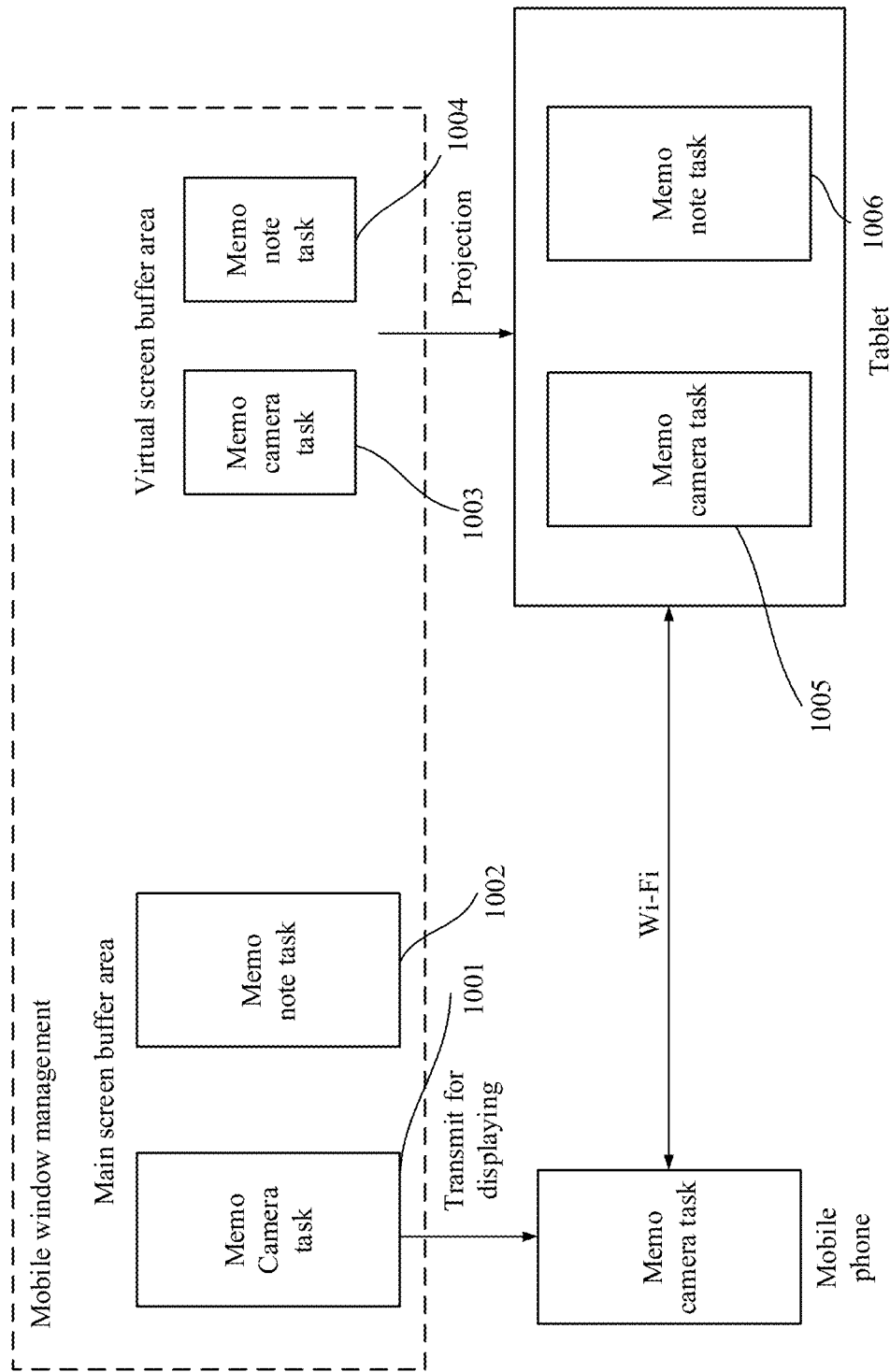

FIG. 10a~FIG. 10b are schematic diagrams of an application scenario shown by way of example. Before the window manager executes the coordination window camera task moving procedure, as shown in FIG. 10a, in the main screen buffer, a display interface of a desktop application is displayed in the main screen window 1001, and a display interface of a memo note task is displayed in the extension screen 1 window 1002. The display interface of the desktop application displayed in the main screen window 1001 is directly sent to the display interface of the mobile phone for display. In addition, each screen window of the main screen buffer is mirrored into the virtual screen buffer. In the virtual screen buffer, a display interface of the desktop application is displayed in the main screen window 1003, and a display interface of a memo note task is displayed in the expansion screen 1 window 1004. A display interface of each screen window in the virtual screen buffer is corresponding to a coordination window projected on the display interface of the tablet. The coordination window 1005 is corresponding to the main screen window 1003, and displays a display interface of the desktop application. The coordination window 1006 is corresponding to the extension screen 1 window 1004, and a display interface of the memo note task is displayed. After the window manager executes the coordination window camera task moving procedure, as shown in FIG. 10b, in the main screen buffer, a display interface of the memo camera task is displayed in the main screen window 1001, and a display interface of the memo camera task continues to be displayed in the expansion screen 1 window 1002. The display interface of the memorized video camera task displayed in the main screen window 1001 is directly sent to the display interface of the mobile phone for display. In addition, each screen window of the main screen buffer is mirrored into the virtual screen buffer. In the virtual screen buffer, a display interface of a memo camera task is displayed in the main screen window 1003, and a display interface of a memo note task continues to be displayed in the expansion screen 1 window 1004. A display interface of each screen window in the virtual screen buffer is corresponding to a coordination window projected onto a display interface of a tablet, where the coordination window 1005 is corresponding to a main screen window 1003, and a display interface of a memo camera task is displayed. The coordination window 1006 is corresponding to the extension screen 1 window 1004, and continues to display a display interface of the memo note task.

Figure 7B:
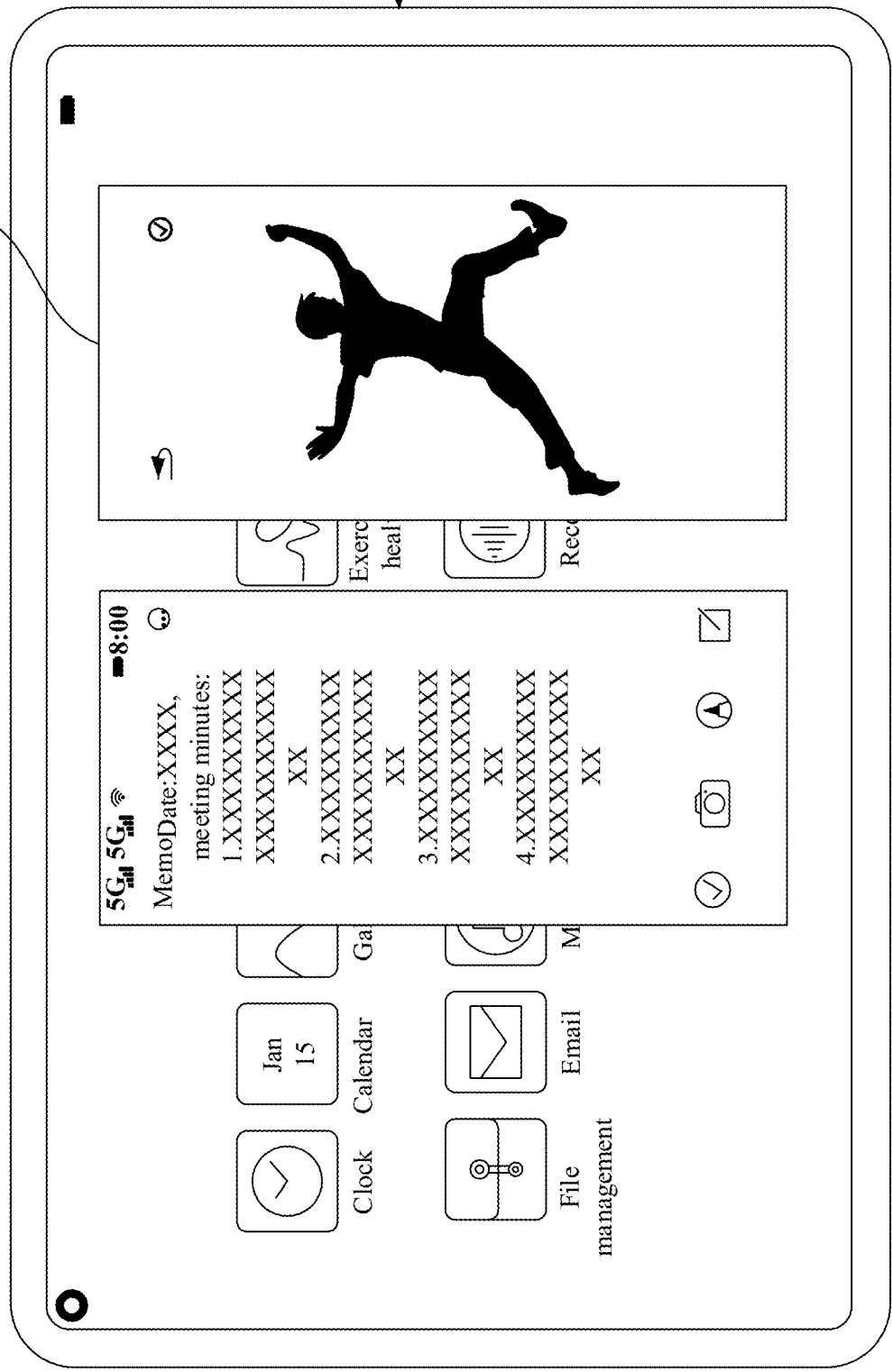
FIG. 7a(1a)~FIG. 7c(b) are schematic diagrams of application scenarios shown by way of example.
Figure 7B:
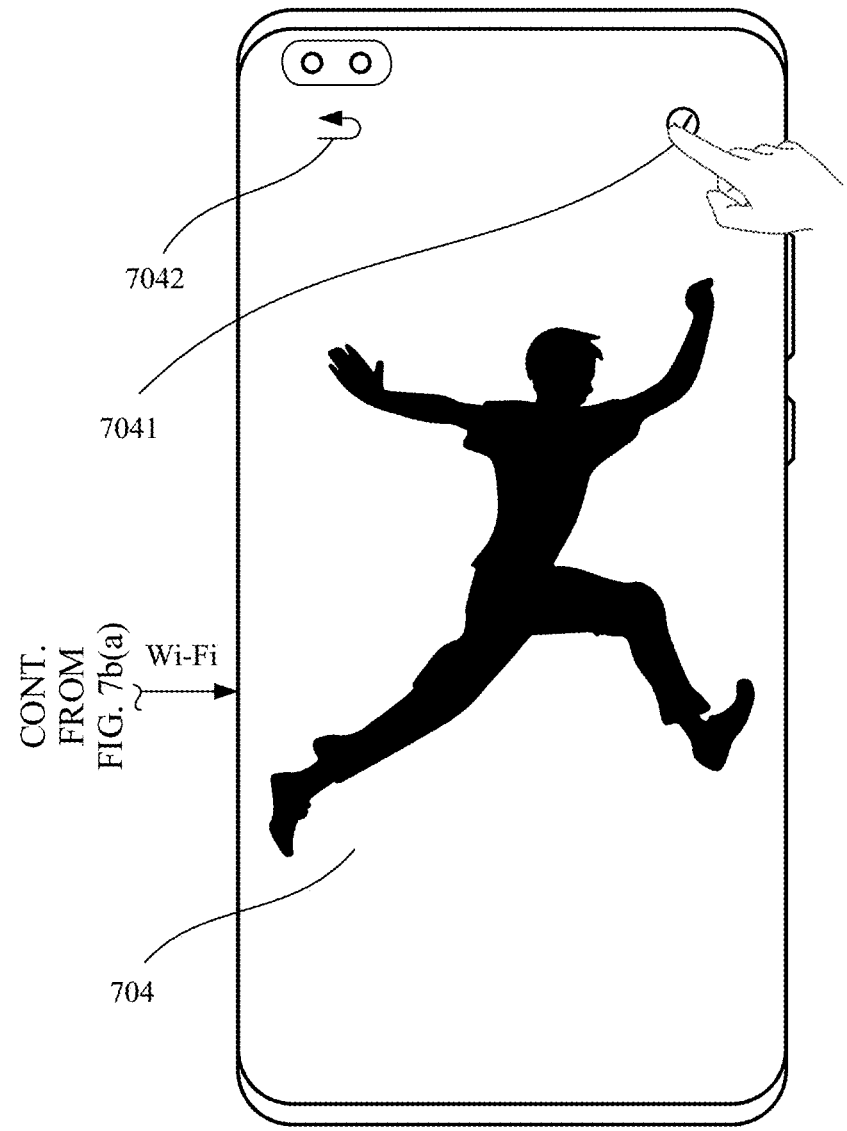

Continue to refer to a schematic diagram of an application scenario shown in FIG. 7a(1a)~FIG. 7b(b). As shown in FIG. 7a(1a)~FIG. 7a(1b), the user taps the camera option 7011 on the display interface of the memo note task in the coordination window 701 on the display interface of the tablet. For a change of interfaces of the tablet and the mobile phone in response to an operation behavior of the user, refer to FIG. 7a(2a)~FIG. 7a(2b). As shown in FIG. 7a(2a)~FIG. 7a(2b), the coordination window 701 on the display interface of the tablet continues to display the display interface of the memo note task, and the coordination window 702 on the display interface of the mobile phone 703 and the display interface of the memo camera task simultaneously display the display interface of the memo camera task. In this case, the user may tap the photographing option 7031 in the display interface 703 of the mobile phone to implement a photographing operation. For example, the mobile phone and the tablet respond to an operation behavior of the user, and for a change of interfaces of the tablet and the mobile phone, reference may be made to FIG. 7b(a)~FIG. 7b(b). As shown in FIG. 7b(a)~FIG. 7b(b), a photo preview is displayed on a coordination window 702 on a display interface of the tablet and a display interface 704 of the mobile phone. When the user taps the Back option 7042 on the display interface 704 of the mobile phone, the interfaces of the tablet and the mobile phone return to FIG. 7a(2a)~FIG. 7a(2b). When the user determines that the photographing preview picture meets the user requirement, the user may tap an OK option 7041 to instruct to complete photographing.

It should be noted that, as shown in FIG. 7a(2a)~FIG. 7a(2b), the display interface of the memo note task displayed in the synchronization window 701 of the tablet may be operated by the user. For example, that is, all options 7011~7015 in the coordination window 701 can be tapped by the user, and a memo note function is still provided for the user.

S615: The memo of the mobile phone receives the user tap to complete the photographing operation.

The user taps to complete the photographing operation on the display interface of the memo camera task on the display interface of the mobile phone. As shown in FIG. 7b(a)~FIG. 7b(b), the user taps the OK option 7041 in the display interface 704 of the mobile phone. The operation of tapping the OK option 7041 is to indicate to complete photographing for the memo camera task.

S616: The Memo of the mobile phone destroys the memo camera task.

In response to the user tapping to complete the photographing operation, the Memo destroys the memo camera task.

S617: The window manager of the mobile phone destroys the memo temporary stack.

After the memo camera task is destroyed, the memo temporary stack that has a correspondence with the memo camera task becomes an empty stack, and the window manager of the mobile phone may then destroy the memo temporary stack. As shown in FIG. 8(2) and FIG. 8(3), after the memo temporary stack 801 is destroyed, only the desktop application stack exists in the main screen.

S618: The window manager of the mobile phone sends indication information to the view system of the mobile phone.

The indication information sent by the window manager of the mobile phone to the view system of the mobile phone is used to instruct the view system to refresh a window display interface of each screen.

S619: The view system of the mobile phone displays the desktop interface on the main screen.

The view system of the mobile phone refreshes window display interfaces of the main screen and the extension screen 1 according to the indication information. The display interface of the main screen window switches back to the mobile phone desktop interface, and the expansion screen 1 window continues to display the display interface of the memo note task.

As shown in FIG. 8(3), only a desktop application stack exists in a main screen, and a main screen window displays a window corresponding to the desktop application stack, that is, displays a mobile phone desktop. In addition, only a memo stack exists in the extension screen 1, and a window of the extension screen 1 displays a window corresponding to the memo stack, that is, displays a display interface of the memo note task on the top of the memo stack.

For example, the window manager of the mobile phone mirrors window display interfaces of the main screen and the extension screen 1 in the main screen buffer to the virtual screen buffer.

S620: The view system of the mobile phone sends a coding request to a video codec of the mobile phone.

S621: The video codec of the mobile phone encodes video images.

S622: The coordination negotiation application of the mobile phone transmits a video image frame to the coordination negotiation application of the tablet.

S623: The coordination negotiation application of the tablet sends a decoding request to the video codec of the tablet.

S624: The video codec of the tablet decodes the video image frame.

For explanation and description of S620~S624, refer to the foregoing. Details are not described herein again.

S625: The window manager of the tablet displays the video images in a plurality of windows.

The window manager of the tablet displays the received video images in a plurality of coordination windows displayed on the display interface of the tablet according to the screen windows to which the video image belongs. That is, the window manager of the tablet displays the video image corresponding to the desktop interface in the coordination window that is corresponding to the main screen window and that is displayed on the display interface of the tablet. The window manager of the tablet displays the video image corresponding to the display interface of the memo note task in the coordination window that is corresponding to the extension screen 1 window and that is displayed on the display interface of the tablet. In this case, continue to refer to FIG. 10a, and details are not described herein again.

Figure 7C:
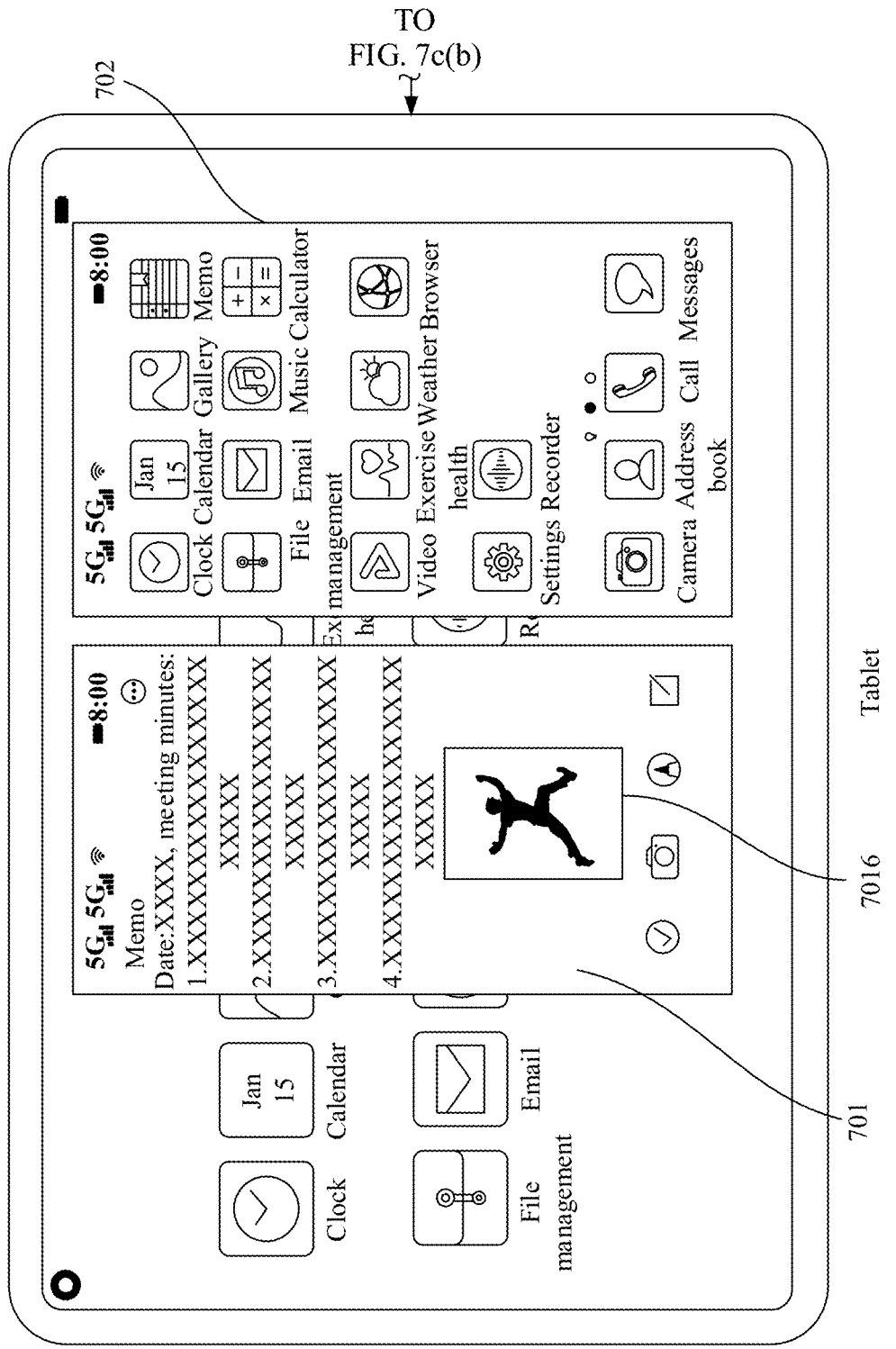
Figure 7C:
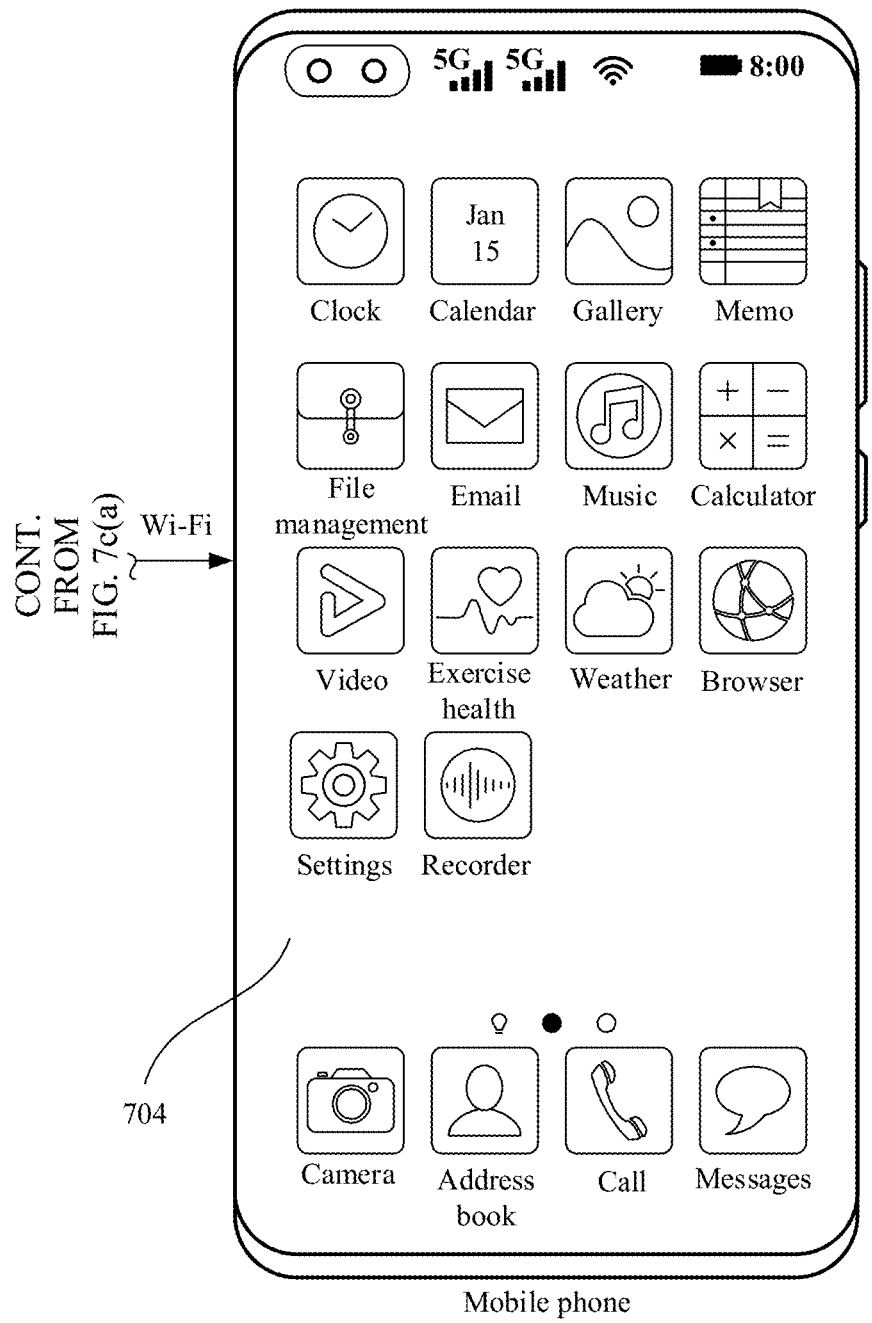

Based on the foregoing FIG. 7a(la)~FIG. 7b(b), as shown in FIG. 7c(a)~FIG. 7c(b), a change of interfaces of the tablet and the mobile phone may be referred to in response to an operation of determining an option 7041 (that is, completing photographing) in the display interface 704 of the mobile phone by the user. As shown in FIG. 7c(a)~FIG. 7c(b), the mobile phone desktop interface is restored to be displayed in both the display interface 704 of the mobile phone and the coordination window 702 on the display interface of the tablet, a display interface of a memo note task is continued to be displayed in the coordination window 701 on the display interface of the tablet, and an image 7016 collected by photographing is displayed in an editable part of the memo note on the display interface.

FIG. 7a(la)~FIG. 7c(b) are another application scenario. As shown in FIG. 7a(la)~FIG. 7a(1b), the user taps the camera option 7011 on the display interface of the memo note task in the coordination window 701 on the display interface of the tablet. For a change of interfaces of the tablet and the mobile phone in response to an operation behavior of the user, refer to FIG. 7a(2a)~FIG. 7a(2b). As shown in FIG. 7a(2a)~FIG. 7a(2b), the coordination window 701 on the display interface of the tablet continues to display the display interface of the memo note task, and the coordination window 702 on the display interface of the mobile phone 703 and the display interface of the memo camera task simultaneously display the display interface of the memo camera task. In this case, the user may complete photographing by tapping the photographing option 7031 in the display interface 703 of the mobile phone (in this case, the user does not need to confirm the photographing image again). For example, the mobile phone and the tablet respond to an operation behavior of the user, and for a change of interfaces of the tablet and the mobile phone, reference may be made to FIG. 7c(a)~FIG. 7c(b). As shown in FIG. 7c(a)~FIG. 7c(b), the mobile phone desktop interface is restored to be displayed in both the display interface 704 of the mobile phone and the coordination window 702 on the display interface of the tablet, a display interface of a memo note task is continued to be displayed in the coordination window 701 on the display interface of the tablet, and an image 7016 collected by photographing is displayed in an editable part of the memo note on the display interface.

In the foregoing application scenario, that a camera task performs an image photographing operation is used as an example for description. If the camera task performs the photographing video operation, for a processing procedure, refer to a processing procedure in which the camera task performs the photographing image operation, and details are not described again.

Figure 11A:
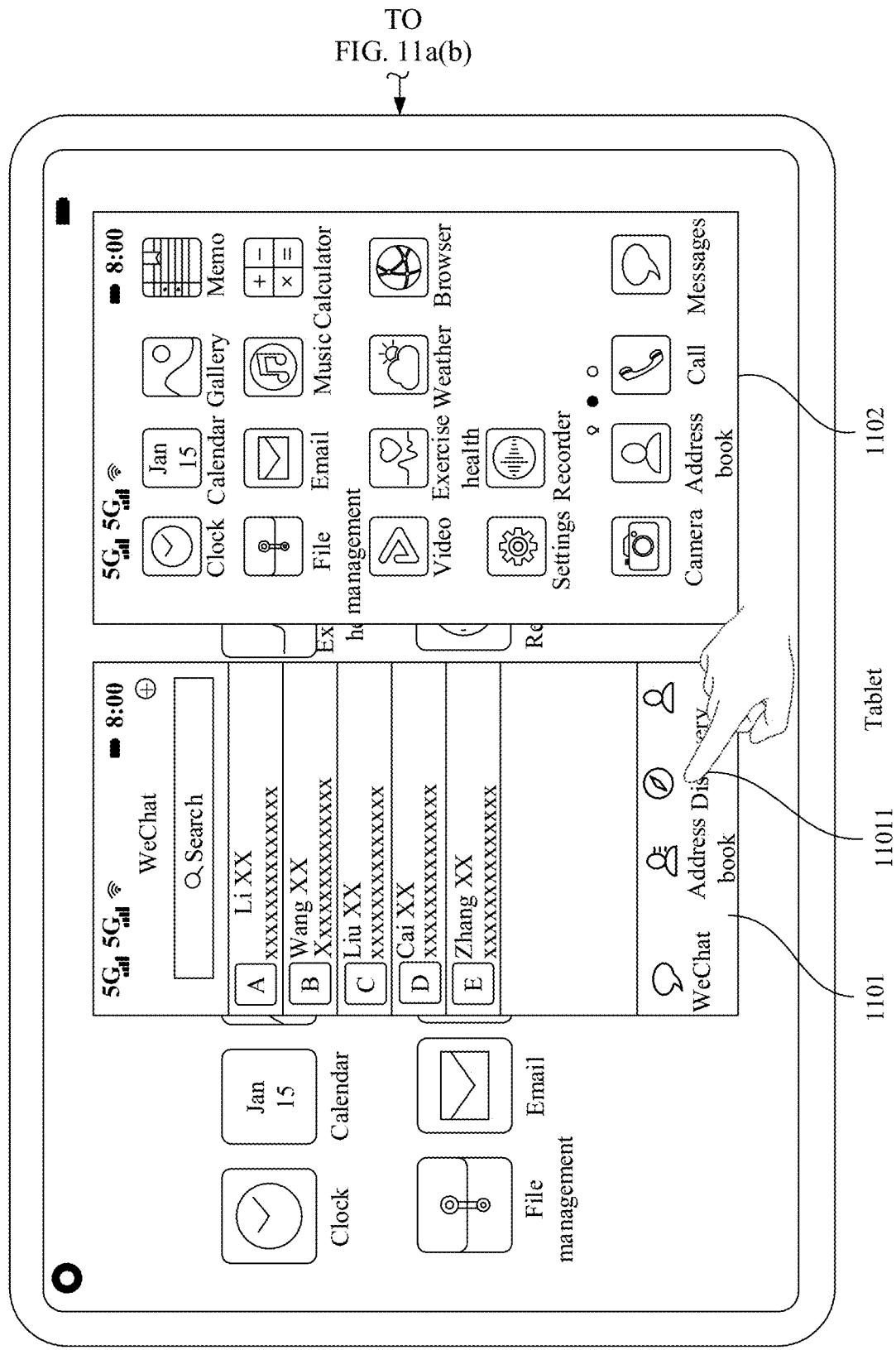
FIG. 11a(a)~FIG. 11d(b) are schematic diagrams of application scenarios shown by way of example.
Figure 11A:
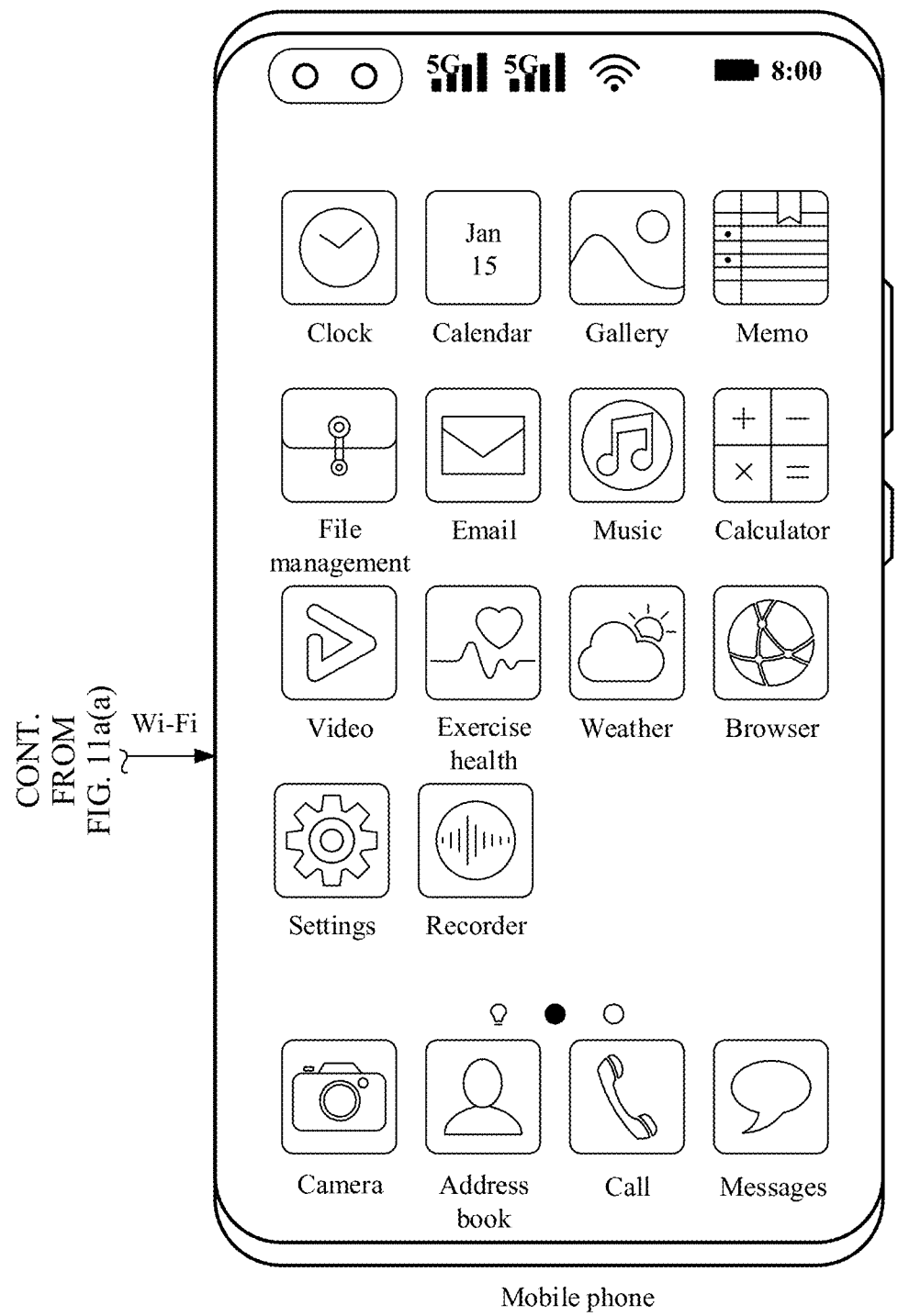
Figure 11B:
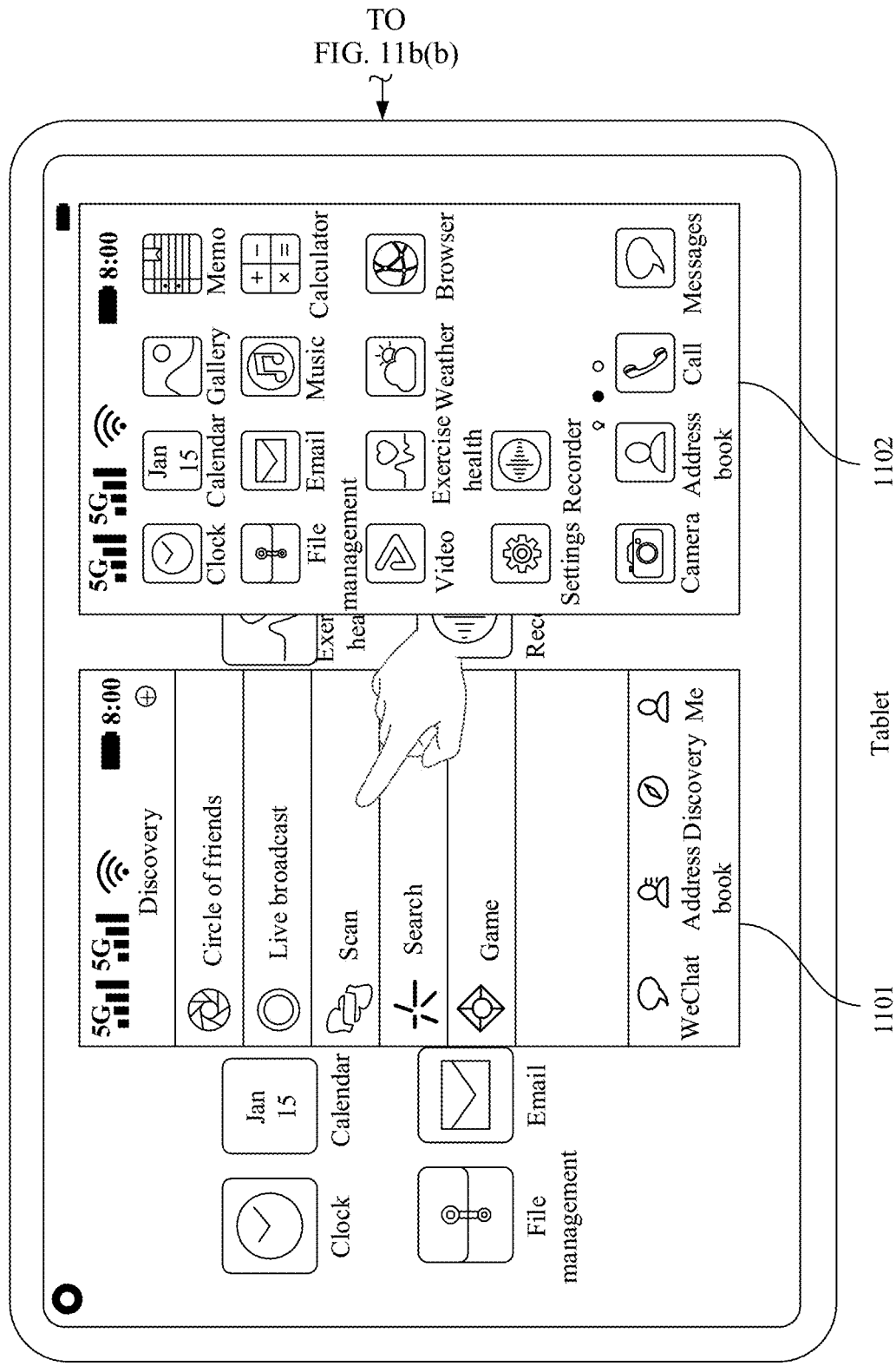
Figure 11B:
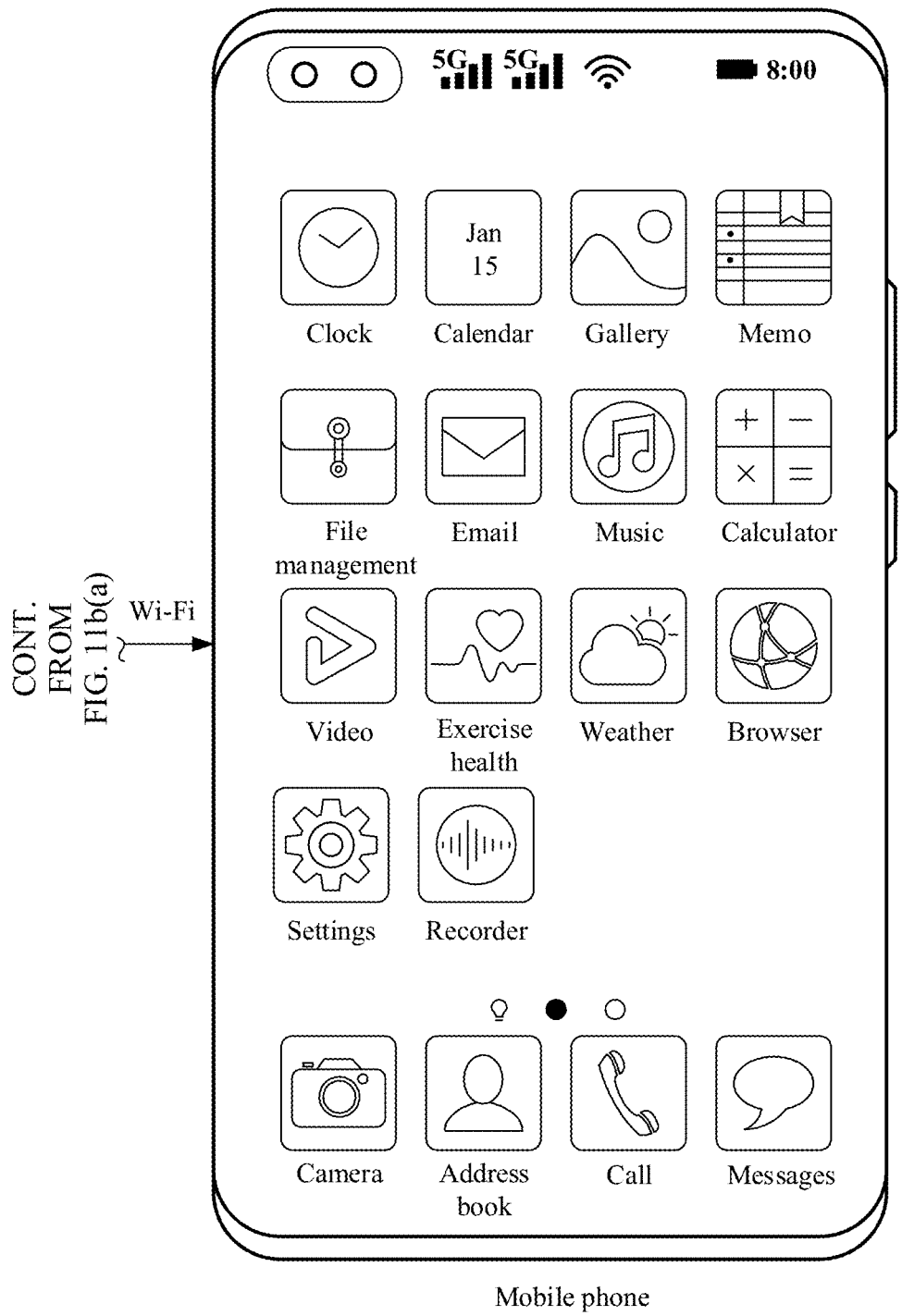
Figure 11C:
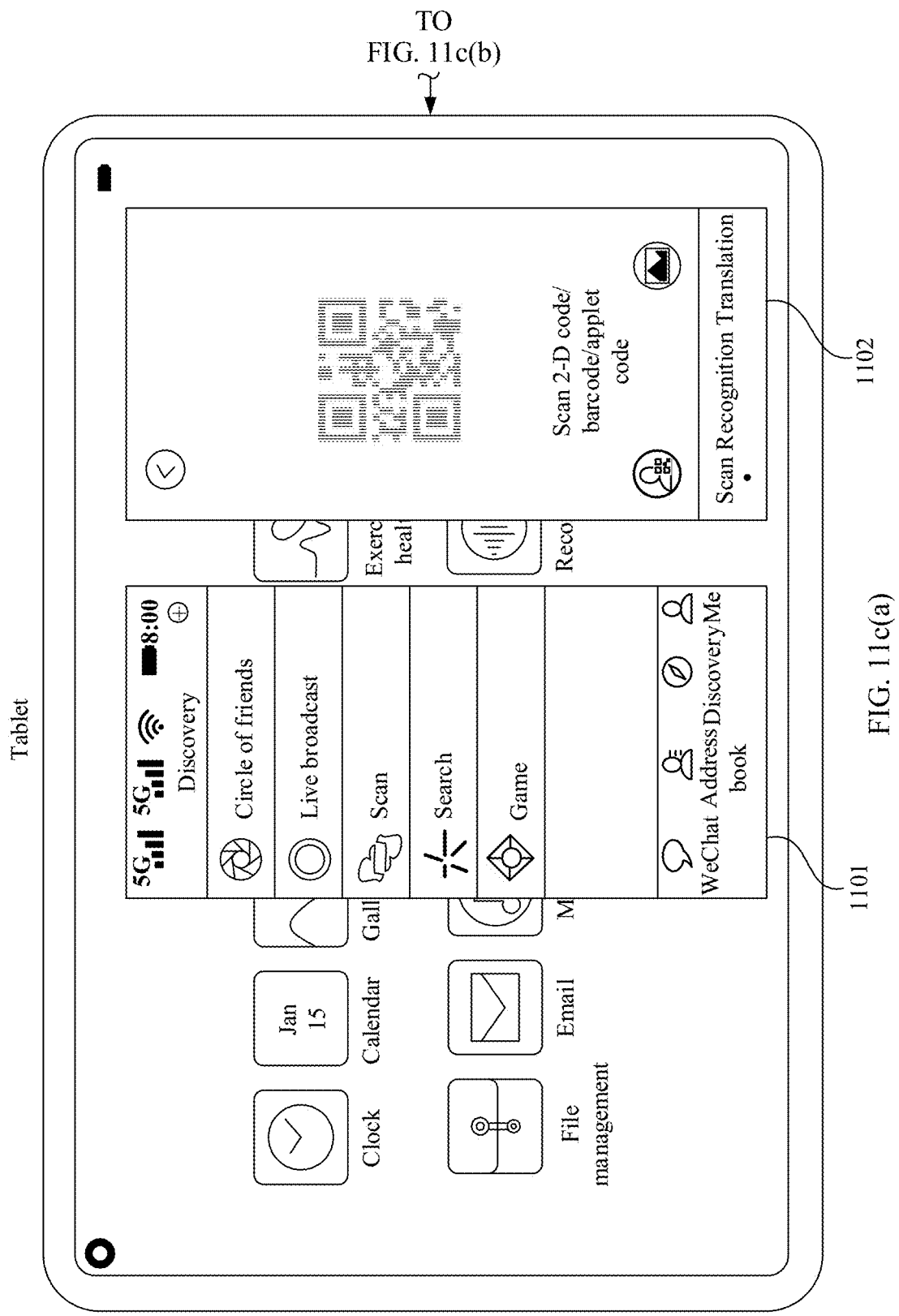
Figure 11C:
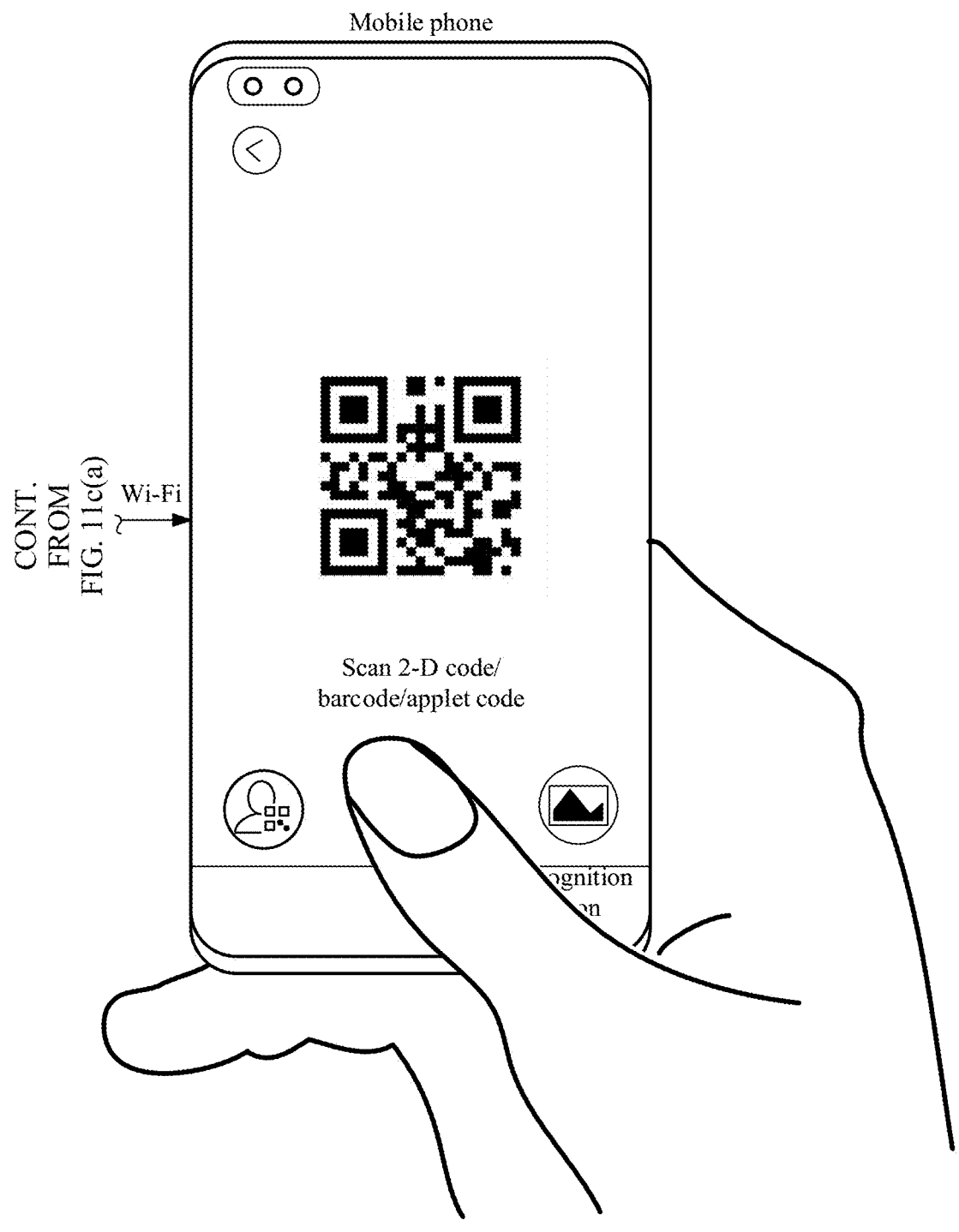
Figure 11D:
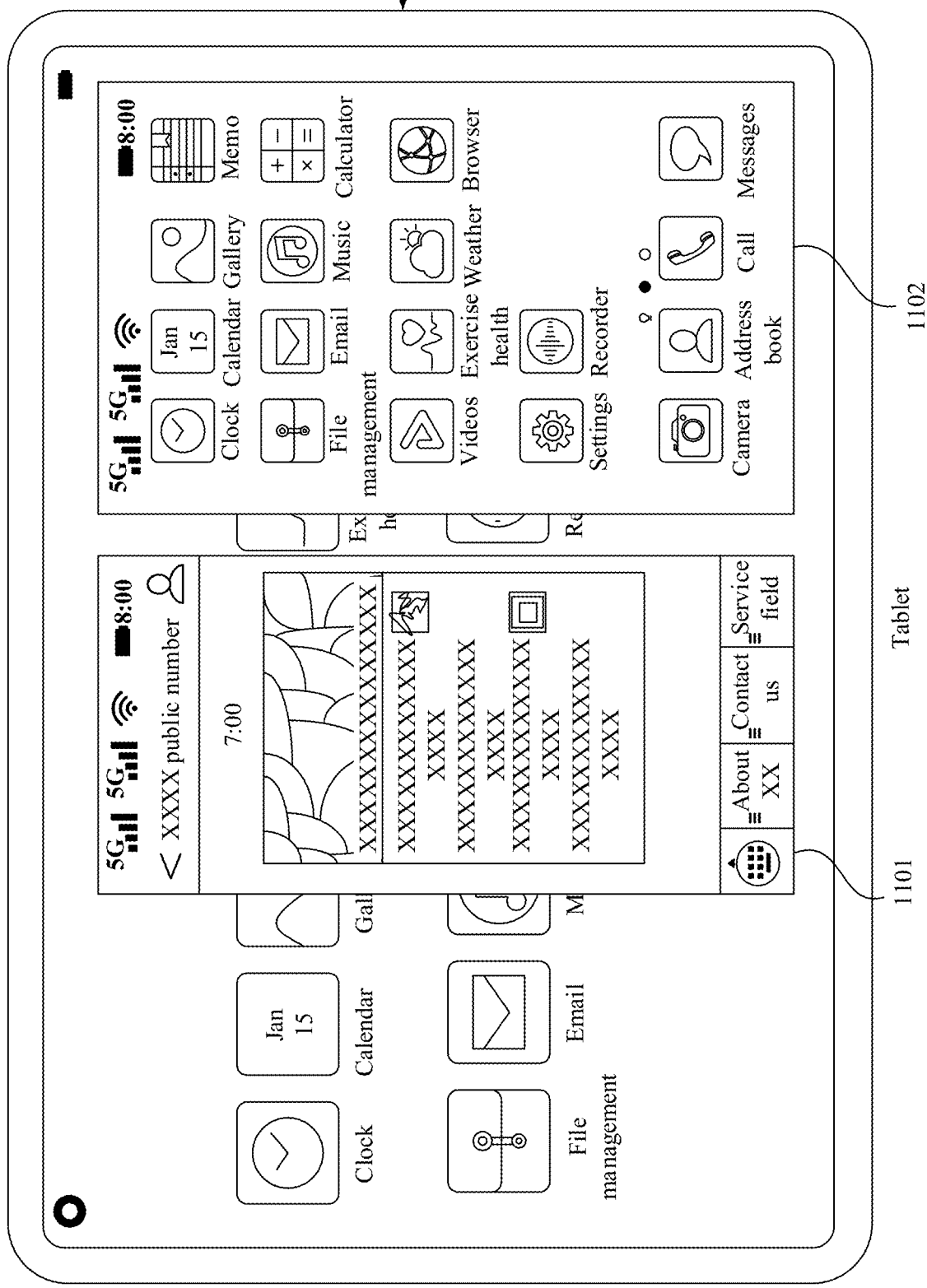
Figure 11D:
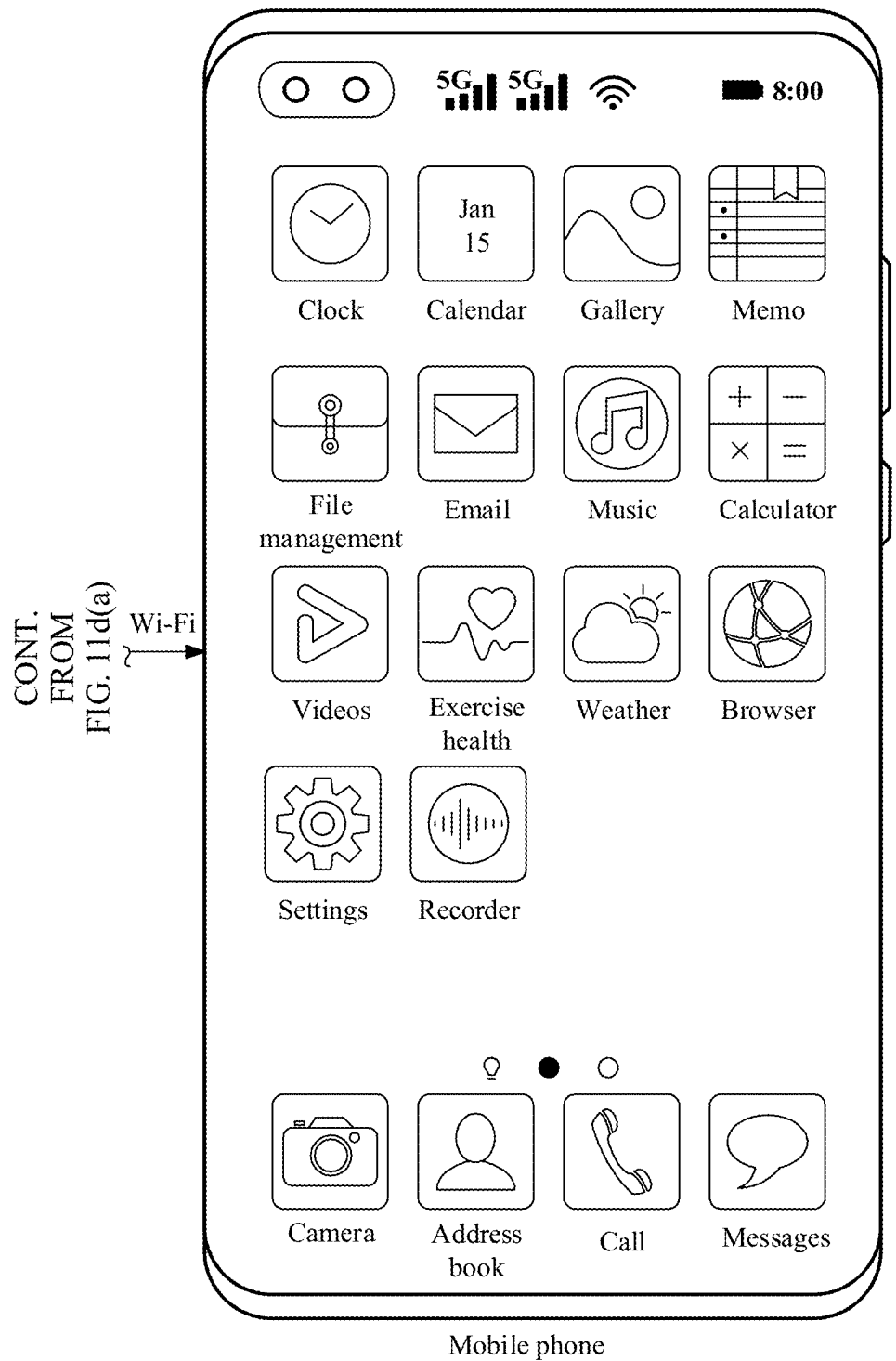

FIG. 11a(a)~FIG. 11d(b) show another application scenario. In this application scenario, a target application is used as an example of WeChat, and a camera function option is used as a scan option, for example, a "Scan" option. As shown in a schematic diagram of an application scenario shown in FIG. 11a(a), a coordination window 1102 on both a display interface of a mobile phone and a display interface of a tablet displays a mobile phone desktop interface, and a coordination window 1101 on a display interface of a tablet displays a display interface of a WeChat task. As shown in FIG. 11a(a), the user taps the discovery option 11011 on the WeChat task display interface in the coordination window 1101. In response to an operation behavior of the user, for a change of interfaces of the tablet and the mobile phone, refer to FIG. 11b(a)~FIG. 11b(b). As shown in FIG. 11b(a)~FIG. 11b(b), a display interface of a coordination window 1101 WeChat discovery task on a display interface of a tablet, and a coordination window 1102 on a display interface of a mobile phone and a display interface of a tablet remain unchanged, and the mobile phone desktop interface continues to be displayed. As shown in FIG. 11b(a)~FIG. 11b(b), the user taps the Scan option on the discovery task display interface in the coordination window 1101. In response to an operation behavior of the user, for a change of interfaces of the tablet and the mobile phone, refer to FIG. 11c(a)~FIG.

11c(b). As shown in FIG. 11c(a)~FIG. 11c(b), the coordination window 1101 on the display interface of the tablet continues to display the display interface of the WeChat discovery task. The display interface of the mobile phone and the coordination window 1102 on the display interface of the tablet simultaneously display the display interface of the WeChat scanning task. As shown in FIG. 11c(a)~FIG. 11c(b), the user moves the mobile phone, so that the mobile phone camera can collect a to-be-scanned two-dimensional code. When the mobile phone camera collects a complete two-dimensional code image, the WeChat scanning task immediately performs a scanning operation to obtain a scanning result. For an interface change between the mobile phone and the tablet, refer to FIG. 11d(a)~FIG. 11d(b). As shown in FIG. 11d(a)~FIG. 11d(b), the display interface of the mobile phone and the coordination window 1102 on the display interface of the tablet are restored to display the desktop interface of the mobile phone, and the coordination window 1101 on the display interface of the tablet displays a display interface corresponding to a scanning result, such as a public number display interface to which a scanned two-dimensional code is linked.

In this application scenario, the tablet displays, in the coordination window 1101, a display interface including a camera function option (such as "Scan") in response to an operation of the user tapping the discovery option on the WeChat task display interface in the coordination window 1101. There are many applications with camera function options, and menu setting levels of camera function options in different applications are also different. When the display interface of the target application is displayed in the coordination window 1101, the display interface including the camera function option may be displayed in the coordination window 1101 in response to one or more operations performed by the user on the display interface as long as the target application has the camera function option.

It should be noted that the WeChat scanning task in the application scenario is corresponding to the foregoing forgetful video camera task, and all of the forgetful video camera tasks belong to one of camera function tasks. For a procedure of the coordination processing method for the WeChat scanning task, refer to a procedure of the coordination window processing method for the WeChat scanning task, and details are not described herein again. In addition, the display interfaces of the mobile phone shown in FIG. 7a(2b) and FIG. 11c(b) each are an interface for capturing information by a camera. A display interface of the mobile phone shown in FIG. 7a(2b) is an interface for capturing an image by a camera: As shown in FIG. 11c(b), a display interface of the mobile phone is an interface on which a camera scans an image. A coordination window 101 shown in FIG. 7c(a) and a coordination window 1101 shown in FIG. 11d(a) each display a display interface on which a target application obtains an information collection result. The coordination window 101 shown in FIG. 7c(a) displays a display interface on which the Memo obtains a photographed image. As shown in FIG. 11d(a), the coordination window 1101 displays a display interface on which the WeChat obtains an image scanning result, that is, a display interface on which a two-dimensional code link is linked. A display interface after the target application obtains the information collection result is different according to different applications, which is not limited in this embodiment.

In this way, in a multi-screen coordination application scenario, a display interface of a camera function task may be displayed on a mobile phone even if a camera function task is started in an application that is displayed in a coordination window (different from display on a screen of a mobile phone). In this case, the user does not need to collect information by using a mobile phone. However, information collection is viewed in a coordination window; which greatly improves convenience of a user operation. In addition, when information collection is completed, a display interface of the first electronic device is restored, and an information collection result is still displayed in an original coordination window, which does not affect user experience.

The technical solutions provided in the embodiments of this application are applicable to applications that adapt to a plurality of tasks of a single application. When the camera function task of the application moves from the coordination window to the display window of the mobile phone, the display interface of the another task of the application may further be displayed in the coordination window; so that the user uses a function corresponding to the another task. For example, when the camera function task of the memo is moved from the coordination window to the display window of the mobile phone, the display interface of the note-taking task of the memo may be further displayed in the coordination window for use by the user.

Scenario 2

In this scenario, a target application is used as an example to describe a specific implementation of this embodiment of this application in detail, where the memo is an application of a non-adaptation single application multi-task. In an optional implementation, a display window of a camera task may be moved to a display interface of a mobile phone by moving an entire memo stack. In another optional implementation, a camera task may be moved to move a display window of a camera task to a display interface of a mobile phone. The following separately explains the two optional implementations.

Figure 12:
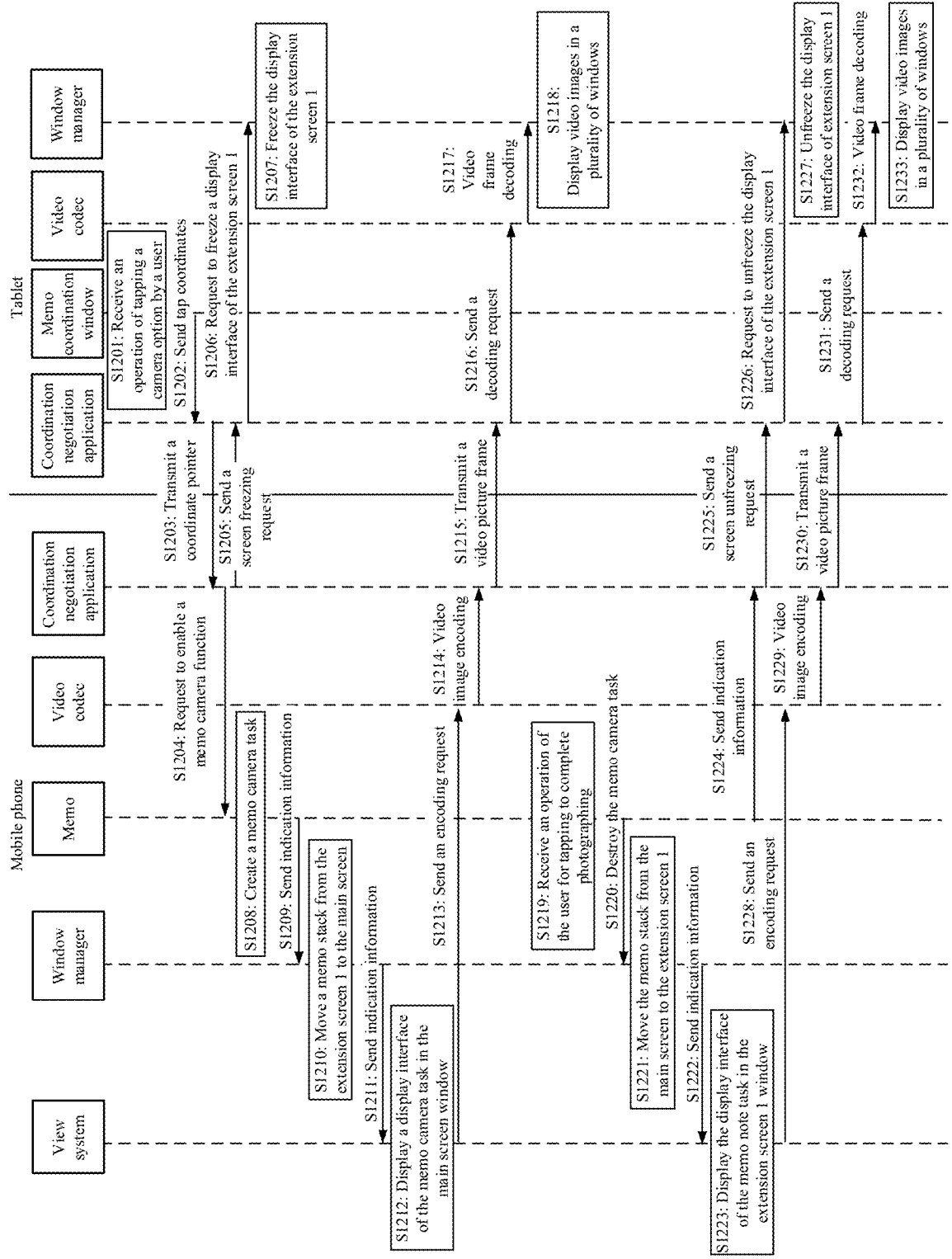
FIG. 12 is a schematic diagram of module interaction according to an embodiment of this application.

For an optional implementation, reference may be made to FIG. 12, which is a schematic interaction diagram of each module. As shown in FIG. 12, a procedure of a coordination window processing method according to an embodiment of this application specifically includes the following steps.

S1201: A memo coordination window of a tablet receives an operation of tapping a camera option by a user.

S1202: The memo coordination window of the tablet sends tap coordinates to a coordination negotiation application of the tablet.

S1203: The coordination negotiation application of the tablet sends a coordinate pointer to a coordination negotiation application of the mobile phone.

S1204: The coordination negotiation application of the mobile phone requests to enable a memo camera function.

For explanation and description of S1201~S1204, refer to the foregoing, and details are not described again.

S1205: The coordination negotiation application of the mobile phone sends a screen freezing request to the coordination negotiation application of the tablet.

The screen freezing request is optionally a request for indicating to freeze a picture in an extension screen window; The screen freezing request may carry extension screen information, such as number information. In this embodiment, the screen freezing request is used to indicate a request for freezing a window picture of the extension screen 1, that is, the screen freezing request carries information about the extension screen 1.

S1206: The coordination negotiation application of the tablet requests a window manager of the tablet to freeze a displayed picture of the extension screen 1.

After receiving the screen freezing request, the coordination negotiation application of the tablet parses the screen freezing request to determine that the extension screen of the displayed picture needs to be frozen. The coordination negotiation application of the tablet sends a request for freezing the displayed picture of the extension screen 1 to the window manager of the tablet, so that the window manager of the tablet performs a freezing operation on the displayed picture of the extension screen 1.

S1207: The window manager of the tablet freezes the displayed picture of the extension screen 1.

The window manager of the tablet acquires a memo note interface image, displays the memo note interface image in the window of the extension screen 1, and locks a display position of the memo note interface image, so as to freeze the displayed picture of the extension screen 1. Optionally, the memo note interface image is a display interface of the memo note task at a moment before the memo camera task starts.

In an optional implementation, the memo note interface image obtained by the window manager of the tablet is actively obtained by the manager of the tablet. Specifically, when receiving the request that is for freezing the displayed picture of the extension screen 1 and sent by the coordination negotiation application of the tablet, the window manager of the tablet acquires, in response to the request, a frame of memo note interface image currently displayed on the extension screen 1.

In another optional implementation, the memo note interface image obtained by the window manager of the tablet is actively obtained by the window manager of the mobile phone, and is sent to the window manager of the tablet. Specifically, after sending the screen freezing request to the coordination negotiation application of the tablet, the coordination negotiation application of the mobile phone sends the indication information to the window manager of the mobile phone. The window manager of the mobile phone obtains, according to the indication information, a frame of memo note interface image currently displayed on the extension screen 1. After an operation such as encoding, encapsulation, decapsulation, and decoding is performed on the frame of memo note interface image, the frame of memo note interface image is sent to a window manager of the tablet.

S1208: The Memo of the mobile phone creates a memo camera task.

Figure 14:
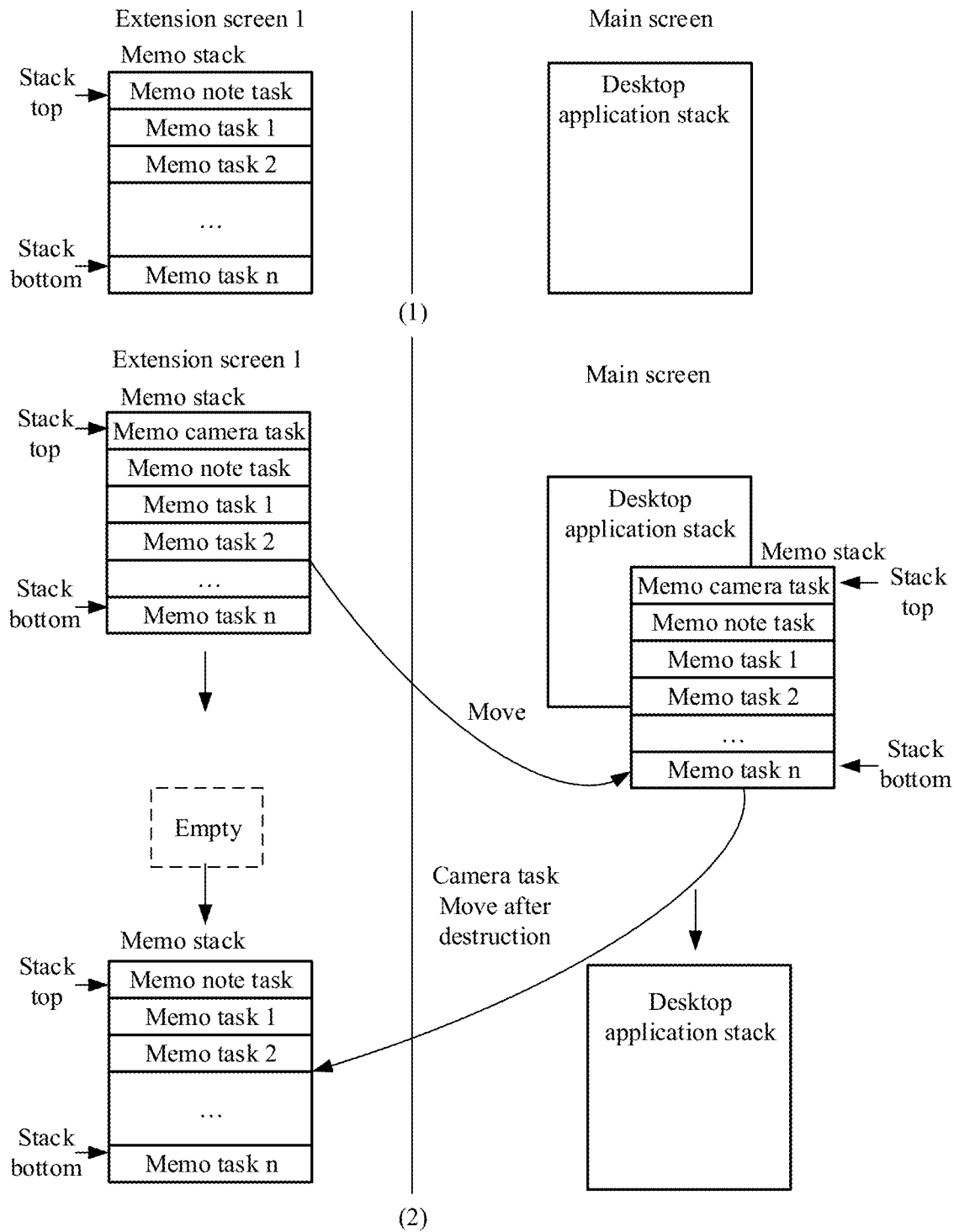
FIG. 14 is a schematic diagram of a relationship between a screen and a stack of an electronic device according to an embodiment of this application.

After receiving the request for starting the memo camera function, the memo of the mobile phone creates a memo camera task on the memo record task. As shown in FIG. 14(1), a memo stack is located in an extension screen 1. Before the Memo creates the memo camera task, the top of the memo stack is a memo note task. As shown in FIG. 14(2), after the Memo creates the memo camera task, the memo camera task enters the memo stack. In this case, the top of the memo stack is the memo camera task.

S1209: The Memo of the mobile phone sends indication information to the window manager of the mobile phone.

The indication information sent by the memo of the mobile phone to the window manager of the mobile phone may be used to indicate the window manager of the mobile phone to move the memo stack between the main screen and the extension screen. In this embodiment, the indication information is used to indicate the window manager of the mobile phone to move the memo stack from the extension screen 1 to the main screen.

S1210: The window manager of the mobile phone moves the memo stack from the extension screen 1 to the main screen.

The window manager of the mobile phone releases a correspondence between the memo stack and the extension screen 1, that is, sets an upper-level of the memo stack to be empty. The correspondence between the memo stack and the extension screen 1 is released, that is, the memo stack is taken out from the extension screen 1. In addition, the window manager of the mobile phone establishes a correspondence between the memo stack and the main screen, that is, sets a superior of the memo stack to the main screen. A correspondence between the memo stack and the main screen is established, that is, the memo stack is put into the main screen. As shown in FIG. 14(1), an example in which only a desktop application stack exists in the main screen is used. After the correspondence between the memo stack and the main screen is established, the memo stack is placed on the main screen and overlies the desktop application stack. Reference may be made to FIG. 14(2). For example, if there are a plurality of stacks successively covered on the main screen, after the memo stack is placed on the main screen, the memo stack covers the plurality of stacks.

As shown in FIG. 14(2), because only a memo stack exists in the extension screen 1 before the memo stack is moved, no stack exists in the extension screen 1 after the memo stack is moved, and the extension screen 1 is empty. For example, when the extension screen is empty, there is no image in the window display interface of the extension screen, and may be filled with a black pixel.

S1211: The window manager of the mobile phone sends indication information to the view system of the mobile phone.

The indication information sent by the window manager of the mobile phone to the view system of the mobile phone may be used to instruct the view system to refresh a window display interface of each screen.

S1212: The view system of the mobile phone displays the display interface of the memo camera task in the main screen window.

The view system of the mobile phone refreshes window display interfaces of the main screen and the extension screen 1 according to the indication information. In the main screen window; a display interface of a task of the memo camera is displayed, and no image is displayed in the extension screen 1 window; such as black screen display.

As shown in FIG. 14(2), in the main screen, because the memo stack covers the desktop application stack, the main screen window displays a window corresponding to the memo stack, that is, displays a display interface of the memo video camera task in the memo stack. In addition, there is no stack in the extension screen 1, and no image is displayed in the extension screen 1 window; which may be shown by using a black screen as an example.

For example, the window manager of the mobile phone mirrors window display interfaces of the main screen and the extension screen 1 in the main screen buffer to the virtual screen buffer.

S1213: The view system of the mobile phone sends a coding request to a video codec of the mobile phone.

S1214: The video codec of the mobile phone encodes video images.

The window manager of the mobile phone sends the video image displayed on the main screen in the virtual screen buffer to the video codec for coding, so as to generate a video image frame.

S1215: The coordination negotiation application of the mobile phone transmits a video image frame to the coordination negotiation application of the tablet.

In a scenario in which a Wi-Fi connection is established between the mobile phone and the tablet, the coordination negotiation application of the mobile phone may implement transmission of a video image frame in a form of a data packet to the coordination negotiation application of the tablet based on a Wi-Fi driver of the mobile phone and a Wi-Fi driver of the tablet.

S1216: The coordination negotiation application of the tablet sends a decoding request to the video codec of the tablet.

S1217: The video codec of the tablet decodes the video image frame.

For explanation and description of S1201~S1204, refer to the foregoing, and details are not described again.

S1218: The window manager of the tablet displays the video images in a plurality of windows.

The window manager of the tablet displays the received video images in a plurality of coordination windows displayed on the display interface of the tablet according to the screen windows to which the video image belongs.

In this embodiment, the window manager of the tablet displays, on the display interface of the tablet, the video image corresponding to the display interface of the memo camera task in the coordination window corresponding to the main screen window.

Because there is no image in the extension screen 1, there is no video image display in the coordination window corresponding to the extension screen 1 window displayed on the display interface of the tablet. In addition, the coordination negotiation application of the mobile phone also sends a screen freezing request (refer to S1205~S1207) to the coordination negotiation application of the tablet when the coordination negotiation application of the mobile phone requests to start the memo camera function. Therefore, the memo note interface image is displayed in the coordination window corresponding to the extension screen 1 window displayed on the display interface of the tablet.

It should be noted that if an image of a memo note interface is not locked and displayed in a coordination window corresponding to an extension screen 1 window displayed on a display interface of a tablet, no video image is displayed in the coordination window, for example, may be a black screen.

Figure 15:
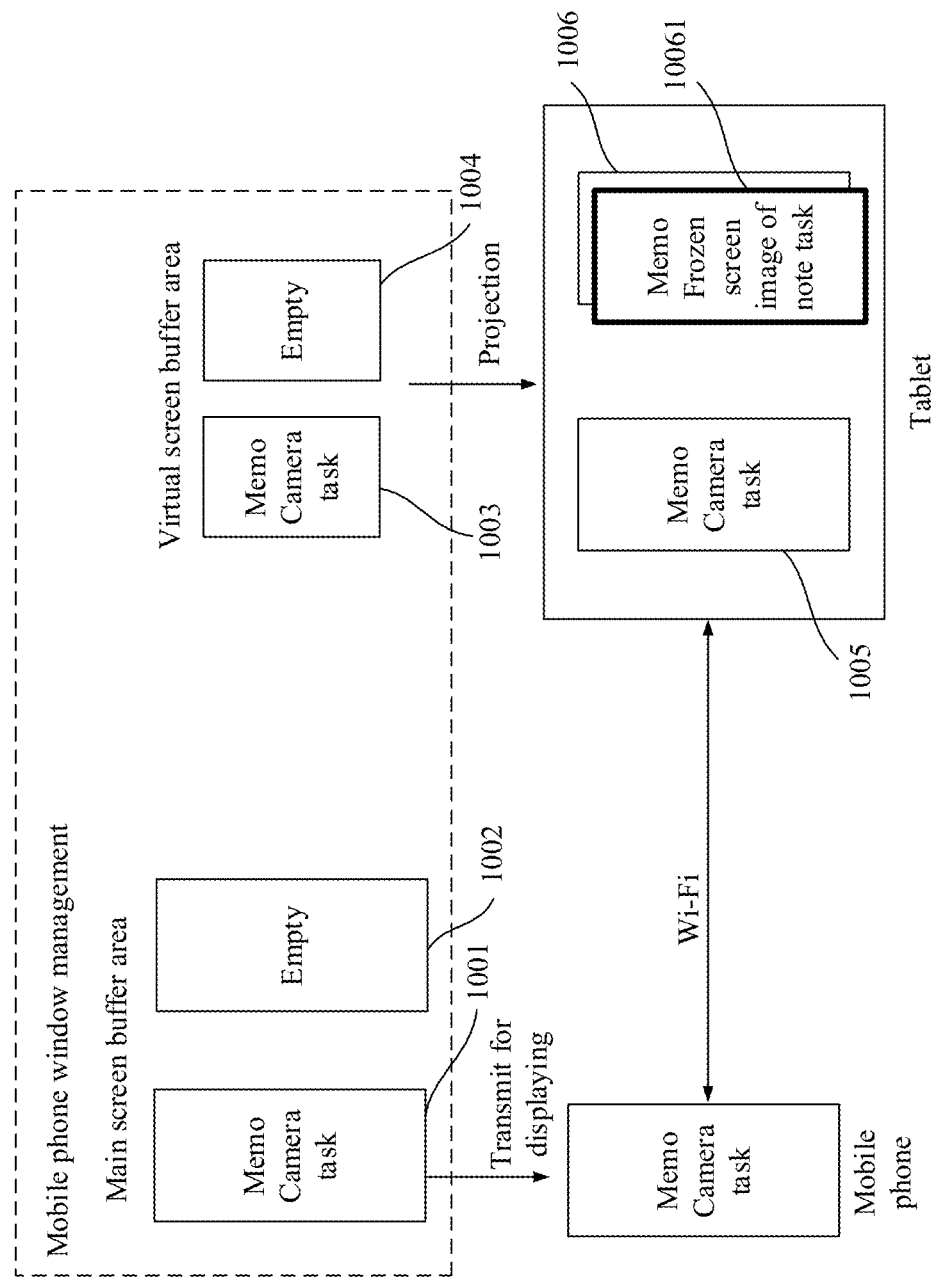
FIG. 15 is a schematic diagram of an application scenario shown by way of example.

FIG. 15 is a schematic diagram of an application scenario shown by way of example. Before the window manager performs the coordination window camera task transfer procedure, as shown in FIG. 10a, details are not described again. After the window manager executes the coordination window camera task moving procedure, as shown in FIG. 15, in the main screen buffer, a display interface of the memorized video camera task is displayed in the main screen window 1001, and no video image is displayed in the expansion screen 1 window 1002. The display interface of the memorized video camera task displayed in the main screen window 1001 is directly sent to the display interface of the mobile phone for display. In addition, each screen window of the main screen buffer is mirrored into the virtual screen buffer. In the virtual screen buffer, the main screen window 1003 displays the display interface of the memorized video camera task, and no video image is displayed in the expansion screen 1 window 1004. A display interface of each screen window in the virtual screen buffer is corresponding to a coordination window projected on the display interface of the tablet. The coordination window 1005 is corresponding to the primary screen window 1003, and displays a display interface of a task of the memo camera. The coordination window 1006 is corresponding to the extension screen 1 window 1004, and no video image is displayed. Because the window manager of the tablet performs screen freezing processing in the coordination window 1006, the memo note interface image (screen freezing image of the memo note task) 10061 is locked in the coordination window 1006, and no black screen phenomenon occurs in the coordination window 1006.

Figure 13A:
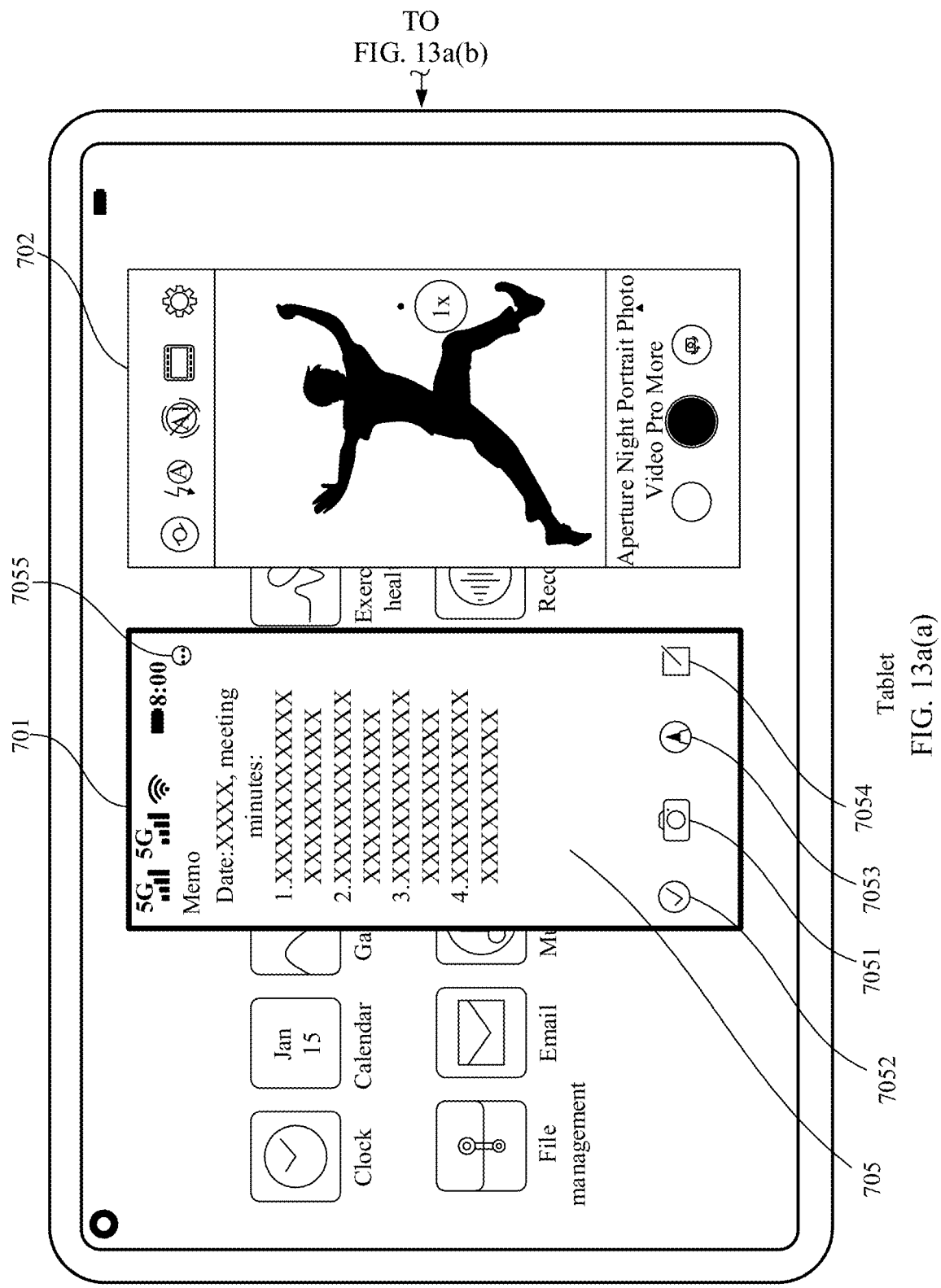
FIG. 13a(a)~FIG. 13b(b) are schematic diagrams of application scenarios shown by way of example.
Figure 13A:
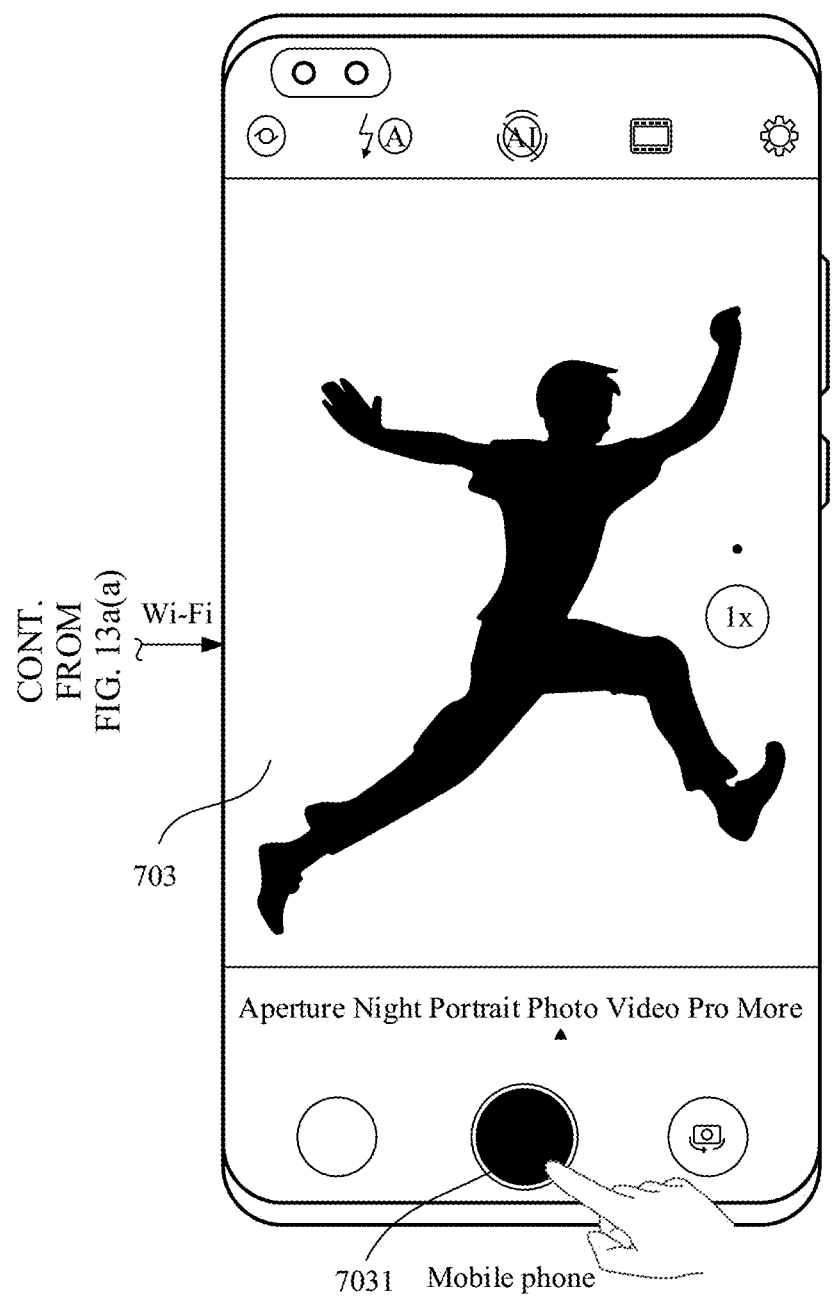
Figure 13B:
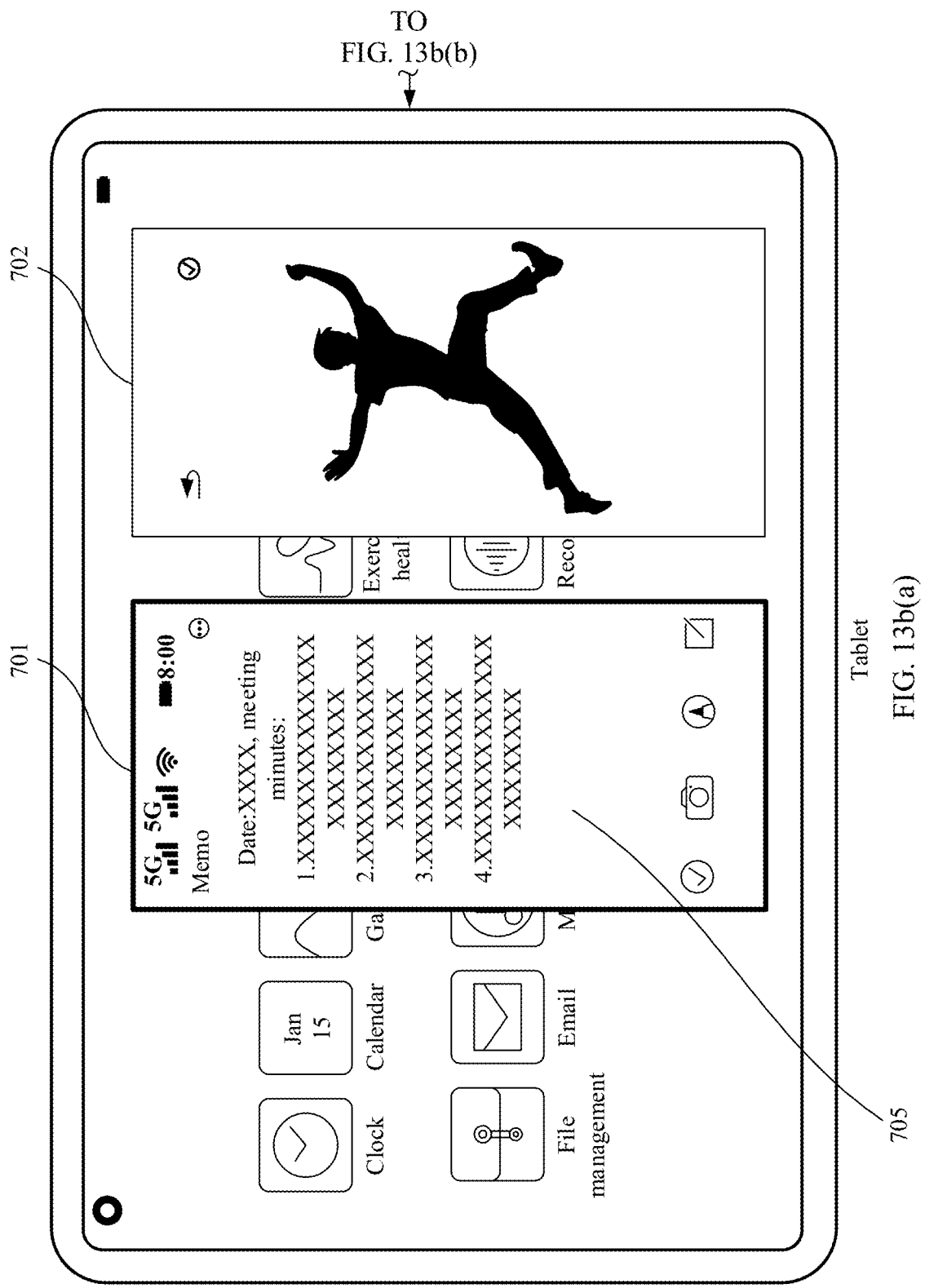
Figure 13B:
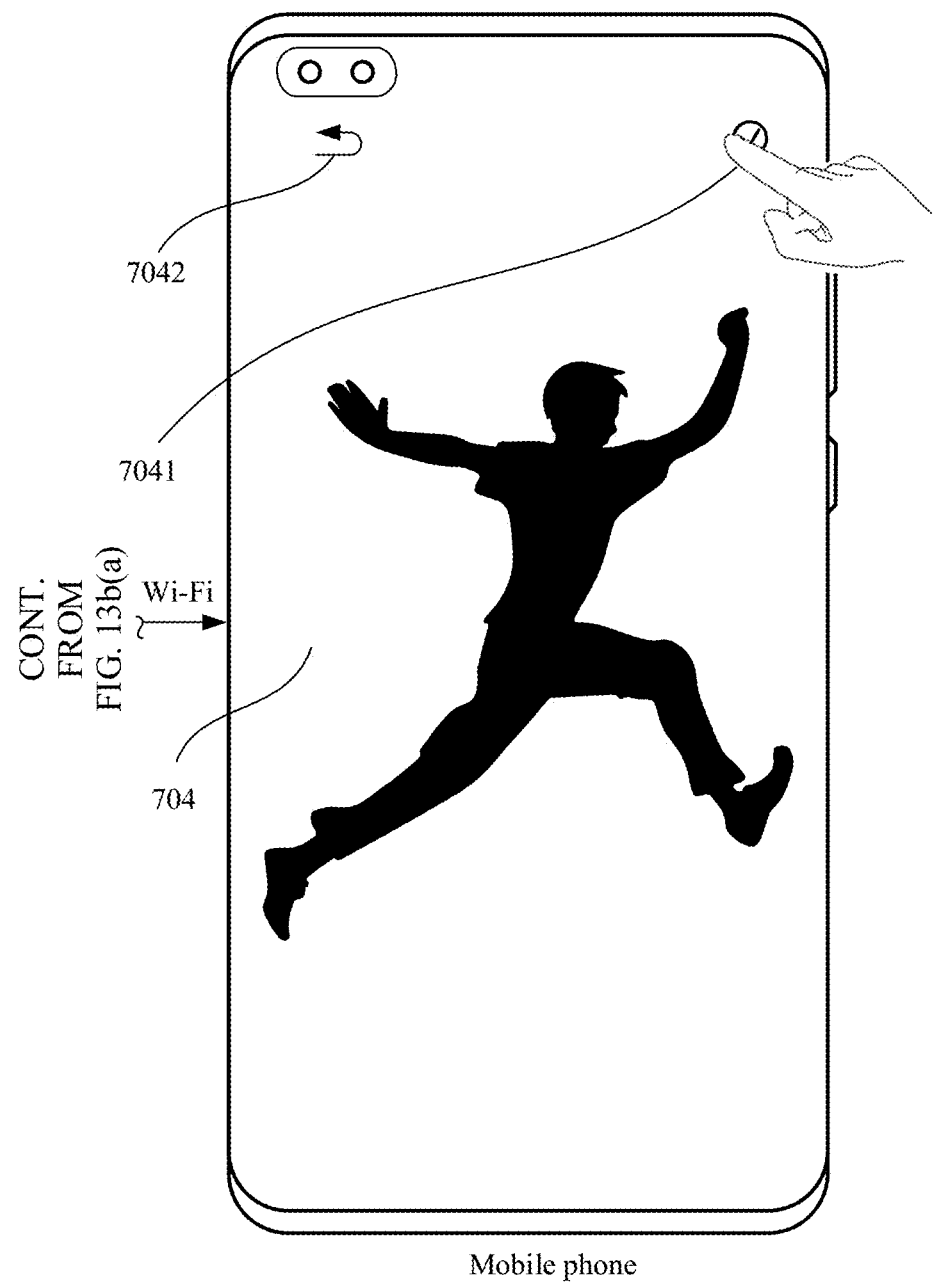

Continue to refer to schematic diagrams of application scenarios shown in FIG. 7a(1a)~FIG. 7a(1b) and FIG. 13a(a)~FIG. 13b(b). As shown in FIG. 7a(1a)~FIG. 7a(1b), the user taps the camera option 7012 on the display interface of the memo note task in the coordination window 701 on the display interface of the tablet. In response to an operation behavior of the user, for a change of interfaces of the tablet and the mobile phone, refer to FIG. 13a(a)~FIG. 13a(b). As shown in FIG. 13a(a)~FIG. 13a(b), an image 705 of a memo note interface is displayed on a coordination window 701 on a display interface of a tablet, and a display interface of a function task of a memo camera is simultaneously displayed on a coordination window 702 on a display interface of a mobile phone 703 and a display interface of a tablet. The memo note interface image 705 is an image displayed in the coordination window 701 on the display interface of the tablet when the user taps the camera option 7011 on the display interface of the memo note task.

In this case, as shown in FIG. 13a(a)~FIG. 13a(b), the user may tap the camera option 7031 in the display interface 703 of the mobile phone to implement a photographing operation. For example, the mobile phone and the tablet respond to an operation behavior of the user, and for a change of interfaces of the tablet and the mobile phone, reference may be made to FIG. 13b(a)~FIG. 13b(b). As shown in FIG. 13b(a)~FIG. 13b(b), a memo note interface image 705 continues to be displayed on the coordination window 701 on the display interface of the tablet, and a photo preview is displayed on the coordination window 702 and the display interface 704 of the mobile phone on the display interface of the tablet. When the user taps the Back option 7042 on the display interface 704 of the mobile phone, the tablet and the mobile phone interface return to the interface shown in FIG. 13a(a)~FIG. 13a(b). When the user determines that the photographing preview picture meets the user requirement, the user may tap an OK option 7041 to instruct to complete photographing.

It should be noted that, as shown in FIG. 13a(a)~FIG. 13a(b), a memo note interface image 705 is displayed in the coordination window 701 of the tablet. Although the memo note interface image 705 is a display interface of a memo note task, the memo note interface image 705 cannot be operated by the user. For example, that is, the options 7051~7055 in the memo note interface image 705 cannot be used for a tap operation. For example, the options 7051~7055 may be set to gray to remind the user that the operation cannot be performed.

S1219: The Memo of the mobile phone receives an operation of the user for tapping to complete photographing.

The user taps to complete the photographing operation on the display interface of the memo camera function task on the display interface of the mobile phone. As shown in FIG. 13b(a)~FIG. 13b(b), the user taps the OK option 7041 in the display interface 704 of the mobile phone. The operation of tapping the OK option 7041 is to indicate, to the memo camera function, that photographing is completed.

S1220: The Memo of the mobile phone destroys the memo camera task.

In response to the user tapping to complete the photographing operation, the Memo destroys the memo camera task.

S1221: The window manager of the mobile phone moves the memo stack from the main screen to the extension screen 1.

After the memo camera task is destroyed, a top of the memo stack is a memo note task, and the main screen moves back to the extension screen 1. Refer to FIG. 14(2).

The window manager of the mobile phone releases the correspondence between the memo stack and the main screen, that is, sets the upper-level of the memo stack to null. The correspondence between the memo stack and the main screen is released, that is, the memo stack is taken out from the main screen. In addition, the window manager of the mobile phone establishes a correspondence between the memo stack and the extension screen 1, that is, sets a superior of the memo stack to the extension screen 1. A correspondence between the memo stack and the extension screen 1 is established, that is, the memo stack is placed in the extension screen 1. As shown in FIG. 14(2), after a correspondence between a memo stack and a main screen is released, only a desktop application stack exists on the main screen. After a correspondence between the memo stack and the extension screen 1 is established, the memo stack is placed in the extension screen 1, and in this case, the extension screen 1 changes from having no stack to having a memo stack.

S1222: The window manager of the mobile phone sends indication information to the view system of the mobile phone.

The indication information sent by the window manager of the mobile phone to the view system of the mobile phone is used to instruct the view system to refresh a window display interface of each screen.

S1223: The view system of the mobile phone displays the display interface of the memo note task in the extension screen 1 window;

The view system of the mobile phone refreshes window display interfaces of the main screen and the extension screen 1 according to the indication information. The display interface of the main screen window switches back to the mobile phone desktop interface, and the expansion screen 1 window continues to display the display interface of the memo note task.

As shown in FIG. 14(2), only a desktop application stack exists in a main screen, and a main screen window displays a window corresponding to the desktop application stack, that is, displays a mobile phone desktop. In addition, only a memo stack exists in the extension screen 1, and a window of the extension screen 1 displays a window corresponding to the memo stack, that is, displays a display interface of the memo note task on the top of the memo stack.

For example, the window manager of the mobile phone mirrors window display interfaces of the main screen and the extension screen 1 in the main screen buffer to the virtual screen buffer.

S1224: The Memo of the mobile phone sends indication information to the coordination negotiation application of the mobile phone.

After destroying the memo camera task, the memo of the mobile phone sends indication information to the coordination negotiation application of the mobile phone. The indication information may be used to indicate that a task of the memo camera has been destroyed.

S1225: The coordination negotiation application of the mobile phone sends an unfreeze request to the coordination negotiation application of the tablet.

The unfreeze request is optionally a request for instructing to unfreeze the expansion screen. The unfreeze request may carry extension screen information, such as number information. In this embodiment, the unfreezing screen request is used to indicate a request for unfreezing a window picture of the extension screen 1, that is, the unfreezing screen request carries information about the extension screen 1.

S1226: The coordination negotiation application of the tablet requests the window manager of the tablet to cancel freezing of the display picture of the extension screen 1.

After receiving the unfreezing screen request, the coordination negotiation application of the tablet parses the unfreezing screen request to determine an extension screen on which unfreezing of a display screen needs to be performed. The coordination negotiation application of the tablet sends a request for unfreezing the display picture of the extension screen 1 to the window manager of the tablet, so that the window manager of the tablet performs an operation of unfreezing the display picture of the extension screen 1.

S1227: The window manager of the tablet releases freezing of the display picture of the extension screen 1.

The window manager of the tablet closes the memo note interface image displayed in the window of the extension screen 1, and re-displays the window of the extension screen 1, so as to cancel freezing of the display screen of the extension screen 1. That is, after the window manager of the tablet cancels freezing of the display picture of the extension screen 1, a window interface of the extension screen 1 is displayed in a coordination window corresponding to the extension screen 1 on the display interface of the tablet.

S1228: The view system of the mobile phone sends a coding request to a video codec of the mobile phone.

S1229: The video codec of the mobile phone encodes video images.

S1230: The coordination negotiation application of the mobile phone transmits a video image frame to the coordination negotiation application of the tablet.

S1231: The coordination negotiation application of the tablet sends a decoding request to the video codec of the tablet.

S1232: The video codec of the tablet decodes the video image frame.

For explanation and description of S1201~S1204, refer to the foregoing, and details are not described again.

S1233: The window manager of the tablet displays the video images in a plurality of windows.

The window manager of the tablet displays the received video images in a plurality of coordination windows displayed on the display interface of the tablet according to the screen windows to which the video images belong. That is, the window manager of the tablet displays the video image corresponding to the desktop interface in the coordination window that is corresponding to the main screen window and that is displayed on the display interface of the tablet. The window manager of the tablet displays the video image corresponding to the display interface of the memo note task in the coordination window that is corresponding to the extension screen 1 window and that is displayed on the display interface of the tablet. In this case, continue to refer to FIG. 10a, and details are not described herein again.

Based on the foregoing FIG. 7a(1a)~FIG. 7a(1b) and FIG. 13a(a)~FIG. 13b(b), in response to an operation in which the user taps the OK option 7041 (that is, completes photographing) in the display interface 704 of the mobile phone, for a change of interfaces of the tablet and the mobile phone, reference may be made to FIG. 7c(a)~FIG. 7c(b), and details are not described again.

It should be noted that S1205 to S1207 may be executed before S1208 to S1217, or may be executed at the same time as S1208 to S1217. This is not limited. It is only necessary to complete freezing of the coordination window corresponding to the extension screen 1 before refreshing and displaying the coordination window of the tablet. S1225 to S1227 may be performed before S1228 to S1232, or may be performed at the same time as S1228 to S1232. This is not limited. It is only necessary to complete, before the display is refreshed in the coordination window of the tablet, unfreezing of the coordination window corresponding to the extension screen 1.

In this way, in a multi-screen coordination application scenario, a display window of a camera function task may be moved to a display interface of a mobile phone even if a camera function task is invoked in an application displayed in a coordination window; In this case, the user can complete image collection and image photographing by using only one hand, which greatly improves convenience of the user operation. In addition, when the user completes photographing, display of the coordination window is restored, and use experience of the user is not affected. The technical solution provided in this implementation is applicable to an application of a non-adaptation single application multi-task. When a camera task of the application is moved from a coordination window to a display window of the mobile phone, another task of the application cannot be provided for use by the user, but locking an original coordination window of the display application in a screen freezing manner does not affect visual experience of the user.

Figure 16:
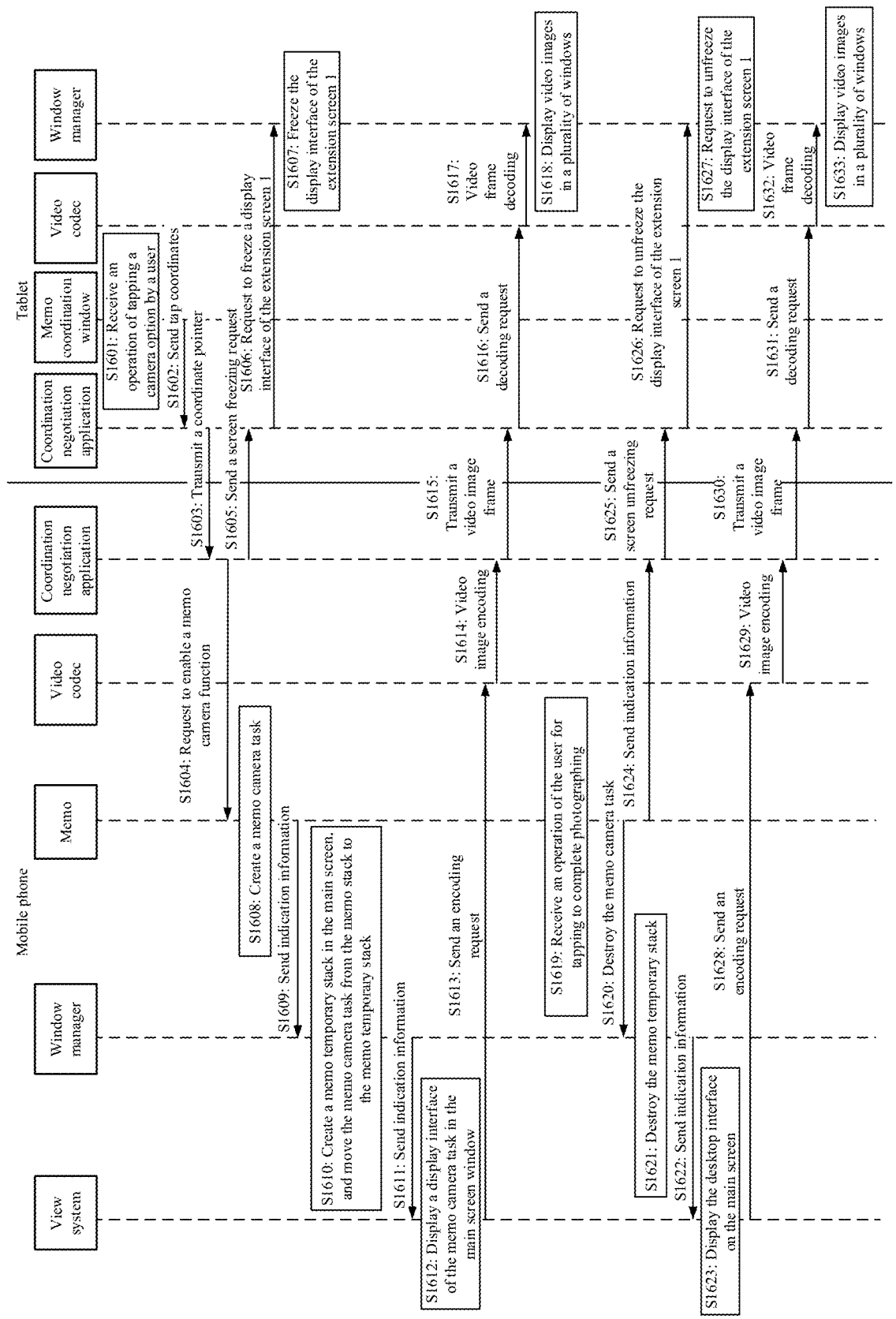
FIG. 16 is a schematic diagram of module interaction according to an embodiment of this application.

For an optional implementation, reference may be made to FIG. 16, which is a schematic interaction diagram of each module. As shown in FIG. 16, a procedure of a coordination window processing method according to an embodiment of this application specifically includes the following steps.

S1601: A memo coordination window of a tablet receives an operation of tapping a camera option by a user.

S1602: The memo coordination window of the tablet sends tap coordinates to a coordination negotiation application of the tablet.

S1603: The coordination negotiation application of the tablet sends a coordinate pointer to a coordination negotiation application of the mobile phone.

S1604: The coordination negotiation application of the mobile phone requests to enable a memo camera function.

S1605: The coordination negotiation application of the mobile phone sends a screen freezing request to the coordination negotiation application of the tablet.

S1606: The coordination negotiation application of the tablet requests the window manager of the tablet to freeze a displayed picture of the extension screen 1.

S1607: The window manager of the tablet freezes the displayed picture of the extension screen 1.

For explanation and description of S1201~S1204, refer to the foregoing, and details are not described again.

S1608: The Memo of the mobile phone creates a memo camera task.

Figure 17:
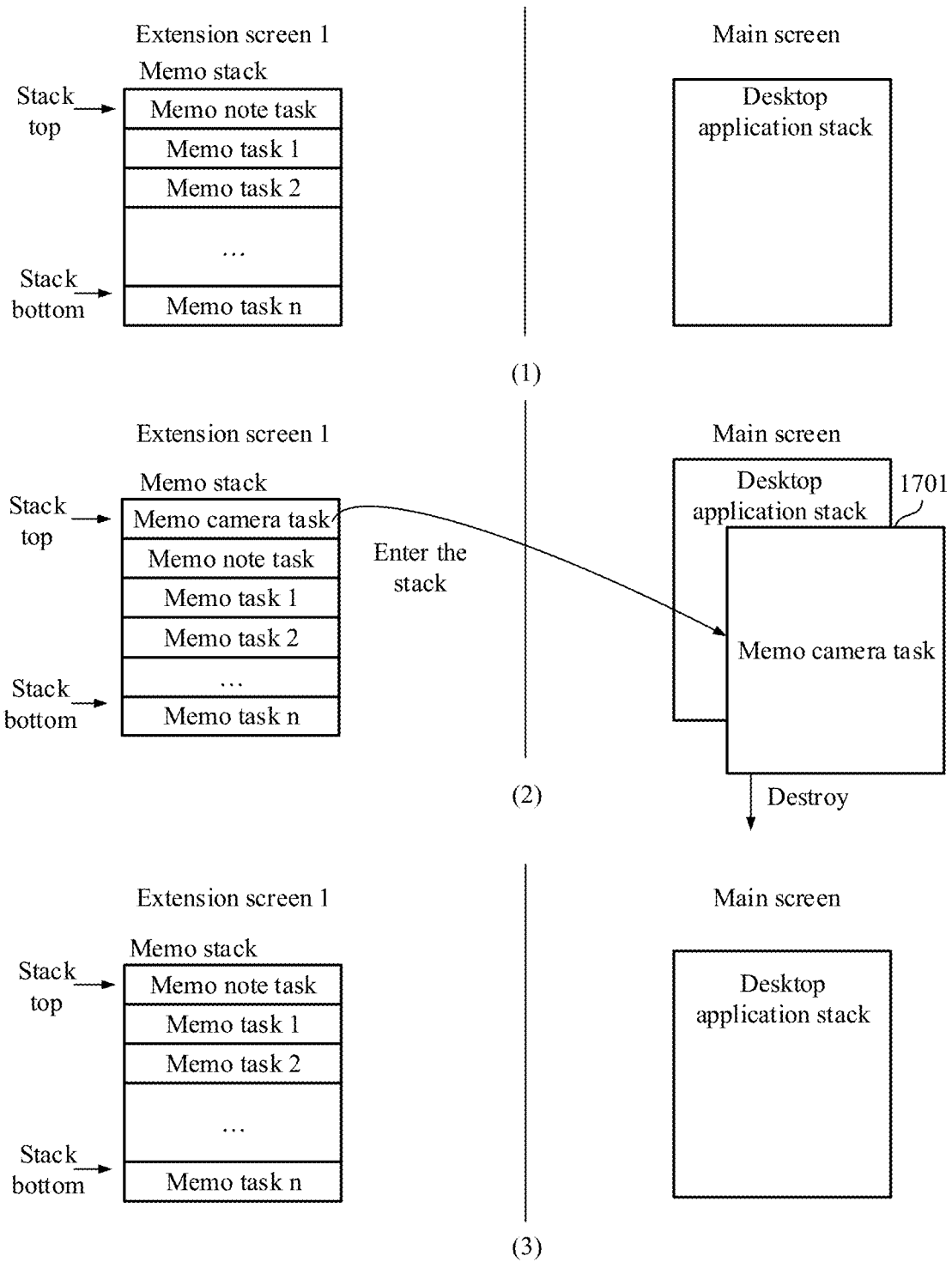
FIG. 17 is a schematic diagram of a relationship between a screen and a stack of an electronic device according to an embodiment of this application.

After receiving the request for starting the memo camera function, the Memo of the mobile phone creates a memo camera task on the memo note task. As shown in FIG. 17(1), a memo stack is located in an extension screen 1. Before the Memo creates the memo camera task, the top of the memo stack is a memo note task. As shown in FIG. 17(2), after the Memo creates the memo camera task, the memo camera task enters the memo stack. In this case, the top of the memo stack is the memo camera task.

S1609: The Memo of the mobile phone sends indication information to the window manager of the mobile phone.

The indication information sent by the Memo of the mobile phone to the window manager of the mobile phone may be used to indicate the window manager of the mobile phone to move the memo camera task from the extension screen 1 to the main screen.

S1610: The window manager of the mobile phone creates a memo temporary stack in the main screen, and moves the memo camera task from the memo stack to the memo temporary stack.

In this scenario, because the Memo does not adapt to single-application multi-task, the Memo cannot declare to display the memo camera task on a newly created window; Therefore, the window manager of the mobile phone creates a memo temporary stack in the main screen according to the indication information, so as to display the display interface of the memo camera task.

As shown in FIG. 17(2), the window manager of the mobile phone creates a memo temporary stack 1701 in the main screen 1 according to the indication information, and moves the memo camera task from the memo stack to the memo temporary stack 1701. It should be noted that in the main screen, a newly created or newly opened stack covers a currently opened stack, and correspondingly, a display window of the main screen changes accordingly. In this example, in the main screen, the newly created memo temporary stack covers the desktop application stack. Before the desktop application stack is covered, a display window corresponding to the desktop application stack is displayed on the main screen. After the desktop application stack is covered, a display window corresponding to the memo temporary stack is displayed on the main screen. Before the memo camera task is moved from the memo stack to the memo temporary stack 1701, the top of the memo stack is the memo camera task, and the memo temporary stack is empty. After the memo camera task is moved from the memo stack to the memo temporary stack 1701, the top of the memo stack is the memo note task, and the memo temporary stack 1701 includes only the memo camera task.

Figure 18:
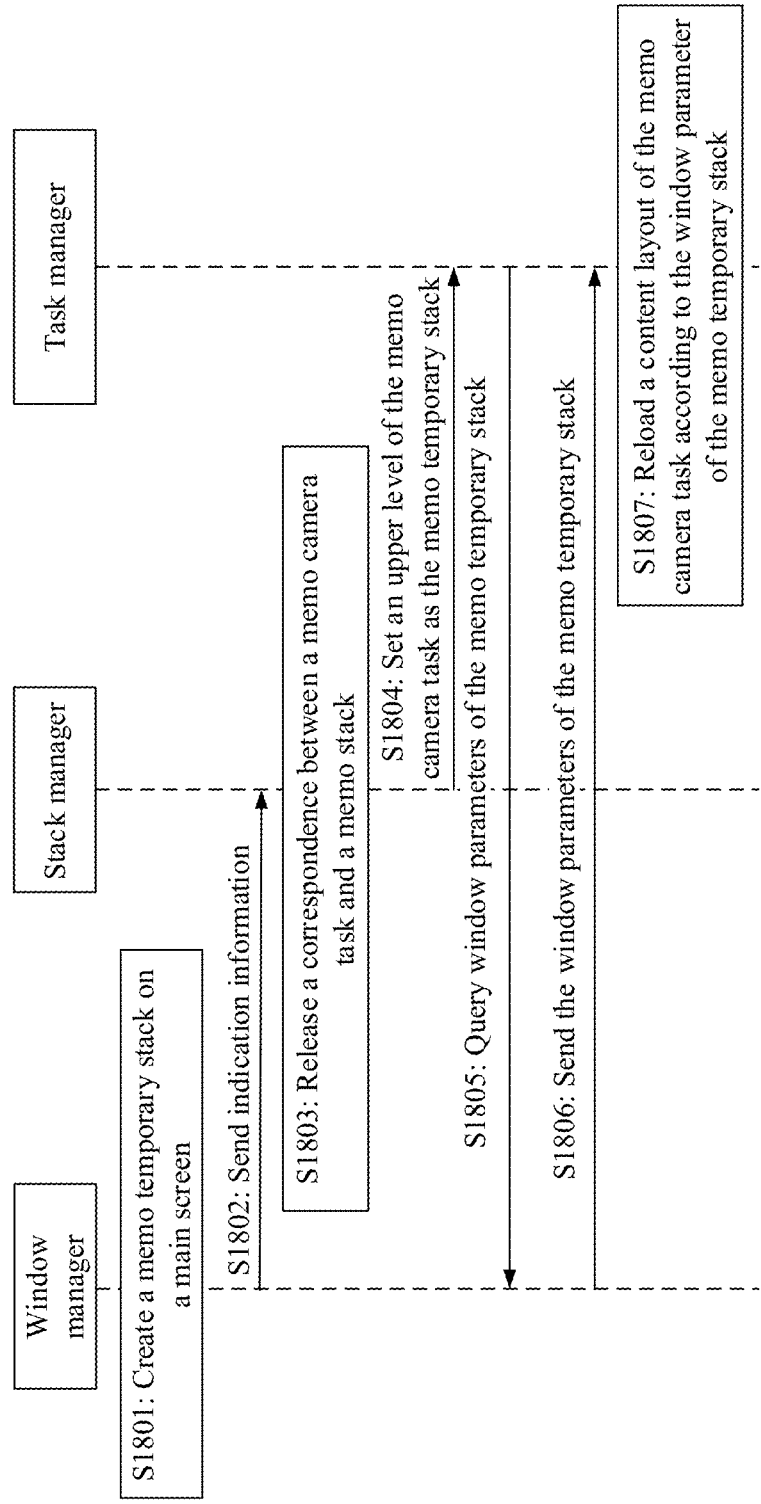
FIG. 18 is a schematic diagram of module interaction according to an embodiment of this application.

FIG. 18 is a schematic diagram of interaction between modules. As shown in FIG. 18, a migration procedure of a coordination window camera task according to an embodiment of this application includes the following steps.

S1801, the window manager creates a memo temporary stack in the main screen.

As shown in FIG. 17(1), only a desktop application stack exists in the main screen. After the Memo creates the memo camera task, the window manager creates the memo temporary stack 1701 in the main screen. Refer to FIG. 17(2). The memo temporary stack 1701 is configured to move the memo camera task from the extension screen 1 to the main screen.

After creating the memo temporary stack 1701, both the memo temporary stack 1701 and the desktop application stack exist in the main screen. Because the memo temporary stack 1701 is newly created, the memo temporary stack 1701 covers the memo stack. Refer to FIG. 17(2). For coverage of the stack on the screen, refer to the foregoing description. Details are not described herein again.

S1802: The window manager sends indication information to a stack manager.

The window manager sends the indication information to the stack manager to instruct to move the memo camera task from the memo stack to the memo temporary stack.

S1803: The stack manager releases a correspondence between the memo camera task and the memo stack.

The stack manager releases, according to the indication information, the correspondence between the memo stack and the memo camera task, that is, sets an upper level of the memo camera task to be empty, that is, removes the memo camera task from the memo stack.

S1804: The stack manager sets the upper level of the memo camera task as the memo temporary stack.

The stack manager sets, according to the indication information, the upper level of the memo camera task as the memo temporary stack, that is, establishes a correspondence between the memo camera task and the memo temporary stack.

S1805: The task manager queries the window manager for window parameters of the memo temporary stack.

The window parameters may include but are not limited to a window size and a window location.

S1806: The window manager sends the window parameters of the memo temporary stack to the task manager.

The window manager sends indication information to the task manager, where the indication information may include the window parameters such as the window size and the window location.

S1807: The task manager reloads a content layout of the memo camera task according to the window parameter of the memo temporary stack.

The task manager reloads content of the memo camera task according to the window parameters of the memo temporary stack to implement the content layout of the memo camera task. That is, the memo camera task is placed in the memo temporary stack, and a display interface of the memo camera task is displayed in a window corresponding to the memo temporary stack.

S1611: The window manager of the mobile phone sends indication information to the view system of the mobile phone.

The indication information sent by the window manager of the mobile phone to the view system of the mobile phone may be used to instruct the view system to refresh a window display interface of each screen.

S1612: The view system of the mobile phone displays the display interface of the memo camera task in the main screen window.

The view system of the mobile phone refreshes window display interfaces of the main screen and the extension screen 1 according to the indication information. The display interface of the memo camera task is displayed in the main screen window; and the display interface of the memo note task is displayed in the expansion screen 1 window.

As shown in FIG. 17(2), in the main screen, because the memo temporary stack covers the desktop application stack, the main screen window displays a window corresponding to the memo temporary stack, that is, displays a display interface of the memo video camera task in the memo temporary stack. In addition, only a memo stack exists in the extension screen 1, and a window of the extension screen 1 displays a window corresponding to the memo stack, that is, displays a display interface of a memo note task in the memo stack.

For example, the window manager of the mobile phone mirrors window display interfaces of the main screen and the extension screen 1 in the main screen buffer to the virtual screen buffer.

S1613: The view system of the mobile phone sends a coding request to a video codec of the mobile phone.

S1614: The video codec of the mobile phone encodes video images.

S1615: The coordination negotiation application of the mobile phone transmits a video image frame to the coordination negotiation application of the tablet.

S1616: The coordination negotiation application of the tablet sends a decoding request to the video codec of the tablet.

S1617: The video codec of the tablet decodes the video image frame.

For explanation and description of S1201~S1204, refer to the foregoing, and details are not described again.

S1618: The window manager of the tablet displays the video images in a plurality of windows.

Figure 19:
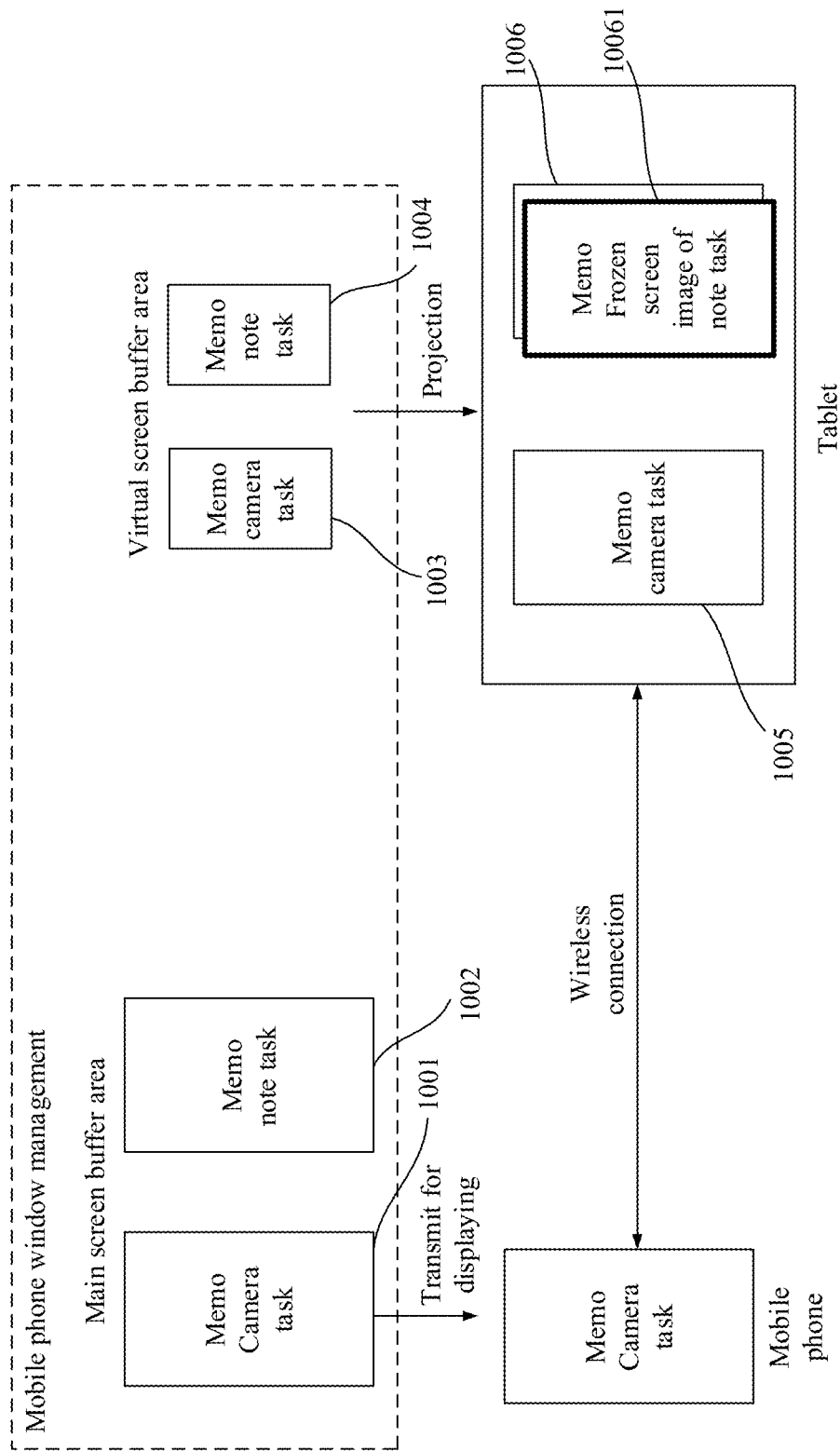
FIG. 19 is a schematic diagram of an application scenario shown by way of example.

The window manager of the tablet displays the received video images in a plurality of coordination windows displayed on the display interface of the tablet according to the screen windows to which the video image belongs. That is, the window manager of the tablet displays the video image corresponding to the display interface of the memo camera task in the coordination window that is corresponding to the main screen window and that is displayed on the display interface of the tablet. The window manager of the tablet displays the video image corresponding to the display interface of the memo note task in the coordination window that is corresponding to the extension screen 1 window and that is displayed on the display interface of the tablet. FIG. 19 is a schematic diagram of an application scenario shown by way of example.

Before the window manager performs the coordination window camera task transfer procedure, as shown in FIG. 10a, details are not described again. After the window manager executes the coordination window camera task moving procedure, as shown in FIG. 19, in the main screen buffer, a display interface of the memo camera task is displayed in the main screen window 1001, and a display interface of the memo note task is displayed in the expansion screen 1 window 1002. The display interface of the memorized video camera task displayed in the main screen window 1001 is directly sent to the display interface of the mobile phone for display. In addition, each screen window of the main screen buffer is mirrored into the virtual screen buffer. In the virtual screen buffer, a display interface of a memo camera task is displayed in the main screen window 1003, and a display interface of a memo note task is displayed in the expansion screen 1 window 1004. A display interface of each screen window in the virtual screen buffer is corresponding to a coordination window projected on the display interface of the tablet. The coordination window 1005 is corresponding to the primary screen window 1003, and displays a display interface of a task of the memo camera. The coordination window 1006 is corresponding to the extension screen 1 window 1004, and a display interface of the memo note task is displayed. Because the window manager of the tablet performs screen freezing processing in the coordination window 1006, a memo note interface image (a screen freezing image of the memo note task) 10061 is displayed in the coordination window 1006, and a display interface of the memo note task is not displayed.

In this implementation, continue to refer to the schematic diagrams of application scenarios shown in FIG. 7a(1a)~FIG. 7a(1b) and FIG. 13a(a)~FIG. 13b(b), and details are not described herein again.

S1619: The Memo of the mobile phone receives an operation of the user for tapping to complete photographing.

The user taps to complete the photographing operation on the display interface of the memo camera task on the display interface of the mobile phone. As shown in FIG. 13b(a)~FIG. 13b(b), the user taps the OK option 7041 in the display interface 704 of the mobile phone. The operation of tapping the OK option 7041 is to indicate to complete photographing for the memo camera task.

S1620: The Memo of the mobile phone destroys the memo camera task.

In response to the user tapping to complete the photographing operation, the Memo destroys the memo camera task.

S1621: The window manager of the mobile phone destroys the memo temporary stack.

After the memo camera task is destroyed, the memo temporary stack is empty, and the window manager of the mobile phone destroys the memo temporary stack, as shown in FIG. 17(2).

S1622: The window manager of the mobile phone sends indication information to the view system of the mobile phone.

The indication information sent by the window manager of the mobile phone to the view system of the mobile phone is used to instruct the view system to refresh a window display interface of each screen.

S1623: The view system of the mobile phone displays the desktop interface on the main screen.

The view system of the mobile phone refreshes window display interfaces of the main screen and the extension screen 1 according to the indication information. The display interface of the main screen window switches back to the mobile phone desktop interface, and the expansion screen 1 window continues to display the display interface of the memo note task.

As shown in FIG. 17(3), only a desktop application stack exists in a main screen, and a main screen window displays a window corresponding to the desktop application stack, that is, displays a mobile phone desktop. In addition, only a memo stack exists in the extension screen 1, and a window of the extension screen 1 displays a window corresponding to the memo stack, that is, displays a display interface of the memo note task on the top of the memo stack.

For example, the window manager of the mobile phone mirrors window display interfaces of the main screen and the extension screen 1 in the main screen buffer to the virtual screen buffer.

S1624: The Memo of the mobile phone sends indication information to the coordination negotiation application of the mobile phone.

After destroying the memo camera task, the Memo of the mobile phone sends indication information to the coordination negotiation application of the mobile phone. The indication information may be used to indicate that the memo camera task has been destroyed.

S1625: The coordination negotiation application of the mobile phone sends an unfreeze request to the coordination negotiation application of the tablet.

S1626: The coordination negotiation application of the tablet requests the window manager of the tablet to unfreeze the displayed picture of the extension screen 1.

S1627: The window manager of the tablet unfreezes the displayed picture of the extension screen 1.

S1628: The view system of the mobile phone sends a coding request to a video codec of the mobile phone.

S1629: The video codec of the mobile phone encodes video images.

S1630: The coordination negotiation application of the mobile phone transmits a video image frame to the coordination negotiation application of the tablet.

S1631: The coordination negotiation application of the tablet sends a decoding request to the video codec of the tablet.

S1632: The video codec of the tablet decodes the video image frame.

For explanation and description of S1201~S1204, refer to the foregoing, and details are not described again.

S1633: The window manager of the tablet displays the video images in a plurality of windows.

The window manager of the tablet displays the received video images in a plurality of coordination windows displayed on the display interface of the tablet according to the screen windows to which the video image belongs. That is, the window manager of the tablet displays the video image corresponding to the desktop interface in the coordination window that is corresponding to the main screen window and that is displayed on the display interface of the tablet. The window manager of the tablet displays the video image corresponding to the display interface of the memo note task in the coordination window that is corresponding to the extension screen 1 window and that is displayed on the display interface of the tablet. In this case, continue to refer to FIG. 10a, and details are not described herein again.

Based on the foregoing FIG. 7a(la)~FIG. 7a(1b) and FIG. 13a(a)~FIG. 13b(b), in response to an operation in which the user taps the OK option 7041 (that is, completes photographing) in the display interface 704 of the mobile phone, for a change of interfaces of the tablet and the mobile phone, reference may be made to FIG. 7c(a)~FIG. 7c(b), and details are not described again.

It should be noted that S1605~S1607 may be executed before S1608~S1617, or may be executed at the same time as S1608~S1617. This is not limited. It is only necessary to complete freezing of the coordination window corresponding to the extension screen 1 before refreshing and displaying the coordination window of the tablet. S1625~S1627 may be performed before S1628~S1632, or may be performed at the same time as S1628~S1632. This is not limited. It is only necessary to complete, before the display is refreshed in the coordination window of the tablet, unfreezing of the coordination window corresponding to the extension screen 1.

In this way, in a multi-screen coordination application scenario, a display window of a camera task may be moved to a display interface of a mobile phone even if a camera task is invoked in an application displayed in a coordination window. In this case, the user can complete image collection and image photographing by using only one hand, which greatly improves convenience of the user operation. In addition, when the user completes photographing, display of the coordination window is restored, and use experience of the user is not affected.

The technical solution provided in this implementation is applicable to an application of a non-adaptation single application multi-task. When the camera task of the application is moved from the coordination window to the display window of the mobile phone, another task of the application cannot be provided for use by the user, but locking the original coordination window displayed by the application in a screen freezing manner does not affect visual experience of the user.

In this implementation, the S1605~S1607 and the S1625~S1627 may be optional operations. In a case in which the S1605~S1607 and the S1625~S1627 are not executed, when the camera task of the application moves from the coordination window to the display window of the mobile phone, the display interface of the another task of the application may further be displayed in the coordination window (refer to FIG. 10b, and details are not described), so that the user uses a function corresponding to the another task. For example, when the camera task of the memo is moved from the coordination window to the display window of the mobile phone, the display interface of the note-taking task of the memo may be further displayed in the coordination window for use by the user.

In the two implementations of scenario 2, a WeChat scanning task may be used as an example for description. In the two implementations, for a procedure of the coordination processing method for the WeChat scanning task, refer to a procedure of the coordination window processing method for the WeChat scanning task, and details are not described herein again. For an example diagram of an application scenario of a coordination processing method corresponding to a WeChat scanning task, refer to FIG. 11a(a)~FIG. 11d(b). A difference lies in that in scenario 1, a discovery task display interface displayed in a coordination window 1101 on a display interface of the tablet in FIG. 11c(a) is available for a user to operate, that is, options in a discovery task display interface displayed in the coordination window 1101 are available for a user to tap operation. In scenario 2, after the coordination window 1101 on the display interface of the tablet in FIG. 11c(a) is frozen, the coordination window 1101 on the display interface of the tablet displays a discovery task display interface, but cannot be operated by the user, and actually displays a screenshot image corresponding to the discovery task display interface. For example, each option in the discovery task display interface displayed in the screenshot image may be set to gray, so as to prompt the user that operation cannot be performed.

In the foregoing coordination window processing method provided in this embodiment of this application, steps performed by the electronic device 100 may also be performed by a chip system included in the terminal electronic device. The chip system may include a processor and a Bluetooth chip. The chip system may be coupled to a memory, so that when the chip system runs, the chip system invokes a computer program stored in the memory to implement the steps performed by the foregoing electronic device 100. The processor in the chip system may be an application processor or a processor that is not an application processor.

This embodiment further provides a computer storage medium. The computer storage medium stores a computer instruction. When the computer instruction runs on an electronic device, the electronic device performs the foregoing related method steps to implement the coordination window processing method in the foregoing embodiment.

This embodiment further provides a computer program product. When the computer program product runs on a computer, the computer performs the foregoing related steps, so as to implement a coordination window processing method in the foregoing embodiment.

In addition, an embodiment of this application further provides an apparatus. The apparatus may be specifically a chip, a component, or a module. The apparatus may include a connected processor and a memory. The memory is configured to store a computer execution instruction. When the apparatus runs, the processor may execute the computer execution instruction stored in the memory, so that the chip executes the coordination window processing method in the foregoing method embodiments.

The electronic device, the computer storage medium, the computer program product, or the chip provided in this embodiment are all used to execute the foregoing corresponding method. Therefore, for beneficial effects that can be achieved by the electronic device, the computer storage medium, the computer program product, or the chip, reference may be made to beneficial effects in the foregoing corresponding methods. Details are not described herein again.

It may be understood by a person skilled in the art from the foregoing description of the implementations that, for convenience and brevity of the description, division of the foregoing functional modules is merely used as an example for description. In actual application, the foregoing functions may be allocated to different functional modules based on a requirement, that is, an internal structure of the apparatus is divided into different functional modules, so as to complete all or some of the functions described above.

In the embodiments provided in this application, it should be understood that the disclosed apparatuses and methods may be implemented in another manner. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may be one physical unit or may be a plurality of physical units, may be located at one position, or may be distributed on a plurality of different places. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit. The foregoing integrated unit may be implemented in a form of hardware, or may be implemented in a form of a software functional unit.

Any content in the embodiments of this application and any content in the same embodiment may be freely combined. Any combination of the foregoing content falls within the scope of this application.

When an integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or some or all of the technical solutions may be implemented in a form of a software product. The computer software product is stored in a storage medium, and includes several instructions for instructing a device (which may be a single-chip processor, a chip, or the like) or a processor (processor) to perform all or some of the steps of the methods described in the embodiments of this application. The foregoing storage medium includes any medium that can store program code, for example, a USB flash drive, a removable hard disk, a read-only memory (read only memory. ROM), a random access memory (random access memory. RAM), a magnetic disk, or an optical disc.

The embodiments of the present application are described with reference to the accompanying drawings. However, the present application is not limited to the foregoing specific implementations. The foregoing specific implementations are merely exemplary, but are not limiting. Persons of ordinary skill in the art may make many forms without departing from the object and the scope of the claims of the present application and are within the protection scope of the present application.

The methods or algorithm steps described with reference to the content disclosed in the embodiments of this application may be implemented in a hardware manner, or may be implemented in a manner in which the processor executes a software instruction. The software instruction may include a corresponding software module. The software module may be stored in a Random Access Memory (Random Access Memory. RAM), a flash memory, a Read Only Memory (Read Only Memory. ROM), an erasable programmable read-only memory (Erasable Programmable ROM. EPROM), an electrically erasable programmable read-only memory (Electrically EPROM. EEPROM), a register, a hard disk, a removable hard disk, a CD-ROM (CD-ROM), or any other form of storage medium familiar with the art. An exemplary storage medium is coupled to a processor, so that the processor can read information from the storage medium and can write information to the storage medium. Certainly, the storage medium may also be an integral part of the processor. The processor and the storage medium may be located in the ASIC. In addition, the ASIC may be located in a network device. Certainly, the processor and the storage medium may also exist as discrete components in the network device.

A person skilled in the art may recognize that in the foregoing one or more examples, functions described in the embodiments of this application may be implemented by hardware, software, firmware, or any combination thereof. When implemented by using software, these functions may be stored in a computer readable medium or transmitted as one or more instructions or codes on the computer readable medium. The computer readable medium includes a computer storage medium and a communication medium, where the communication medium includes any medium that facilitates the transfer of a computer program from one place to another. The storage medium may be any available medium accessible to a general-purpose or dedicated computer.

The embodiments of the present application are described with reference to the accompanying drawings. However, the present application is not limited to the foregoing specific implementations. The foregoing specific implementations are merely exemplary, but are not limiting. Persons of ordinary skill in the art may make many forms without departing from the object and the scope of the claims of the present application and are within the protection scope of the present application.

The foregoing embodiments are merely used to describe the technical solutions of this application, but are not limited thereto. Although this application is described in detail with reference to the foregoing embodiments, a person of ordinary skill in the art should understand that the foregoing embodiments may still modify the technical solutions described in the foregoing embodiments, or perform equivalent replacement on some of the technical features. However, these modifications or replacements do not leave the essence of the corresponding technical solutions out of the scope of the technical solutions in the embodiments of this application.

What is claimed is:

1. A coordination window processing system, comprising a first electronic device and a second electronic device, wherein the second electronic device is connected to the first electronic device through wireless communication;

the first electronic device is configured to:
project a screen to the second electronic device;
the second electronic device is configured to:
display a first coordination window and at least one second coordination window on a display, wherein a target display interface is displayed on both the first coordination window and a display of the first electronic device, the second coordination window displays a display interface of a target application in the first electronic device, and the target display interface is different from the display interface of the target application; and
send first indication information to the first electronic device in response to a tap operation on a camera function option on a display interface of the second coordination window, wherein the first indication information is used to indicate the first electronic device to start a camera; and
the first electronic device is configured to:
display, on the display of the first electronic device in response to the received first indication information, an interface on which the camera of the first electronic device collects information, and perform screen projection to enable the first coordination window to display the interface on which the camera collects information; and
obtain an information collection result corresponding to the camera function option in response to a target operation on the first electronic device, wherein the information collection result comprises a photographed image or a scanned result captured by the camera of the first electronic device, restore the display interface on the display of the first electronic device to the target display interface, and perform screen projection to restore the display interface of the first coordination window to the target display interface, so that the second coordination window displays the display interface of the target application which is obtained after the target application obtains the information collection result.

2. The system according to claim 1, wherein when the camera function option is a photographing option, the interface on which the camera collects information comprises an interface for capturing the photographed image by the camera; and the obtaining the information collection result corresponding to the camera function option in response to the target operation on the first electronic device, and performing screen projection, so that the second coordination window displays the display interface obtained after the target application obtains the information collection result comprises:
obtaining the photographed image in response to a tap operation on the photographing option on the interface for capturing the photographed image by the camera, and performing screen projection to enable the second coordination window to display the display interface of the target application, wherein the display interface of the target application comprises the photographed image.

3. The system according to claim 2, wherein the obtaining the photographed image in response to the tap operation on the photographing option on the interface for capturing the photographed image by the camera comprises:

in response to the tap operation on the photographing option on the interface for capturing an image by the camera, displaying a photographing preview interface on the display of the first electronic device and displaying the photographing preview interface in the first coordination window; and obtaining the photographed image in response to a second tap operation on a photographing complete confirmation option on the photographing preview interface.

4. The system according to claim 1, wherein when the camera function option is a scan option, the obtaining the information collection result corresponding to the camera function option in response to the target operation on the first electronic device, and performing screen projection, so that the second coordination window displays the display interface obtained after the target application obtains the information collection result comprises:

in response to a moving operation on the first electronic device, performing a scanning operation with the camera of the first electronic device to obtain a scanning result, and performing screen projection to enable the second coordination window to display the display interface of the target application, wherein the display interface of the target application comprises a display interface corresponding to the scanning result.

5. The system according to claim 1, wherein before sending the first indication information to the first electronic device in response to the tap operation on the camera function option on the display interface of the second coordination window, the second electronic device is further configured to:

display, in the second coordination window, a display interface comprising the camera function option in response to at least one operation on the display interface of the second coordination window.

6. The system according to claim 1, wherein the first electronic device is configured to:

in response to the received first indication information, create a camera function task in a target application stack by using the target application, and create a target application first temporary stack in a first extension screen in a screen buffer of the first electronic device, wherein the target application stack is disposed in the first extension screen, and a display interface of the first extension screen is displayed in the second coordination window;

eject the camera function task from the target application stack, and push the camera function task into the target application first temporary stack; and change the target application first temporary stack from being disposed in the first extension screen to being disposed in a main screen in the screen buffer of the first electronic device, to display, on the display of the first electronic device, the interface on which the camera of the first electronic device collects information, wherein the display of the first electronic device and the first coordination window display a display interface of the main screen; and the first electronic device is configured to:

destroy the target application first temporary stack, to restore a display interface on the display of the first electronic device to the target display interface.

7. The system according to claim 1, wherein the first electronic device is configured to:

in response to the received first indication information, create a camera function task in a target application stack by using the target application, wherein the target application stack is disposed in a first extension screen in a screen buffer of the first electronic device, and a display interface of the first extension screen is displayed in the second coordination window; and change the target application stack from being disposed in the first extension screen to being disposed in a main screen in the screen buffer of the first electronic device, to display, on the display of the first electronic device, the interface on which the camera of the first electronic device collects information, wherein the display of the first electronic device and the first coordination window display a display interface of the main screen; and the first electronic device is configured to:

destroy the camera function task in the target application stack, and restore the target application stack from being disposed in the main screen to being disposed in the first extension screen, to restore a display interface on the display of the first electronic device to the target display interface.

8. The system according to claim 7, wherein the first electronic device is further configured to:

after the camera function task is created in the target application stack, send second indication information to the second electronic device, wherein the second indication information is used to indicate the second electronic device to freeze the display interface of the second coordination window; and the second electronic device is configured to:

freeze the display interface of the second coordination window in response to the received second indication information.

9. The system according to claim 8, wherein the second electronic device is configured to:

in response to the received second indication information, take a screenshot of the second coordination window to obtain a screenshot image; and display the screenshot image in the second coordination window in a locked manner, to freeze the display interface of the second coordination window.

10. The system according to claim 8, wherein the second electronic device is configured to:

in response to the received second indication information, obtain a display image sent by the first electronic device, wherein the display image is obtained by the first electronic device by taking a screenshot of the first extension screen; and display the display image in the second coordination window in a locked manner, to freeze the display interface of the second coordination window.

11. The system according to claim 8, wherein the first electronic device is further configured to:

send third indication information to the second electronic device after obtaining the information collection result corresponding to the camera function option, wherein the third indication information is used to indicate the second electronic device to unfreeze the display interface of the second coordination window; and the second electronic device is configured to:

unfreeze the display interface of the second coordination window in response to the received third indication information, and display the display interface of the first extension screen in the second coordination window.

12. The system according to claim 1, wherein the first electronic device is configured to:
in response to the received first indication information, create a camera function task in a target application stack by using the target application, wherein
the target application stack is disposed in a first extension screen in a screen buffer of the first electronic device, and a display interface of the first extension screen is displayed in the second coordination window;
create a target application second temporary stack in a main screen in the screen buffer of the first electronic device, wherein
the display of the first electronic device and the first coordination window display a display interface of the main screen; and
eject the camera function task from the target application stack, and push the camera function task into the target application second temporary stack, to display, on the display of the first electronic device, the interface on which the camera of the first electronic device collects information; and
the first electronic device is configured to:
destroy the target application second temporary stack, to restore a display interface on the display of the first electronic device to the target display interface.

13. The system according to claim 1, wherein the first electronic device comprises a mobile phone, and the second electronic device comprises a computer, a tablet, or a television.

14. A first electronic device, comprising:
a memory and a processor, wherein the memory is coupled to the processor; and
the memory stores program instructions, and when the program instructions are executed by the processor, the first electronic device is enabled to execute the following steps:
projecting, a screen to a second electronic device;
receiving, a first indication information, wherein the first indication information is used to indicate the first electronic device to start a camera;
displaying, on a display of the first electronic device in response to the first indication information, an interface on which the camera of the first electronic device collects information, and perform screen projection to enable a first coordination window to display the interface on which the camera collects information; and
obtaining, an information collection result corresponding to a camera function option in response to a target operation on the first electronic device, wherein the information collection result comprises a photographed image or a scanned result captured by the camera of the first electronic device, restore a display interface on the display of the first electronic device to a target display interface, and perform screen projection to restore the display interface of the first coordination window to the target display interface, so that a second coordination window displays a display interface of the target application which is obtained after a target application obtains the information collection result.

15. The first electronic device according to claim 14, wherein when the camera function option is a photographing option, the interface on which the camera collects information comprises an interface for capturing the photographed image by the camera; and the obtaining the information collection result corresponding to the camera function option in response to the target operation on the first electronic device, and performing screen projection, so that the second coordination window displays the display interface obtained after the target application obtains the information collection result comprises:
in response to a tap operation on the photographing option on the interface for capturing an image by the camera, displaying a photographing preview interface on the display of the first electronic device and displaying the photographing preview interface in the first coordination window; and
obtaining the photographed image in response to a second tap operation on a photographing complete confirmation option on the photographing preview interface, and performing screen projection to enable the second coordination window to display the display interface of the target application, wherein the display interface of the target application comprises the photographed image.

16. The first electronic device according to claim 14, wherein when the camera function option is a scan option, the obtaining the information collection result corresponding to the camera function option in response to the target operation on the first electronic device, and performing screen projection, so that the second coordination window displays the display interface obtained after the target application obtains the information collection result comprises:
in response to a moving operation on the first electronic device, performing a scanning operation with the camera of the first electronic device to obtain a scanning result, and performing screen projection to enable the second coordination window to display the display interface of the target application, wherein the display interface of the target application comprises a display interface corresponding to the scanning result.

17. The first electronic device according to claim 14, wherein the first electronic device is further configured to:
in response to the received first indication information, create a camera function task in a target application stack by using the target application, and create a target application first temporary stack in a first extension screen in a screen buffer of the first electronic device, wherein
the target application stack is disposed in the first extension screen, and a display interface of the first extension screen is displayed in the second coordination window;
eject the camera function task from the target application stack, and push the camera function task into the target application first temporary stack; and
change the target application first temporary stack from being disposed in the first extension screen to being disposed in a main screen in the screen buffer of the first electronic device, to display, on the display of the first electronic device, the interface on which the camera of the first electronic device collects information, wherein
the display of the first electronic device and the first coordination window display a display interface of the main screen; and
the first electronic device is further configured to:
destroy the target application first temporary stack, to restore a display interface on the display of the first electronic device to the target display interface.

18. The first electronic device according to claim 14, wherein the first electronic device is further configured to:

in response to the received first indication information, create a camera function task in a target application stack by using the target application, wherein the target application stack is disposed in a first extension screen in a screen buffer of the first electronic device, and a display interface of the first extension screen is displayed in the second coordination window; and change the target application stack from being disposed in the first extension screen to being disposed in a main screen in the screen buffer of the first electronic device, to display, on the display of the first electronic device, the interface on which the camera of the first electronic device collects information, wherein the display of the first electronic device and the first coordination window display a display interface of the main screen; and the first electronic device is further configured to:

destroy the camera function task in the target application stack, and restore the target application stack from being disposed in the main screen to being disposed in the first extension screen, to restore a display interface on the display of the first electronic device to the target display interface.

19. The first electronic device according to claim 14, wherein the first electronic device is further configured to:

in response to the received first indication information, create a camera function task in a target application stack by using the target application, wherein the target application stack is disposed in a first extension screen in a screen buffer of the first electronic device, and a display interface of the first extension screen is displayed in the second coordination window;

create a target application second temporary stack in a main screen in the screen buffer of the first electronic device, wherein the display of the first electronic device and the first coordination window display a display interface of the main screen; and eject the camera function task from the target application stack, and push the camera function task into the target application second temporary stack, to display, on the display of the first electronic device, the interface on which the camera of the first electronic device collects information; and the first electronic device is further configured to:

destroy the target application second temporary stack, to restore a display interface on the display of the first electronic device to the target display interface.

20. A second electronic device, comprising:

a memory and a processor, wherein the memory is coupled to the processor; and the memory stores program instructions, and when the program instructions are executed by the processor, the second electronic device is enabled to execute the following steps:

displaying, a first coordination window and at least one second coordination window on a display, wherein a target display interface is displayed on both the first coordination window and a display of a first electronic device, the at least one second coordination window displays a display interface of a target application in the first electronic device, and the target display interface is different from the display interface of the target application;

displaying, in the second coordination window, a display interface comprising a camera function option in response to at least one operation on the display interface of the second coordination window; and sending, first indication information to the first electronic device in response to a tap operation on the camera function option on a display interface of the second coordination window, wherein the first indication information is used to indicate the first electronic device to start a camera, and wherein the second coordination window displays the display interface of the target display interface which is the obtained after the target application obtains an information collection result that corresponds to the camera function option, the information collection result comprising a photographed image or a scanned result captured by the camera of the first electronic device.

* * * * *

UNITED STATES PATENT AND TRADEMARK OFFICE
CERTIFICATE OF CORRECTION

PATENT NO. : 12,231,763 B2
APPLICATION NO. : 18/016850
DATED : February 18, 2025
INVENTOR(S) : Shicong Liu Page 1 of 1

It is certified that error appears in the above-identified patent and that said Letters Patent is hereby corrected as shown below:

In the Claims

In Column 53, Claim 14, Lines 60-61, delete "the target application which is obtained after a target application" and insert --a target application which is obtained after the target application--.

Signed and Sealed this
Thirteenth Day of May, 2025

Coke Morgan Stewart
*Acting Director of the United States Patent and Trademark Office*